(12) United States Patent
Volvovski et al.

(10) Patent No.: US 11,586,755 B1
(45) Date of Patent: *Feb. 21, 2023

(54) ADJUSTING EFFICIENCY OF STORING DATA IN A STORAGE NETWORK

(71) Applicant: Pure Storage, Inc., Mountain View, CA (US)

(72) Inventors: Ilya Volvovski, Chicago, IL (US);
Wesley B. Leggette, Chicago, IL (US);
Michael C. Storm, Palo Alto, CA (US);
Jason K. Resch, Chicago, IL (US)

(73) Assignee: Pure Storage, Inc., Mountain View, CA (US)

( * ) Notice: Subject to any disclaimer, the term of this patent is extended or adjusted under 35 U.S.C. 154(b) by 187 days.

This patent is subject to a terminal disclaimer.

(21) Appl. No.: 17/247,417

(22) Filed: Dec. 10, 2020

Related U.S. Application Data

(63) Continuation of application No. 16/883,902, filed on May 26, 2020, now Pat. No. 10,891,390, which is a
(Continued)

(51) Int. Cl.
*G06F 21/62* (2013.01)
*G06F 11/00* (2006.01)
(Continued)

(52) U.S. Cl.
CPC .......... *G06F 21/6218* (2013.01); *G06F 11/00* (2013.01); *G06F 21/6254* (2013.01);
(Continued)

(58) Field of Classification Search
CPC .. G06F 21/6218; G06F 11/00; G06F 21/6254; G06F 21/6272; G06F 21/6281;
(Continued)

(56) References Cited

U.S. PATENT DOCUMENTS

| 4,092,732 A | 5/1978 | Ouchi |
|---|---|---|
| 5,454,101 A | 9/1995 | Mackay |

(Continued)

OTHER PUBLICATIONS

Chung; An Automatic Data Segmentation Method for 3D Measured Data Points; National Taiwan University; pp. 1-8; 1998.
(Continued)

*Primary Examiner* — Darren B Schwartz
(74) *Attorney, Agent, or Firm* — Garlick & Markison; Timothy W. Markison; Timothy D. Taylor

(57) ABSTRACT

A method for execution by a computing device to adjust data storage efficiency of data in a storage network includes determining an estimated overwrite frequency for a data segment for storage in memory of the storage network. The method continues by determining a storage approach for the data segment based on the estimated overwrite frequency. The method continues by processing the data segment based on the storage approach to produce a processed data segment. The method continues by error encoding the processed data segment to produce a set of encoded data slices, where a decode threshold number of encoded data slices is needed to recover the processed data segment. The method continues by storing the set of encoded data slices in the memory of the storage network.

20 Claims, 56 Drawing Sheets

Related U.S. Application Data continuation of application No. 16/197,235, filed on Nov. 20, 2018, now abandoned, which is a continuation-in-part of application No. 15/721,093, filed on Sep. 29, 2017, now Pat. No. 10,325,110, which is a continuation of application No. 14/610,220, filed on Jan. 30, 2015, now abandoned.

(60) Provisional application No. 61/974,142, filed on Apr. 2, 2014.

(51) Int. Cl.
  H04L 9/40 (2022.01)
  H04L 67/1097 (2022.01)
  G06F 3/06 (2006.01)

(52) U.S. Cl.
  CPC ...... G06F 21/6272 (2013.01); G06F 21/6281 (2013.01); H04L 63/0823 (2013.01); H04L 63/104 (2013.01); H04L 63/12 (2013.01); H04L 63/20 (2013.01); H04L 67/1097 (2013.01); *G06F 3/067* (2013.01); *G06F 2221/2141* (2013.01); *H04L 63/101* (2013.01)

(58) Field of Classification Search
  CPC .............. G06F 3/067; G06F 2221/2141; H04L 63/0823; H04L 63/104; H04L 63/12; H04L 63/20; H04L 67/1097; H04L 63/101

See application file for complete search history.

(56) References Cited

U.S. PATENT DOCUMENTS

| | | | |
|---|---|---|---|
| 5,485,474 A | 1/1996 | Rabin | |
| 5,732,062 A * | 3/1998 | Yokoi | G11B 7/126 369/275.2 |
| 5,774,643 A | 6/1998 | Lubbers | |
| 5,802,364 A | 9/1998 | Senator | |
| 5,809,285 A | 9/1998 | Hilland | |
| 5,825,880 A | 10/1998 | Sudia | |
| 5,890,156 A | 3/1999 | Rekieta | |
| 5,987,622 A | 11/1999 | Lo Verso | |
| 5,991,414 A | 11/1999 | Garay | |
| 6,012,159 A | 1/2000 | Fischer | |
| 6,058,454 A | 5/2000 | Gerlach | |
| 6,128,277 A | 10/2000 | Bruck | |
| 6,175,571 B1 | 1/2001 | Haddock | |
| 6,192,472 B1 | 2/2001 | Garay | |
| 6,256,688 B1 | 7/2001 | Suetaka | |
| 6,272,658 B1 | 8/2001 | Steele | |
| 6,301,604 B1 | 10/2001 | Nojima | |
| 6,356,949 B1 | 3/2002 | Katsandres | |
| 6,366,995 B1 | 4/2002 | Vilkov | |
| 6,374,336 B1 | 4/2002 | Peters | |
| 6,415,373 B1 | 7/2002 | Peters | |
| 6,418,539 B1 | 7/2002 | Walker | |
| 6,449,688 B1 | 9/2002 | Peters | |
| 6,567,948 B2 | 5/2003 | Steele | |
| 6,571,282 B1 | 5/2003 | Bowman-Amuah | |
| 6,609,223 B1 | 8/2003 | Wolfgang | |
| 6,718,361 B1 | 4/2004 | Basani | |
| 6,760,808 B2 | 7/2004 | Peters | |
| 6,785,768 B2 | 8/2004 | Peters | |
| 6,785,783 B2 | 8/2004 | Buckland | |
| 6,826,711 B2 | 11/2004 | Moulton | |
| 6,879,596 B1 | 4/2005 | Dooply | |
| 7,003,688 B1 | 2/2006 | Pittelkow | |
| 7,024,451 B2 | 4/2006 | Jorgenson | |
| 7,024,609 B2 | 4/2006 | Wolfgang | |
| 7,080,101 B1 | 7/2006 | Watson | |
| 7,103,824 B2 | 9/2006 | Halford | |
| 7,103,915 B2 | 9/2006 | Redlich | |
| 7,111,115 B2 | 9/2006 | Peters | |
| 7,140,044 B2 | 11/2006 | Redlich | |
| 7,146,644 B2 | 12/2006 | Redlich | |
| 7,171,493 B2 | 1/2007 | Shu | |
| 7,222,133 B1 | 5/2007 | Raipurkar | |
| 7,225,211 B1 | 5/2007 | Colgrove | |
| 7,240,236 B2 | 7/2007 | Cutts | |
| 7,272,613 B2 | 9/2007 | Sim | |
| 7,636,724 B2 | 12/2009 | De La Torre | |
| 8,300,506 B1 * | 10/2012 | Kivits | G11B 7/1267 369/116 |
| 9,235,590 B1 | 1/2016 | Wang | |
| 9,336,139 B2 | 5/2016 | Grube | |
| 9,658,911 B2 | 5/2017 | Resch | |
| 9,825,652 B1 | 11/2017 | Lazier | |
| 10,095,872 B2 | 10/2018 | Volvovski | |
| 10,359,935 B2 | 7/2019 | Resch | |
| 10,360,180 B2 | 7/2019 | Vas | |
| 2001/0055388 A1 | 12/2001 | Kaliski | |
| 2002/0013898 A1 | 1/2002 | Sudia | |
| 2002/0062422 A1 | 5/2002 | Butterworth | |
| 2002/0118307 A1 | 8/2002 | Lee | |
| 2002/0166079 A1 | 11/2002 | Ulrich | |
| 2003/0018927 A1 | 1/2003 | Gadir | |
| 2003/0037261 A1 | 2/2003 | Meffert | |
| 2003/0065617 A1 | 4/2003 | Watkins | |
| 2003/0084020 A1 | 5/2003 | Shu | |
| 2004/0024963 A1 | 2/2004 | Talagala | |
| 2004/0103276 A1 | 5/2004 | Jing | |
| 2004/0122917 A1 | 6/2004 | Menon | |
| 2004/0215998 A1 | 10/2004 | Buxton | |
| 2004/0228493 A1 | 11/2004 | Ma | |
| 2005/0100022 A1 | 5/2005 | Ramprashad | |
| 2005/0114594 A1 | 5/2005 | Corbett | |
| 2005/0125593 A1 | 6/2005 | Karpoff | |
| 2005/0131993 A1 | 6/2005 | Fatula, Jr. | |
| 2005/0132070 A1 | 6/2005 | Redlich | |
| 2005/0132202 A1 | 6/2005 | Dillaway | |
| 2005/0144382 A1 | 6/2005 | Schmisseur | |
| 2005/0229069 A1 | 10/2005 | Hassner | |
| 2006/0023887 A1 | 2/2006 | Agrawal | |
| 2006/0047907 A1 | 3/2006 | Shiga | |
| 2006/0136448 A1 | 6/2006 | Cialini | |
| 2006/0156059 A1 | 7/2006 | Kitamura | |
| 2006/0184565 A1 | 8/2006 | Nishikawa | |
| 2006/0193475 A1 | 8/2006 | Borke | |
| 2006/0224603 A1 | 10/2006 | Correll, Jr. | |
| 2007/0079081 A1 | 4/2007 | Gladwin | |
| 2007/0079082 A1 | 4/2007 | Gladwin | |
| 2007/0079083 A1 | 4/2007 | Gladwin | |
| 2007/0088970 A1 | 4/2007 | Buxton | |
| 2007/0174192 A1 | 7/2007 | Gladwin | |
| 2007/0214285 A1 | 9/2007 | Au | |
| 2007/0223706 A1 | 9/2007 | Gantman | |
| 2007/0234110 A1 | 10/2007 | Soran | |
| 2007/0283167 A1 | 12/2007 | Venters, III | |
| 2008/0172525 A1 | 7/2008 | Nakamura | |
| 2008/0205206 A1 * | 8/2008 | Sun | G11B 20/10 369/30.18 |
| 2009/0037512 A1 | 2/2009 | Barsness | |
| 2009/0094251 A1 | 4/2009 | Gladwin | |
| 2009/0094318 A1 | 4/2009 | Gladwin | |
| 2009/0299973 A1 | 12/2009 | Kataoka | |
| 2010/0023524 A1 | 1/2010 | Gladwin | |
| 2010/0037056 A1 | 2/2010 | Follis | |
| 2010/0095012 A1 | 4/2010 | Zuckerman | |
| 2010/0095014 A1 | 4/2010 | Zuckerman | |
| 2010/0185864 A1 | 7/2010 | Gerdes | |
| 2010/0235588 A1 | 9/2010 | Maeda | |
| 2010/0275027 A1 | 10/2010 | Belrose | |
| 2010/0306498 A1 | 12/2010 | Shiga | |
| 2011/0093670 A1 | 4/2011 | Cherian | |
| 2011/0138270 A1 | 6/2011 | Li | |
| 2011/0145486 A1 | 6/2011 | Owa | |
| 2011/0214011 A1 * | 9/2011 | Grube | G06F 11/1092 714/E11.062 |
| 2011/0225362 A1 | 9/2011 | Leggette | |
| 2011/0261813 A1 | 10/2011 | Baptist | |
| 2011/0264717 A1 | 10/2011 | Grube et al. | |
| 2011/0264989 A1 | 10/2011 | Resch et al. | |

(56) References Cited

U.S. PATENT DOCUMENTS

| | | | |
|---|---|---|---|
| 2011/0289577 | A1 | 11/2011 | Resch |
| 2012/0030413 | A1* | 2/2012 | Miyagawa .......... G06F 12/0246 711/E12.008 |
| 2012/0054456 | A1 | 3/2012 | Grube |
| 2012/0137091 | A1 | 5/2012 | Grube et al. |
| 2012/0137095 | A1 | 5/2012 | Grube |
| 2012/0216035 | A1 | 8/2012 | Leggette |
| 2012/0290830 | A1 | 11/2012 | Resch |
| 2013/0086642 | A1 | 4/2013 | Resch |
| 2013/0232378 | A1 | 9/2013 | Resch |
| 2013/0232503 | A1 | 9/2013 | Volvovski |
| 2013/0326215 | A1 | 12/2013 | Leggette |
| 2014/0006364 | A1 | 1/2014 | Eguchi |
| 2014/0297776 | A1 | 10/2014 | Volvovski |
| 2014/0351457 | A1 | 11/2014 | Baptist |
| 2014/0351659 | A1 | 11/2014 | Dhuse |
| 2015/0006952 | A1 | 1/2015 | Trichardt |
| 2015/0286833 | A1 | 10/2015 | Resch |
| 2015/0355979 | A1 | 12/2015 | Volvovski |
| 2016/0021020 | A1 | 1/2016 | Deguchi |
| 2017/0063399 | A1 | 3/2017 | Richardson |
| 2017/0371542 | A1 | 12/2017 | Dhuse |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.
Legg; Lightweight Directory Access Protocol (LDAP): Syntaxes and Matching Rules; IETF Network Working Group; RFC 4517; Jun. 2006; pp. 1-50.
Plank, T1: Erasure Codes for Storage Applications; FAST2005, 4th Usenix Conference on File Storage Technologies; Dec. 13-16, 2005; pp. 1-74.
Rabin; Efficient Dispersal of Information for Security, Load Balancing, and Fault Tolerance; Journal of the Association for Computer Machinery; vol. 36, No. 2; Apr. 1989; pp. 335-348.
Satran, et al.; Internet Small Computer Systems Interface (iSCSI); IETF Network Working Group; RFC 3720; Apr. 2004; pp. 1-257.
Sciberras; Lightweight Directory Access Protocol (LDAP): Schema for User Applications; IETF Network Working Group; RFC 4519; Jun. 2006; pp. 1-33.
Sermersheim; Lightweight Directory Access Protocol (LDAP): The Protocol; IETF Network Working Group; RFC 4511; Jun. 2006; pp. 1-68.
Shamir; How to Share a Secret; Communications of the ACM; vol. 22, No. 11; Nov. 1979; pp. 612-613.
Smith; Lightweight Directory Access Protocol (LDAP): Uniform Resource Locator; IETF Network Working Group; RFC 4516; Jun. 2006; pp. 1-15.
Smith; Lightweight Directory Access Protocol (LDAP): String Representation of Search Filters; IETF Network Working Group; RFC 4515; Jun. 2006; pp. 1-12.
Wildi; Java iSCSi Initiator; Master Thesis; Department of Computer and Information Science, University of Konstanz; Feb. 2007; 60 pgs.
Xin, et al.; Evaluation of Distributed Recovery in Large-Scale Storage Systems; 13th IEEE International Symposium on High Performance Distributed Computing; Jun. 2004; pp. 172-181.
Zeilenga; Lightweight Directory Access Protocol (LDAP): Directory Information Models; IETF Network Working Group; RFC 4512; Jun. 2006; pp. 1-49.
Zeilenga; Lightweight Directory Access Protocol (LDAP): Internationalized String Preparation; IETF Network Working Group; RFC 4518; Jun. 2006; pp. 1-14.
Zeilenga; Lightweight Directory Access Protocol (LDAP): String Representation of Distinguished Names; IETF Network Working Group; RFC 4514; Jun. 2006; pp. 1-15.
Zeilenga; Lightweight Directory Access Protocol (LDAP): Technical Specification Road Map; IETF Network Working Group; RFC 4510; Jun. 2006; pp. 1-8.

* cited by examiner

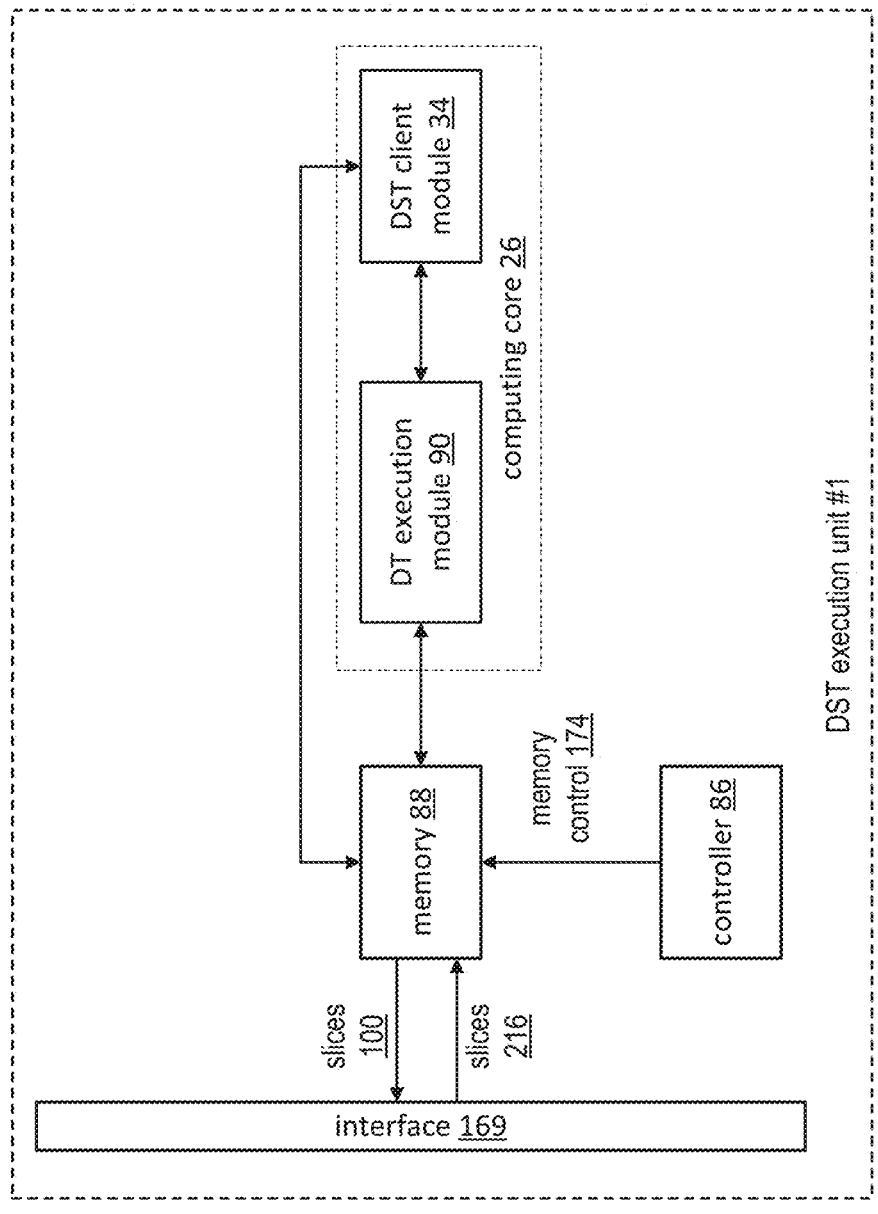
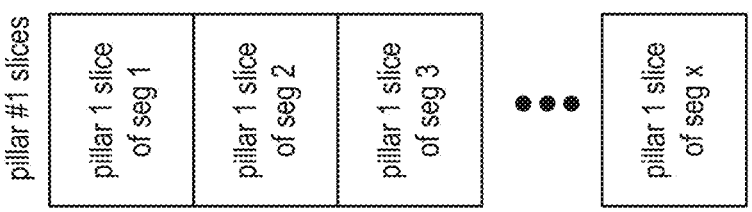
FIG. 24

DST allocation info 242 | data partition info 320: data ID; No. of partitions; Addr. info for each partition; format conversion indication

| task 326 | task ordering 328 | task execution info 322 | | | intermediate result info 324 | | |
|---|---|---|---|---|---|---|---|
| | | data partition 330 | set of DT EX mods 332 | Name 334 | interm. result processing 336 | scratch pad storage 338 | intermediate result storage 340 |
| 1_1 | none | 2_1 - 2_z | 1_1, 2_1, 3_1, 4_1, & 5_1 | R1-1 | DST unit 1 | DST unit 1 | DST units 1-5 |
| 1_2 | none | 2_1 - 2_4 | 1_1, 2_1, 3_1, 4_1, & 5_1 | R1-2 | DST unit 1 | DST unit 1 | DST units 1-5 |
| 1_3 | none | 2_1 - 2_4<br>2_5 - 2_z | 1_1, 2_1, 3_1, 4_1, & 5_1<br>1_2, 2_2, 3_2, 4_2, & 5_2 | R1-3 | DST unit 2 | DST unit 2 | DST units 2-6 |
| 1_4 | after 1_3 | R1-3_1 - R1-3_4<br>R1-3_5 - R1-3_z | 1_1, 2_1, 3_1, 4_1, & 5_1<br>1_2, 2_2, 6_1, 7_1, & 7_2 | R1_4 | DST unit 3 | DST unit 3 | DST units 3-7 |
| 1_5 | after 1_4 | R1-4_1 - R1-4_z &<br>2_1 - 2_z | 1_1, 2_1, 3_1, 4_1, & 5_1 | R1-5 | DST unit 1 | DST unit 1 | DST units 1-5 |
| 1_6 | after 1_1 & 1_5 | R1-1_1 - R1-1_z &<br>R1-5_1 - R1-5_z | 1_2, 2_2, 3_2, 4_2, & 5_2 | R1-6 | DST unit 2 | DST unit 2 | DST units 2-6 |
| 1_7 | after 1_2 & 1_5 | R1-2_1 - R1-2_z &<br>R1-5_1 - R1-5_z | 1_2, 2_2, 3_2, 4_2, & 5_2 | R1-7 | DST unit 3 | DST unit 3 | DST units 3-7 |
| 2 | none | 2_1 - 2_z | 3_1, 4_1, 5_1, 6_1, & 7_1 | R2 | DST unit 7 | DST unit 7 | DST units 7, 1-4 |
| 3_1 | none (same as 1_3) | use R1_3 | | R1-1 | | | |
| 3_2 | after 3_1 | R1-3_1 - R1-3_z | 1_2, 2_2, 3_2, 4_2, & 5_2 | R3-2 | DST unit 5 | DST unit 5 | DST units 5,6, 1-3 |

FIG. 32

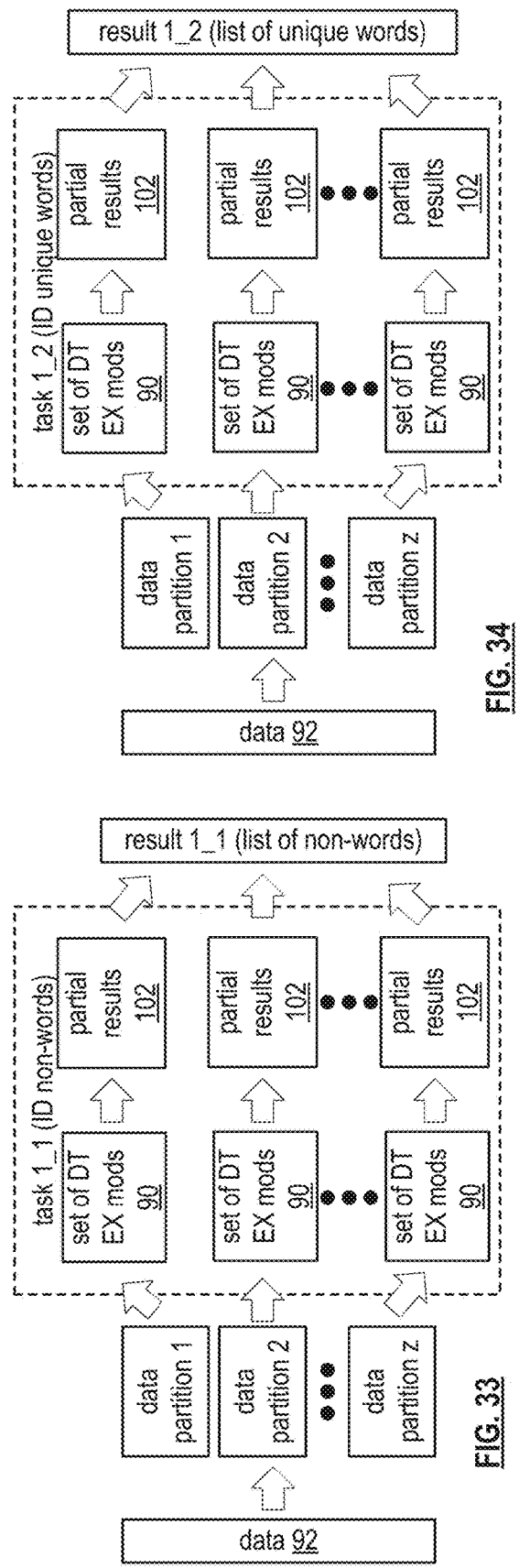
FIG. 33
FIG. 34
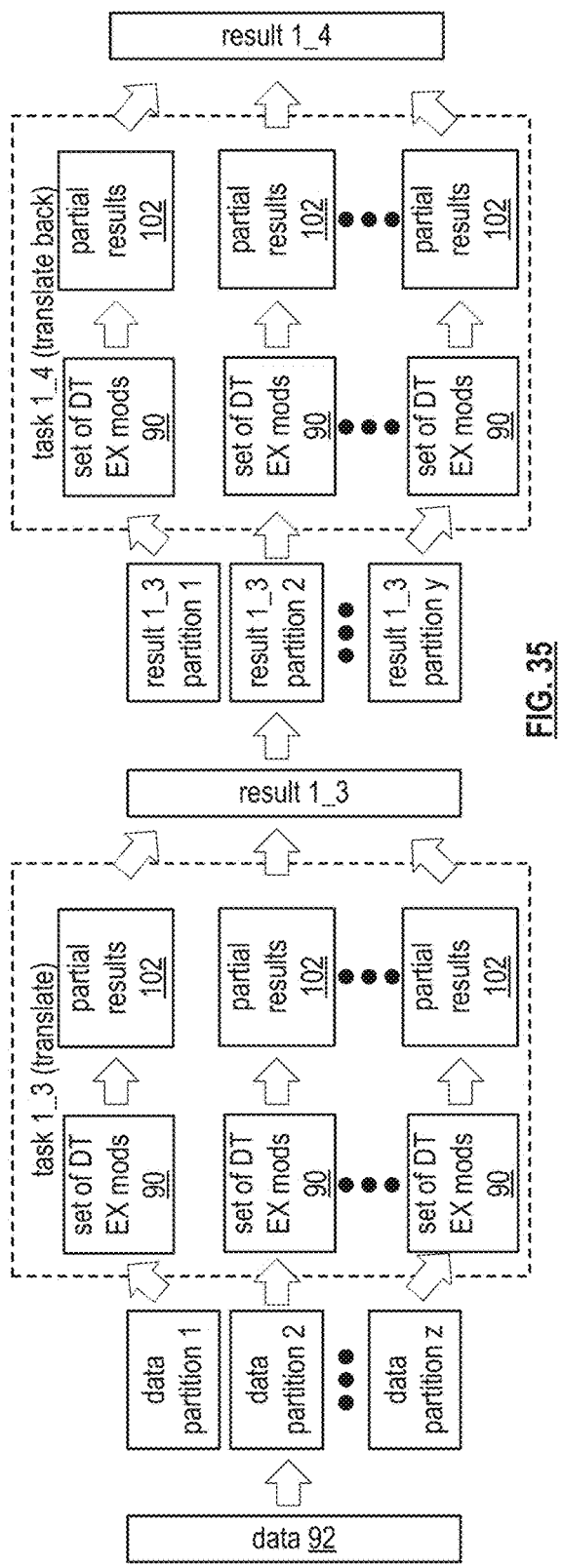
FIG. 35

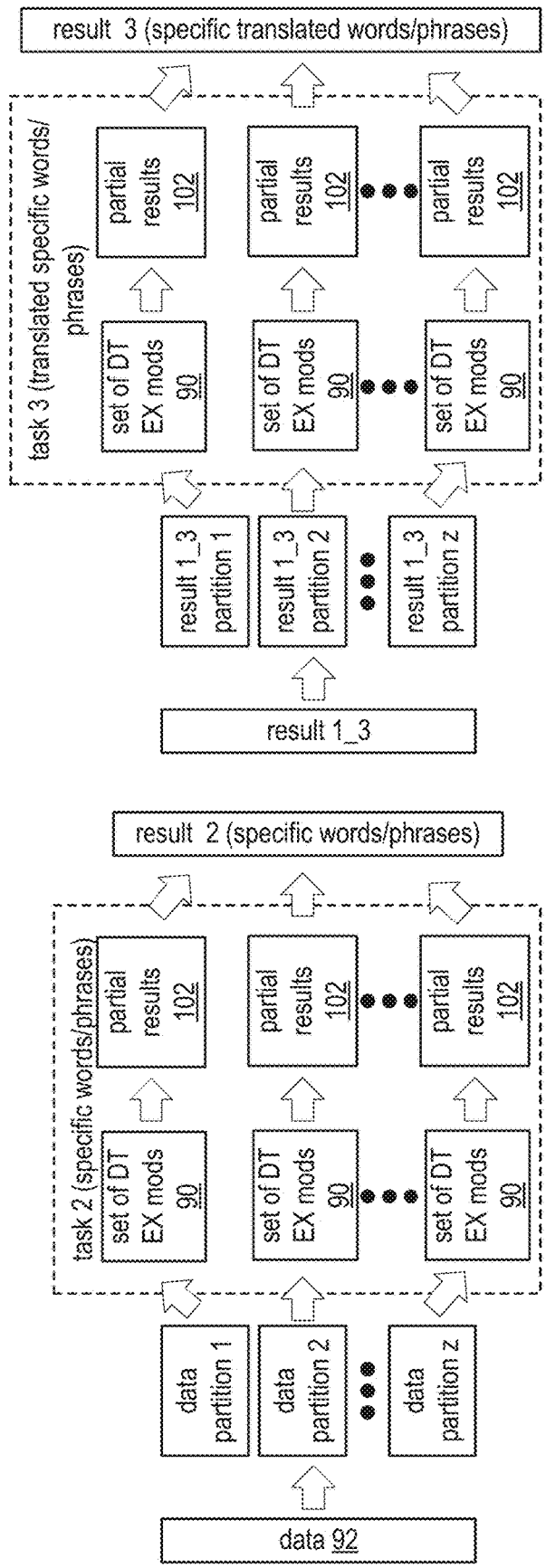
FIG. 37
FIG. 38
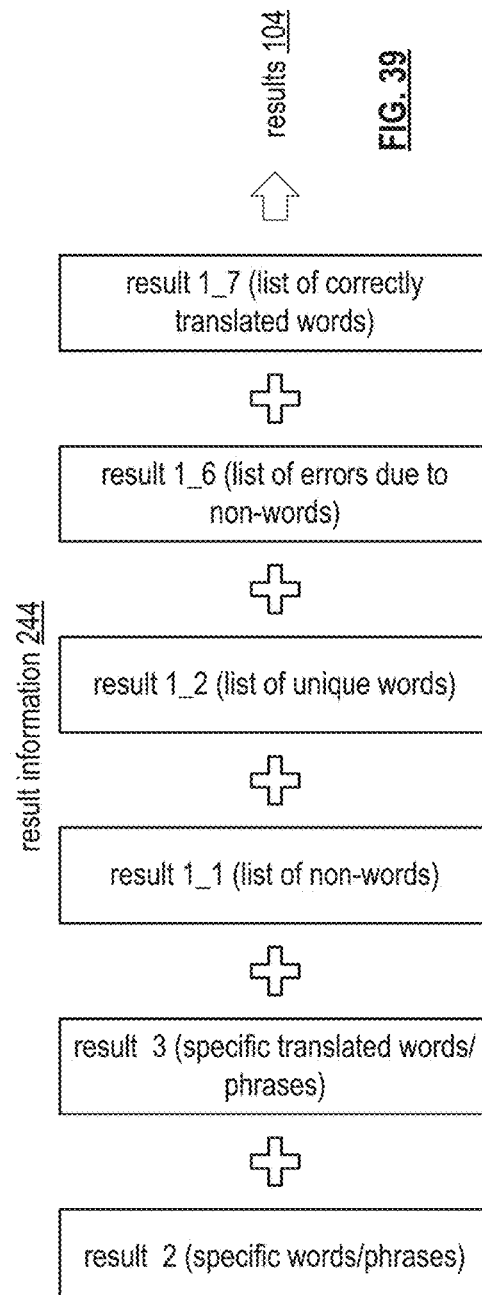
FIG. 39

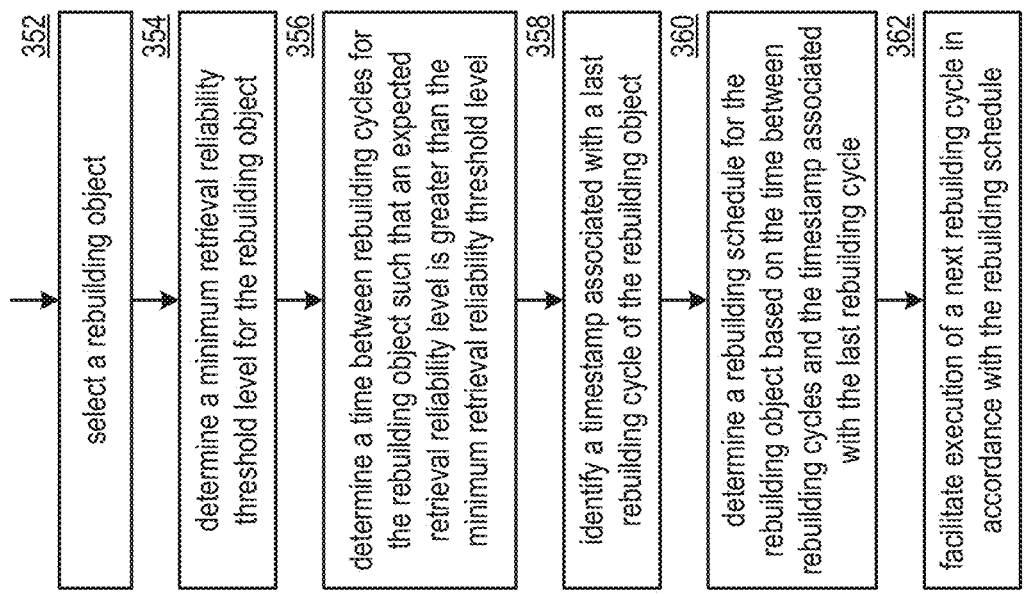

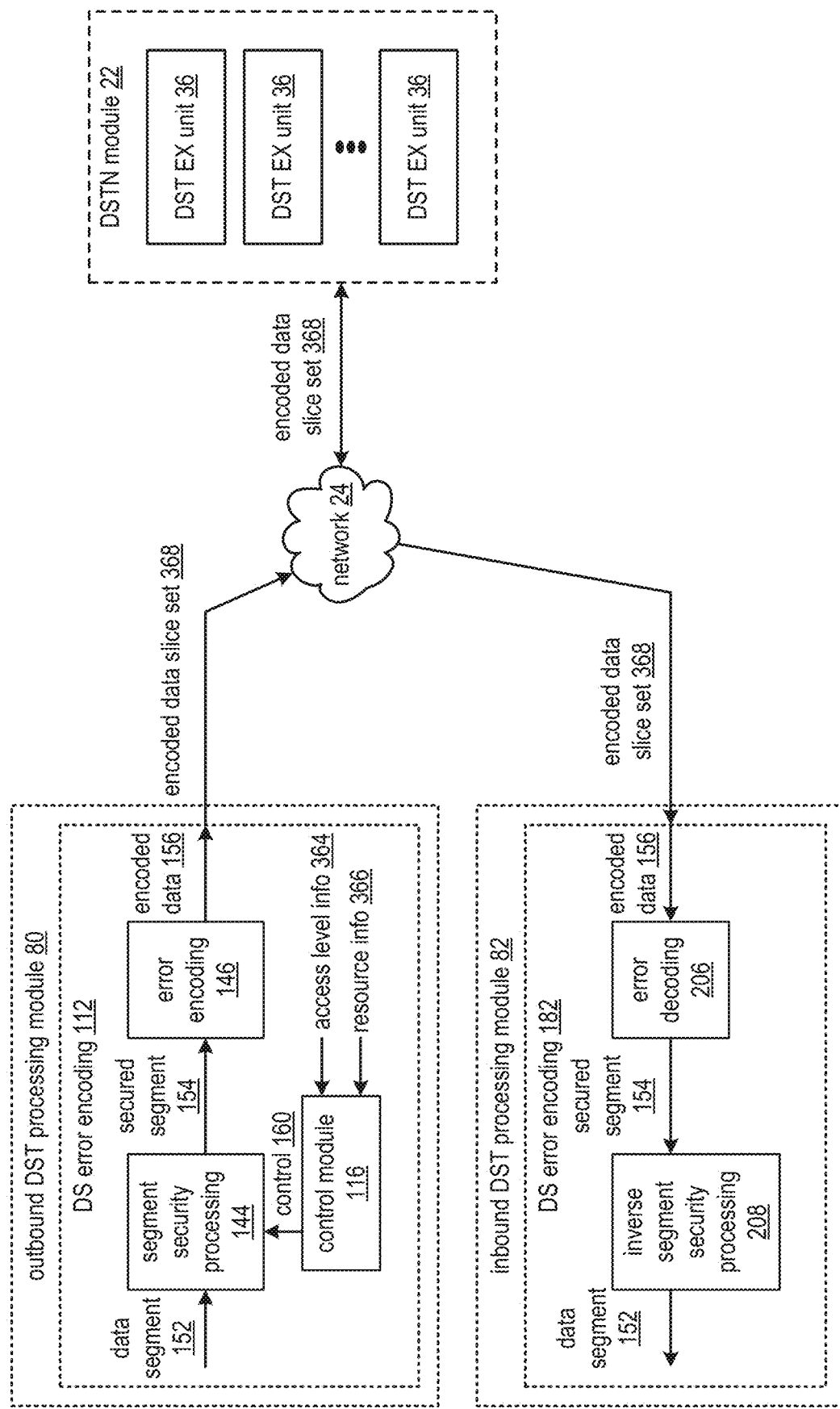

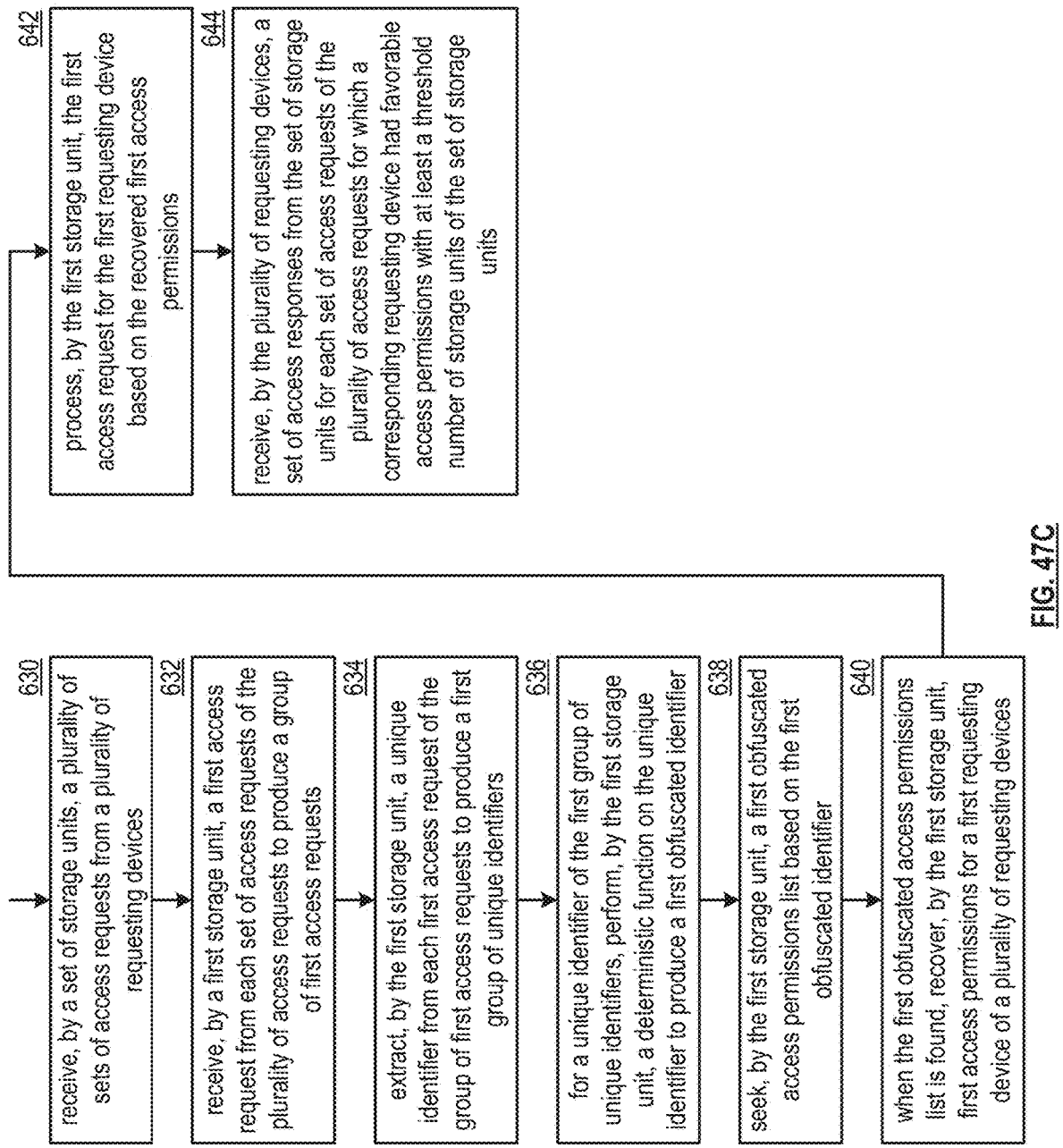

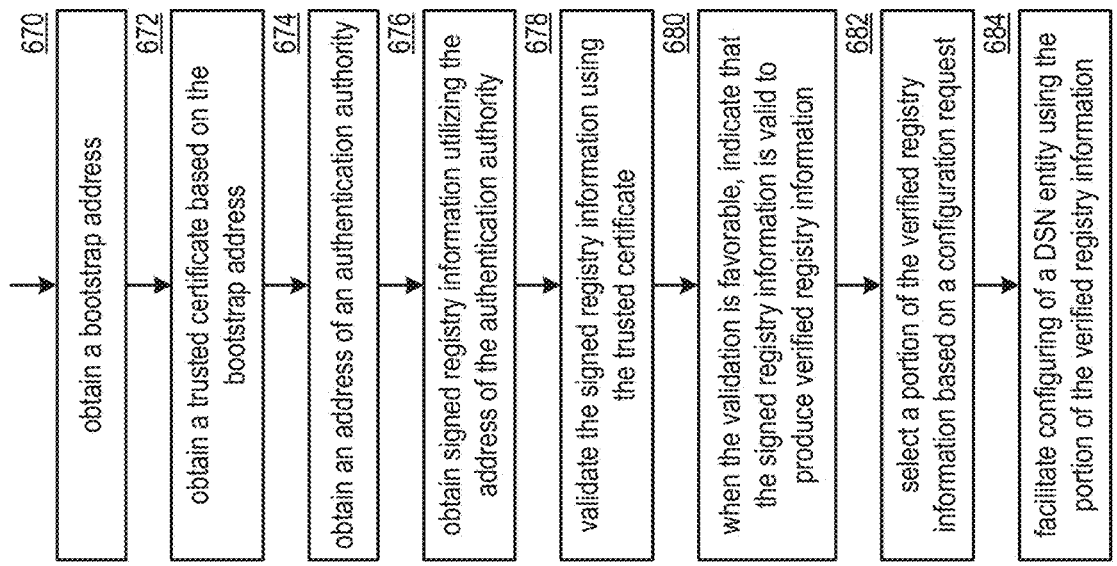

ADJUSTING EFFICIENCY OF STORING DATA IN A STORAGE NETWORK

CROSS REFERENCE TO RELATED PATENTS

The present U.S. Utility patent application claims priority pursuant to 35 U.S.C. § 120 as a continuation of U.S. Utility application Ser. No. 16/883,902, entitled "ADJUSTING DATA STORAGE EFFICIENCY OF DATA IN A STORAGE NETWORK", filed May 26, 2020, which is a continuation of U.S. Utility application Ser. No. 16/197,235, entitled "COMPRESSING A SLICE NAME LISTING IN A DISPERSED STORAGE NETWORK", filed Nov. 20, 2018, which is a continuation-in-part of U.S. Utility application Ser. No. 15/721,093, entitled "DISTRIBUTING REGISTRY INFORMATION IN A DISPERSED STORAGE NETWORK", filed Sep. 29, 2017, issued as U.S. Pat. No. 10,325,110 on Jun. 18, 2019, which is a continuation of U.S. Utility application Ser. No. 14/610,220, entitled "DISTRIBUTING REGISTRY INFORMATION IN A DISPERSED STORAGE NETWORK", filed Jan. 30, 2015, which claims priority pursuant to 35 U.S.C. § 119(e) to U.S. Provisional Application No. 61/974,142, entitled "SCHEDULING REBUILDING OF STORED DATA IN A DISPERSED STORAGE NETWORK", filed Apr. 2, 2014, expired, all of which are hereby incorporated herein by reference in their entirety and made part of the present U.S. Utility patent application for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

Technical Field of the Invention

This invention relates generally to computer networks and more particularly to dispersed storage of data and distributed task processing of data.

DESCRIPTION OF RELATED ART

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 24 is a schematic block diagram of an example of a storage operation of a DST execution unit in accordance with the present invention;

FIG. 32 is a diagram of an example of DST allocation information for the example of FIG. 30 in accordance with the present invention;

FIGS. 33-38 are schematic block diagrams of the DSTN module performing the example of FIG. 30 in accordance with the present invention;

FIG. 39 is a diagram of an example of combining result information into final results for the example of FIG. 30 in accordance with the present invention;

FIG. 40B is a flowchart illustrating an example of establishing a schedule for a rebuilding cycle in accordance with the present invention;

FIG. 41A is a schematic block diagram of another embodiment of a dispersed storage network in accordance with the present invention;

Figure 47A:
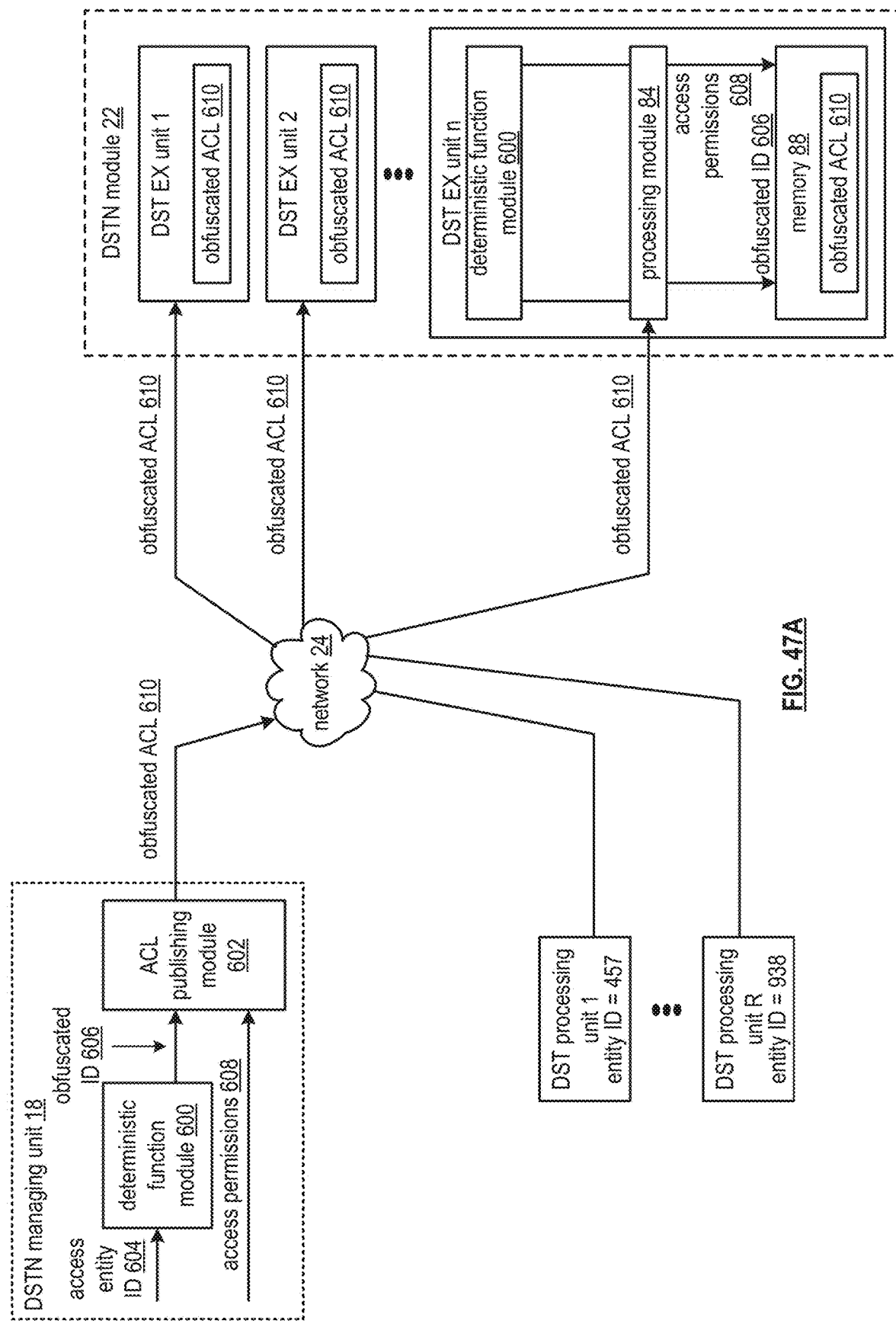
Figure 47B:
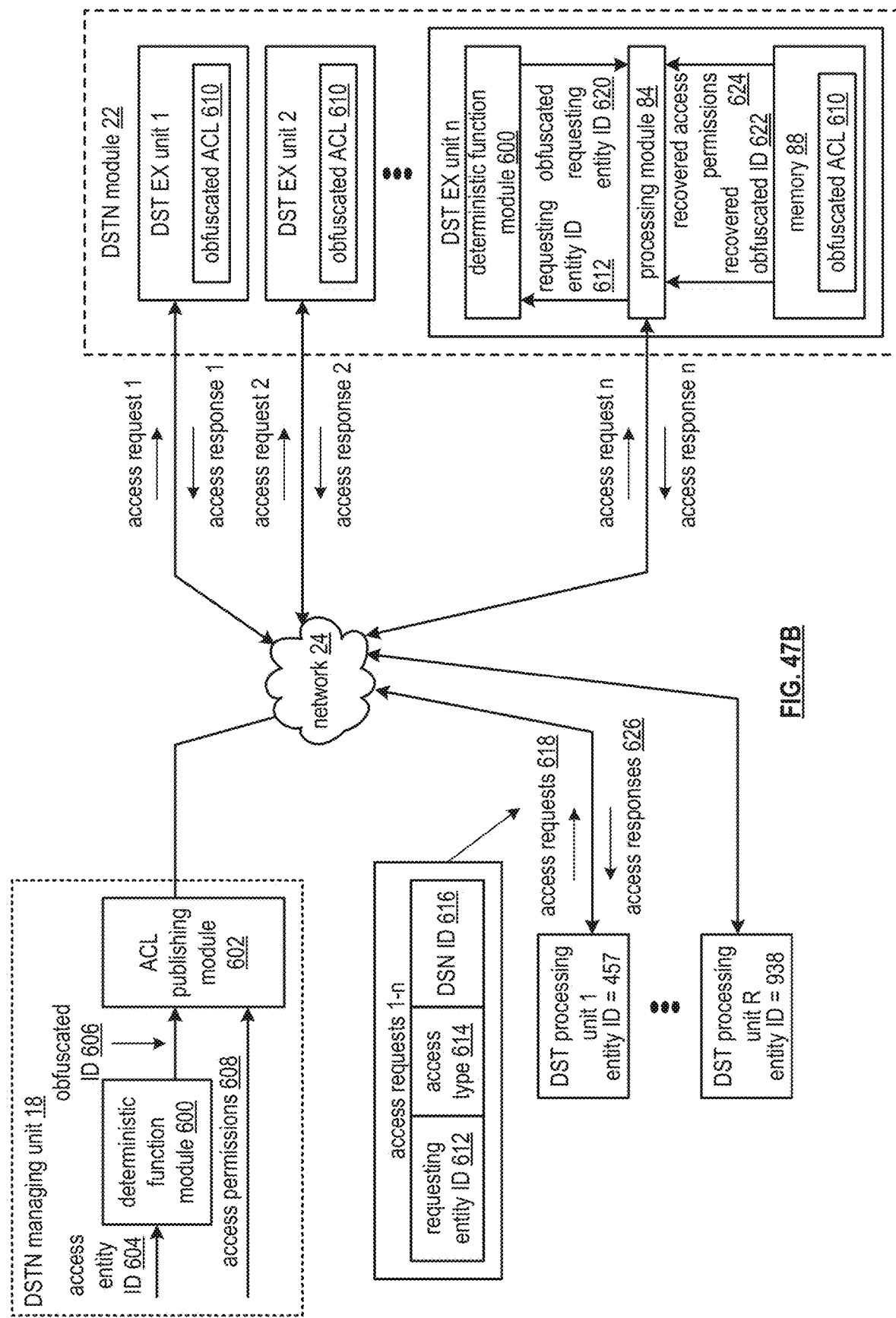
Figure 48A:
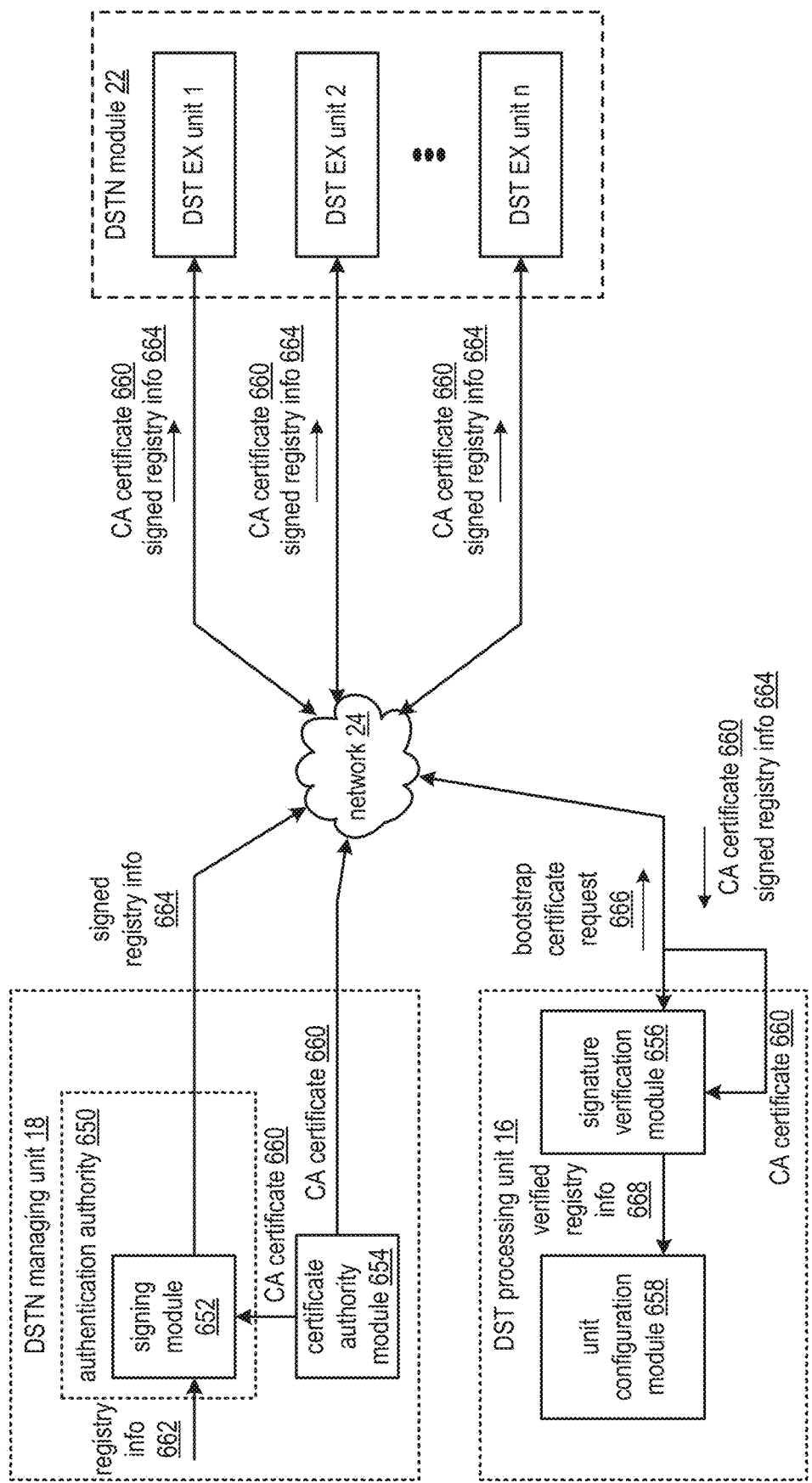

FIGS. 47A-B are schematic block diagrams of another embodiment of a dispersed storage network in accordance with the present invention;

FIG. 47C is a flowchart illustrating an example of controlling access in accordance with the present invention;

FIG. 48A is a schematic block diagram of another embodiment of a dispersed storage network in accordance with the present invention; and FIG. 48B is a flowchart illustrating an example of configuring a new entity of a dispersed storage network (DSN) in accordance with the present invention.

DETAILED DESCRIPTION OF THE INVENTION

Figure 1:
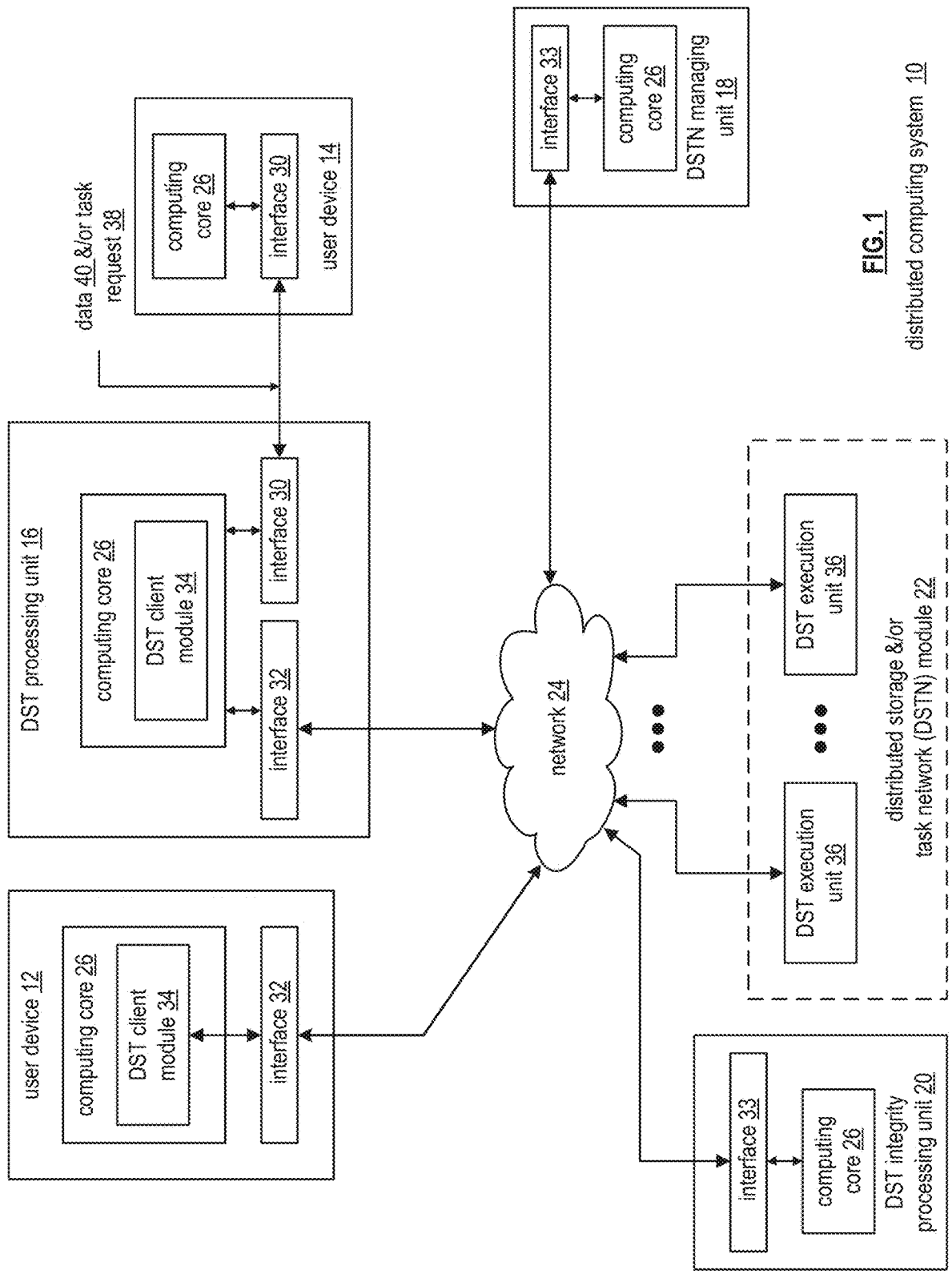
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general, and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g., or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
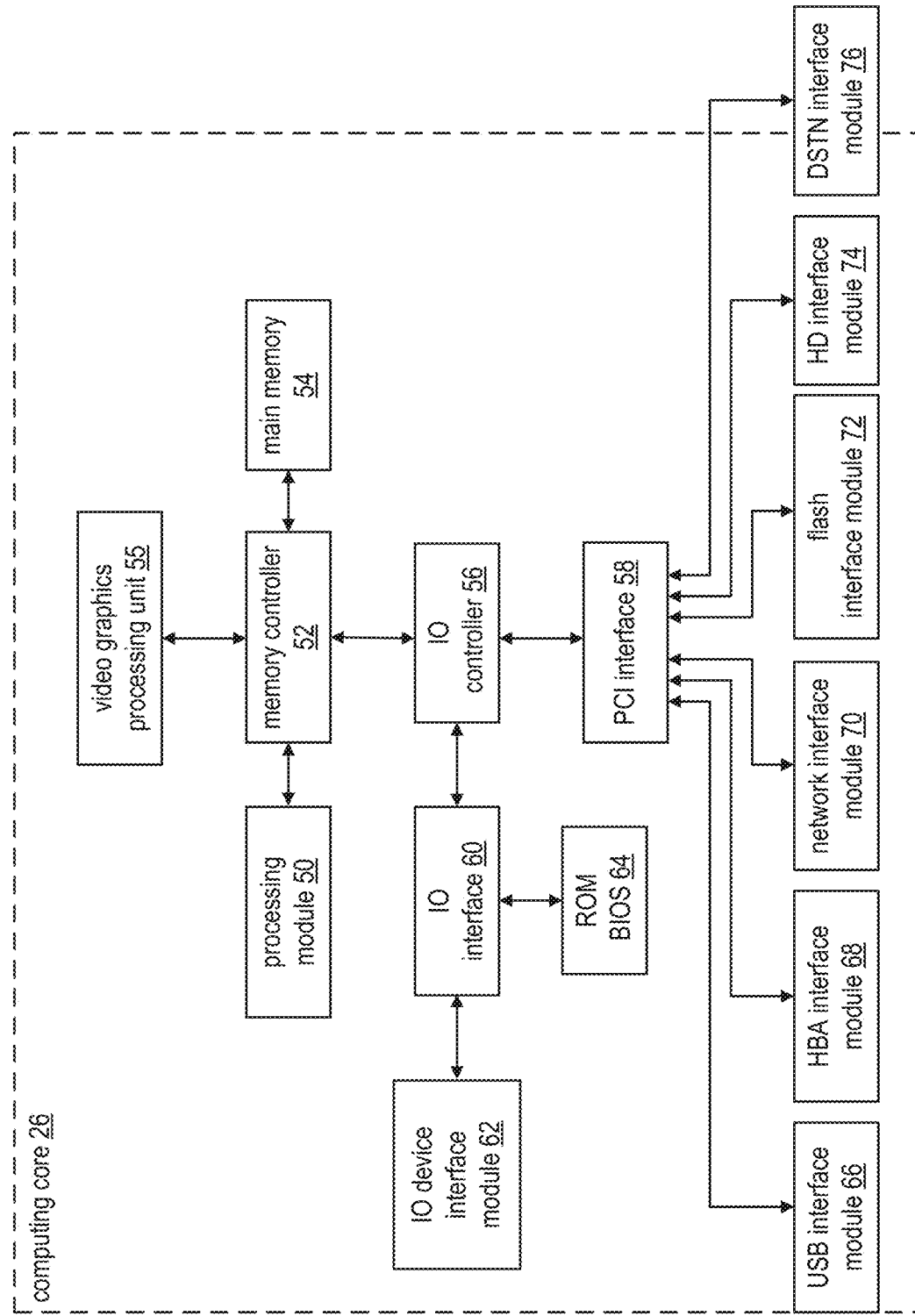
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
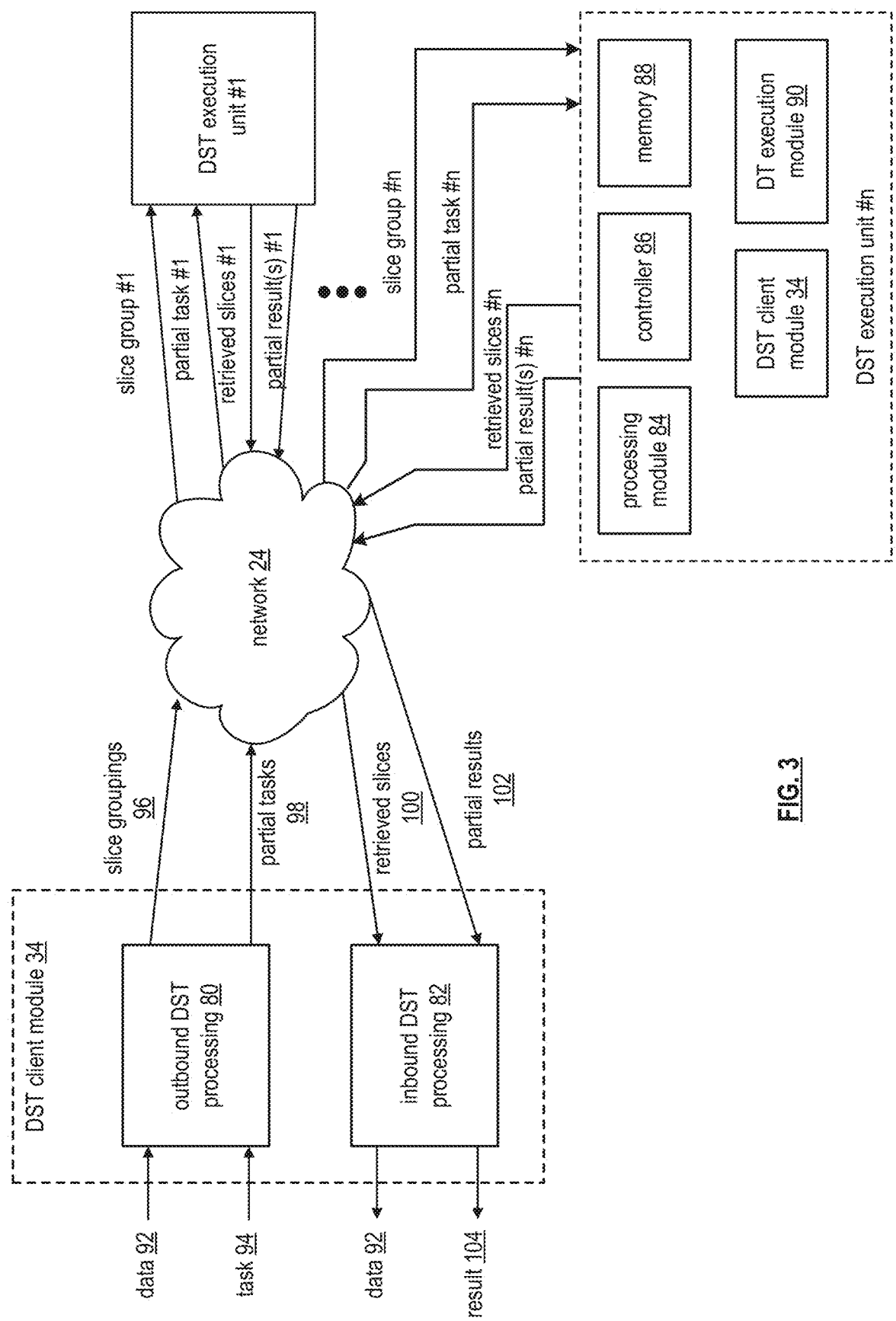
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-n that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-n includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terabytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terabytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-n.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
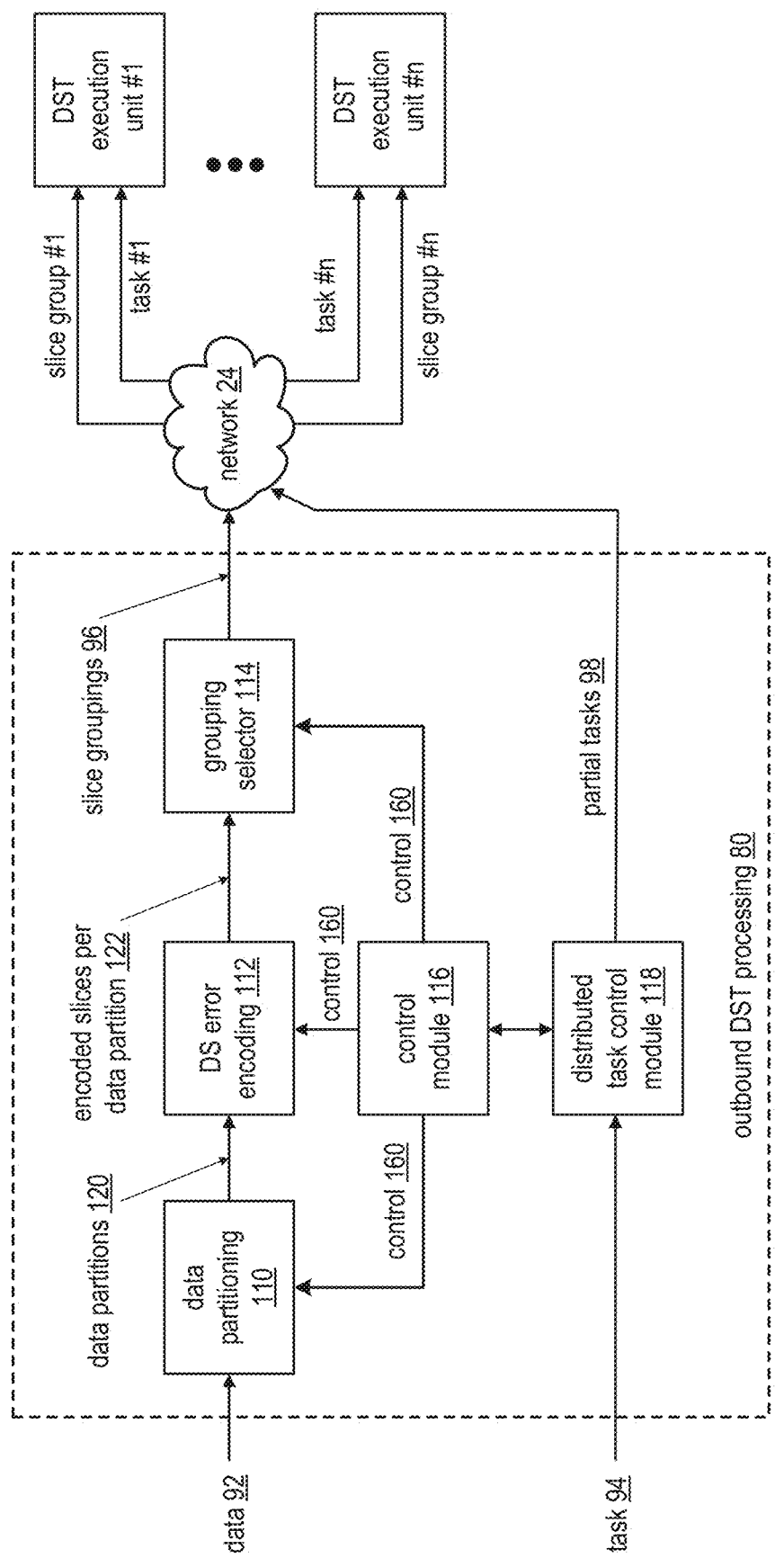
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terabytes) into 100,000 data segments, each being 1 Gigabyte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the grouping selector module groups the encoded slices 122 of a data partition into five slice groupings 96. The grouping selector module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, where in the data a second phrase occurs, and a total count for each phrase usage in the data. In this example, the distributed task control module 118 generates a first set of partial tasks 98 for finding and counting the first phrase and a second set of partial tasks for finding and counting the second phrase. The distributed task control module 118 sends respective first and/or second partial tasks 98 to each DST execution unit 36.

Figure 5:
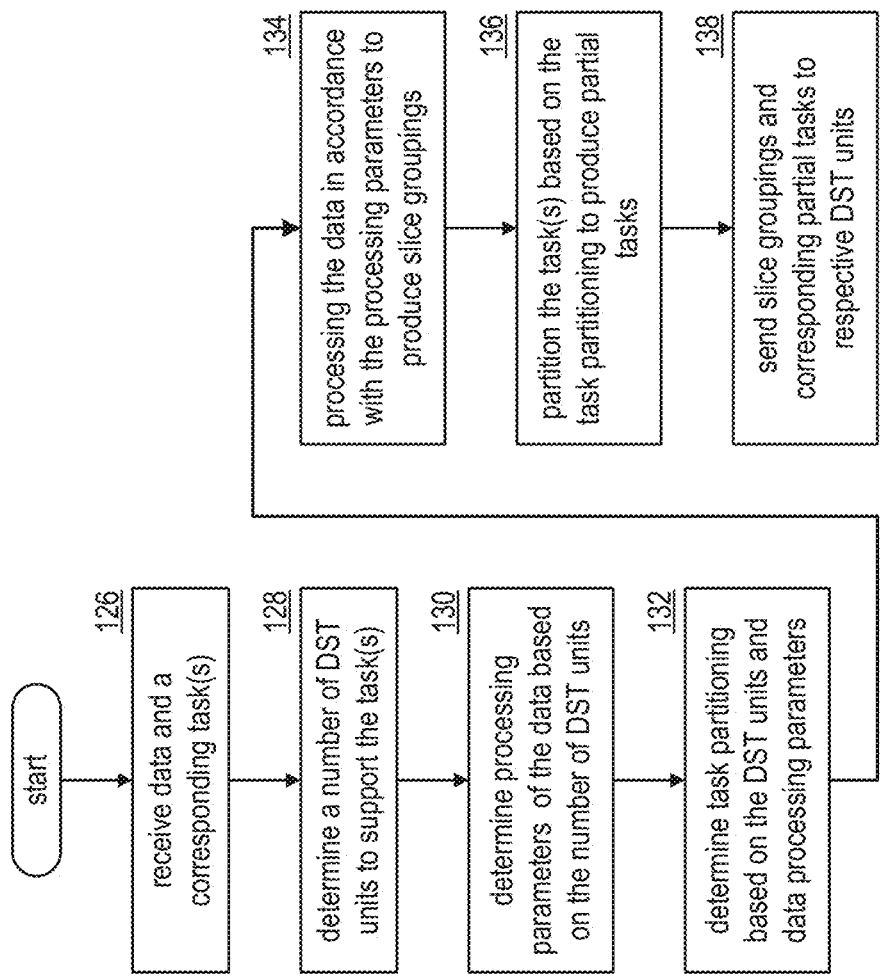
FIG. 5 is a logic diagram of an example of a method for outbound DST processing in accordance with the present invention.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.)), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to respective DST units.

Figure 6:
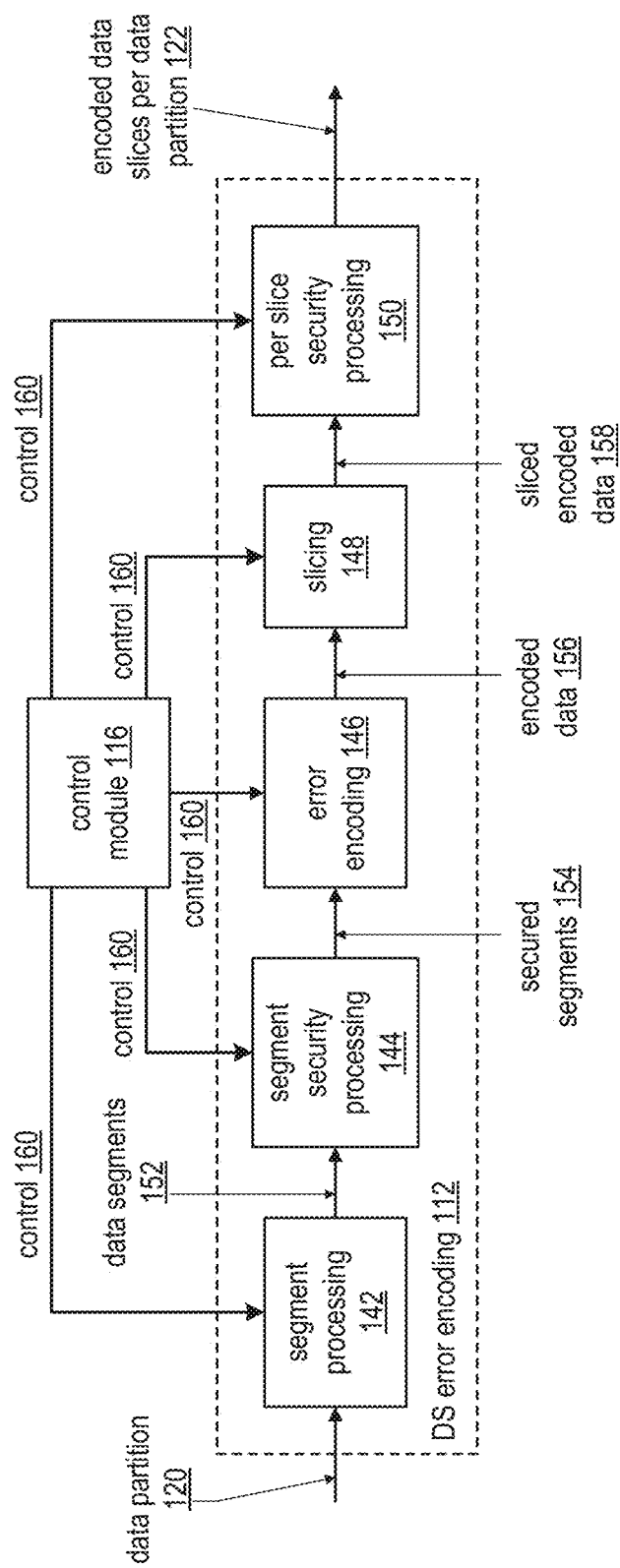
FIG. 6 is a schematic block diagram of an embodiment of a dispersed error encoding in accordance with the present invention.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check (CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of encoded data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112. Note that the control module 116 may be omitted and each module stores its own parameters.

Figure 7:
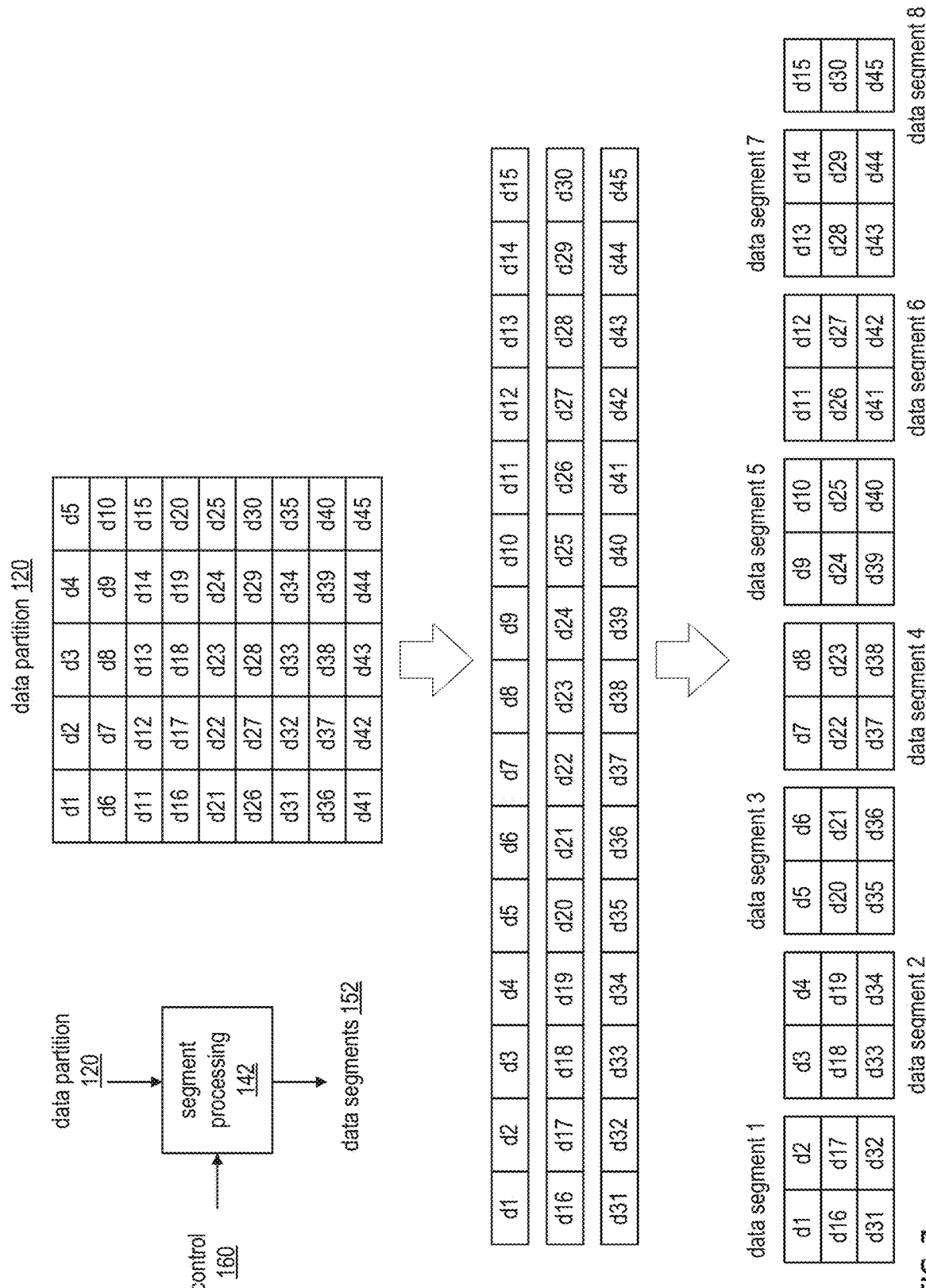
FIG. 7 is a diagram of an example of a segment processing of the dispersed error encoding in accordance with the present invention.

FIG. 7 is a diagram of an example of a segment processing of a dispersed storage (DS) error encoding module. In this example, a segment processing module 142 receives a data partition 120 that includes 45 data blocks (e.g., d1-d45), receives segmenting information (i.e., control information 160) from a control module, and segments the data partition 120 in accordance with the control information 160 to produce data segments 152. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks; and the third row of the 8 data segments in sequential order of the last 15 data blocks. Note that the number of data blocks, the grouping of the data blocks into segments, and size of the data blocks may vary to accommodate the desired distributed task processing function.

Figure 8:
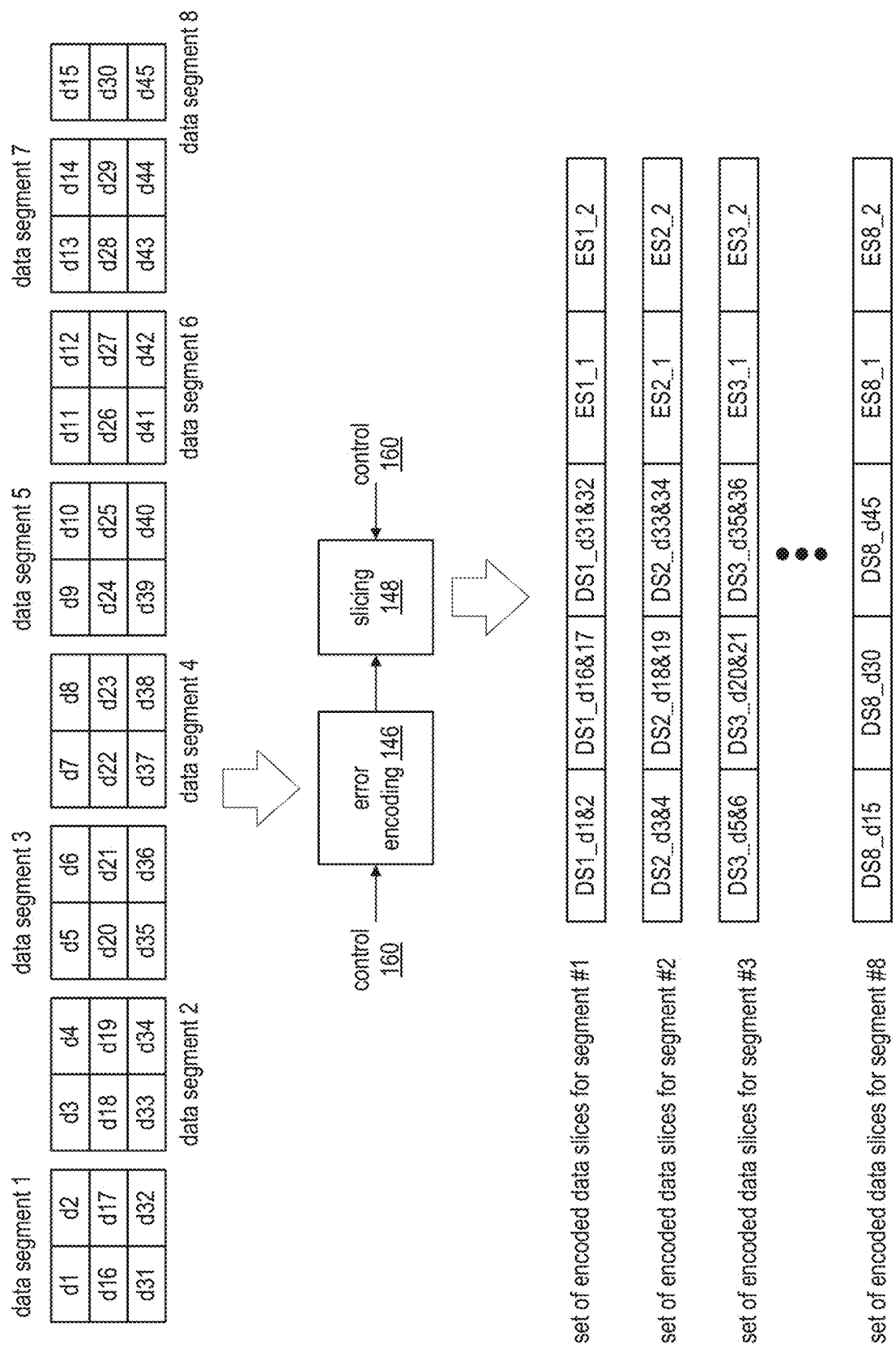
FIG. 8 is a diagram of an example of error encoding and slicing processing of the dispersed error encoding in accordance with the present invention.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3, the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_d1&2) of the first set of encoded data slices (e.g., corresponding to data segment 1) is substantially similar to content of the first word (e.g., d1 & d2); the content of the second encoded data slice (DS1_d16&17) of the first set of encoded data slices is substantially similar to content of the second word (e.g., d16 & d17); and the content of the third encoded data slice (DS1_d31&32) of the first set of encoded data slices is substantially similar to content of the third word (e.g., d31 & d32). The content of the fourth and fifth encoded data slices (e.g., ES1_1 and ES1_2) of the first set of encoded data slices include error correction data based on the first-third words of the first data segment. With such an encoding and slicing scheme, retrieving any three of the five encoded data slices allows the data segment to be accurately reconstructed.

The encoding and slicing of data segments 2-7 yield sets of encoded data slices similar to the set of encoded data slices of data segment 1. For instance, the content of the first encoded data slice (DS2_d3&4) of the second set of encoded data slices (e.g., corresponding to data segment 2) is substantially similar to content of the first word (e.g., d3 & d4); the content of the second encoded data slice (DS2_d18&19) of the second set of encoded data slices is substantially similar to content of the second word (e.g., d18 & d19); and the content of the third encoded data slice (DS2_d33&34) of the second set of encoded data slices is substantially similar to content of the third word (e.g., d33 & d34). The content of the fourth and fifth encoded data slices (e.g., ES1_1 and ES1_2) of the second set of encoded data slices includes error correction data based on the first-third words of the second data segment.

Figure 9:
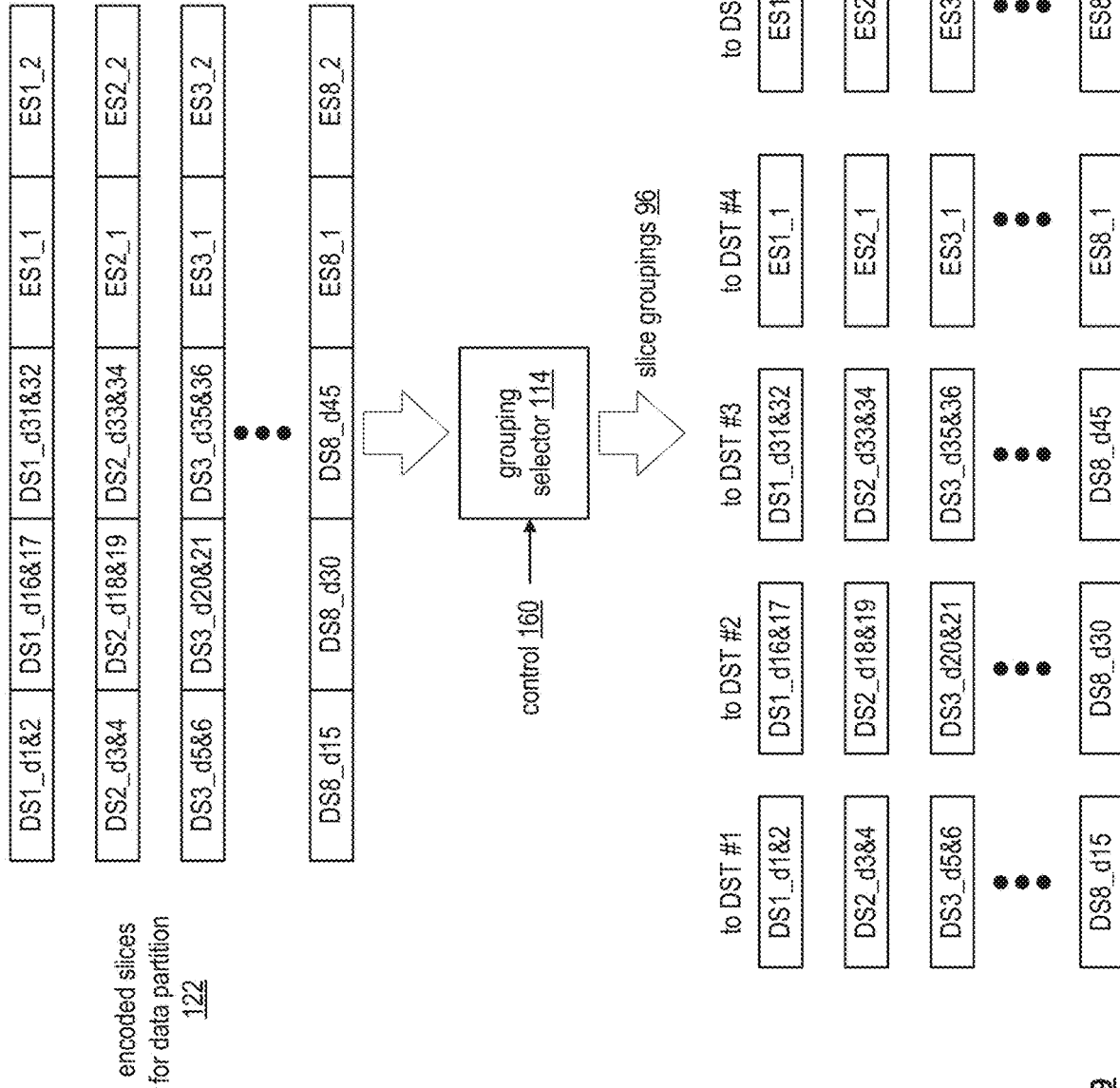
FIG. 9 is a diagram of an example of grouping selection processing of the outbound DST processing in accordance with the present invention.

FIG. 9 is a diagram of an example of grouping selection processing of an outbound distributed storage and task (DST) processing in accordance with group selection information as control information 160 from a control module. Encoded slices for data partition 122 are grouped in accordance with the control information 160 to produce slice groupings 96. In this example, a grouping selector module 114 organizes the encoded data slices into five slice groupings (e.g., one for each DST execution unit of a distributed storage and task network (DSTN) module). As a specific example, the grouping selector module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data).

The grouping selector module 114 also creates a second slice grouping for a DST execution unit #2, which includes second encoded slices of each of the sets of encoded slices. As such, the second DST execution unit receives encoded data slices corresponding to data blocks 16-30. The grouping selector module 114 further creates a third slice grouping for DST execution unit #3, which includes third encoded slices of each of the sets of encoded slices. As such, the third DST execution unit receives encoded data slices corresponding to data blocks 31-45.

The grouping selector module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selector module 114 further creates a fifth slice grouping for DST execution unit #5, which includes fifth encoded slices of each of the sets of encoded slices. As such, the fifth DST execution unit receives encoded data slices corresponding to second error encoding information.

Figure 10:
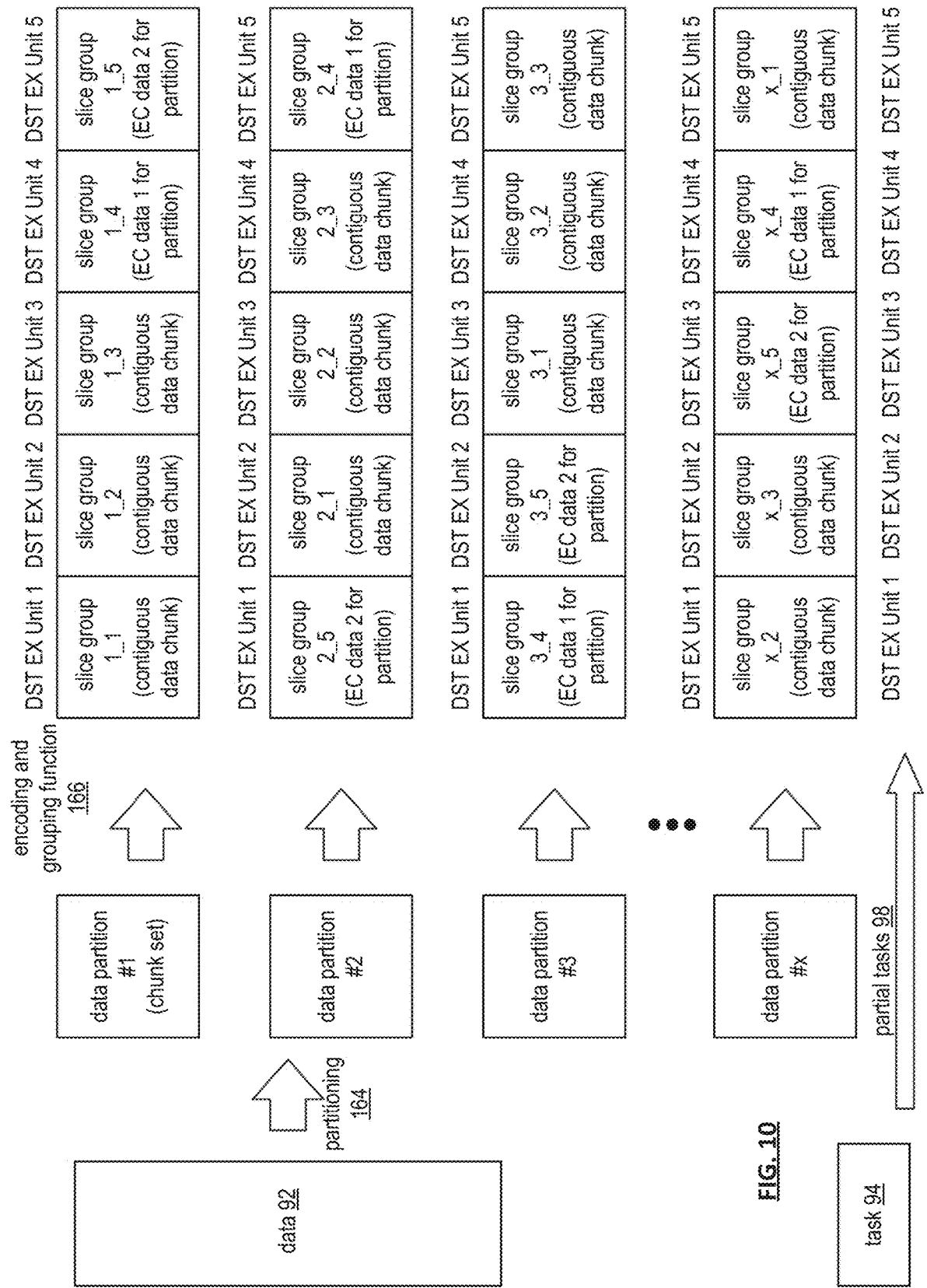
FIG. 10 is a diagram of an example of converting data into slice groups in accordance with the present invention.

FIG. 10 is a diagram of an example of converting data 92 into slice groups that expands on the preceding figures. As shown, the data 92 is partitioned in accordance with a partitioning function 164 into a plurality of data partitions (1-x, where x is an integer greater than 4). Each data partition (or chunkset of data) is encoded and grouped into slice groupings as previously discussed by an encoding and grouping function 166. For a given data partition, the slice groupings are sent to distributed storage and task (DST) execution units. From data partition to data partition, the ordering of the slice groupings to the DST execution units may vary.

For example, the slice groupings of data partition #1 is sent to the DST execution units such that the first DST execution receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc.

For the second data partition, the slice groupings may be sent to the DST execution units in a different order than it was done for the first data partition. For instance, the first slice grouping of the second data partition (e.g., slice group 2_1) is sent to the second DST execution unit; the second slice grouping of the second data partition (e.g., slice group 2_2) is sent to the third DST execution unit; the third slice grouping of the second data partition (e.g., slice group 2_3) is sent to the fourth DST execution unit; the fourth slice grouping of the second data partition (e.g., slice group 2_4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task is divided into partial tasks that are sent to the DST execution units in conjunction with the slice groupings of the data partitions.

Figure 11:
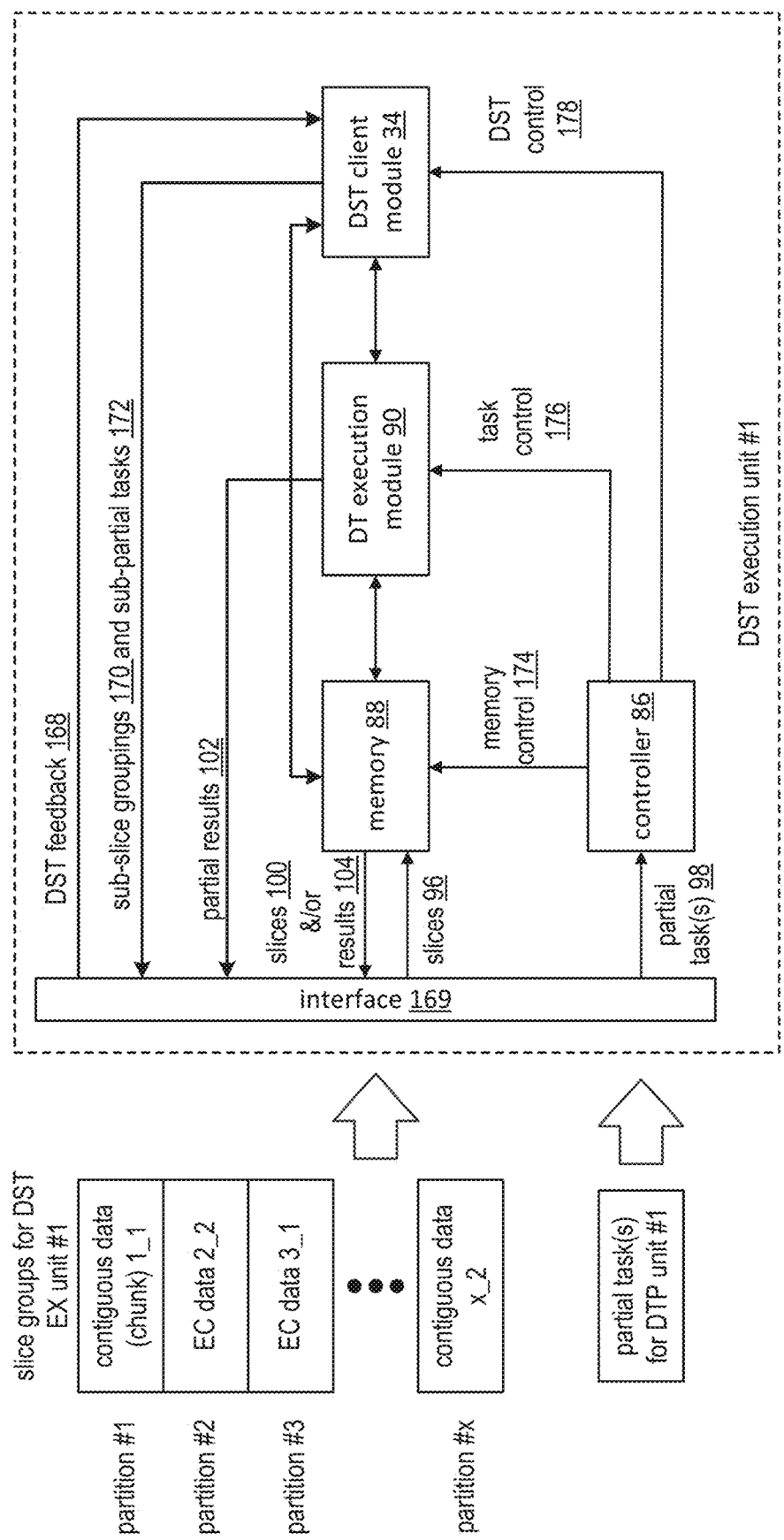
FIG. 11 is a schematic block diagram of an embodiment of a DST execution unit in accordance with the present invention.

FIG. 11 is a schematic block diagram of an embodiment of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and #x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results 102 may also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identify other DST execution units. The DST client module 34 functions in a similar manner as the DST client module 34 of FIGS. 3-10 to produce the sub-partial tasks 172 and the sub-slice groupings 170 in accordance with the distribution instructions.

The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST executions units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 in the memory 88. For example, when the partial task 98 includes a retrieval request, the controller 86 outputs the memory control 174 to the memory 88 to facilitate retrieval of slices 100 and/or results 104.

Figure 12:
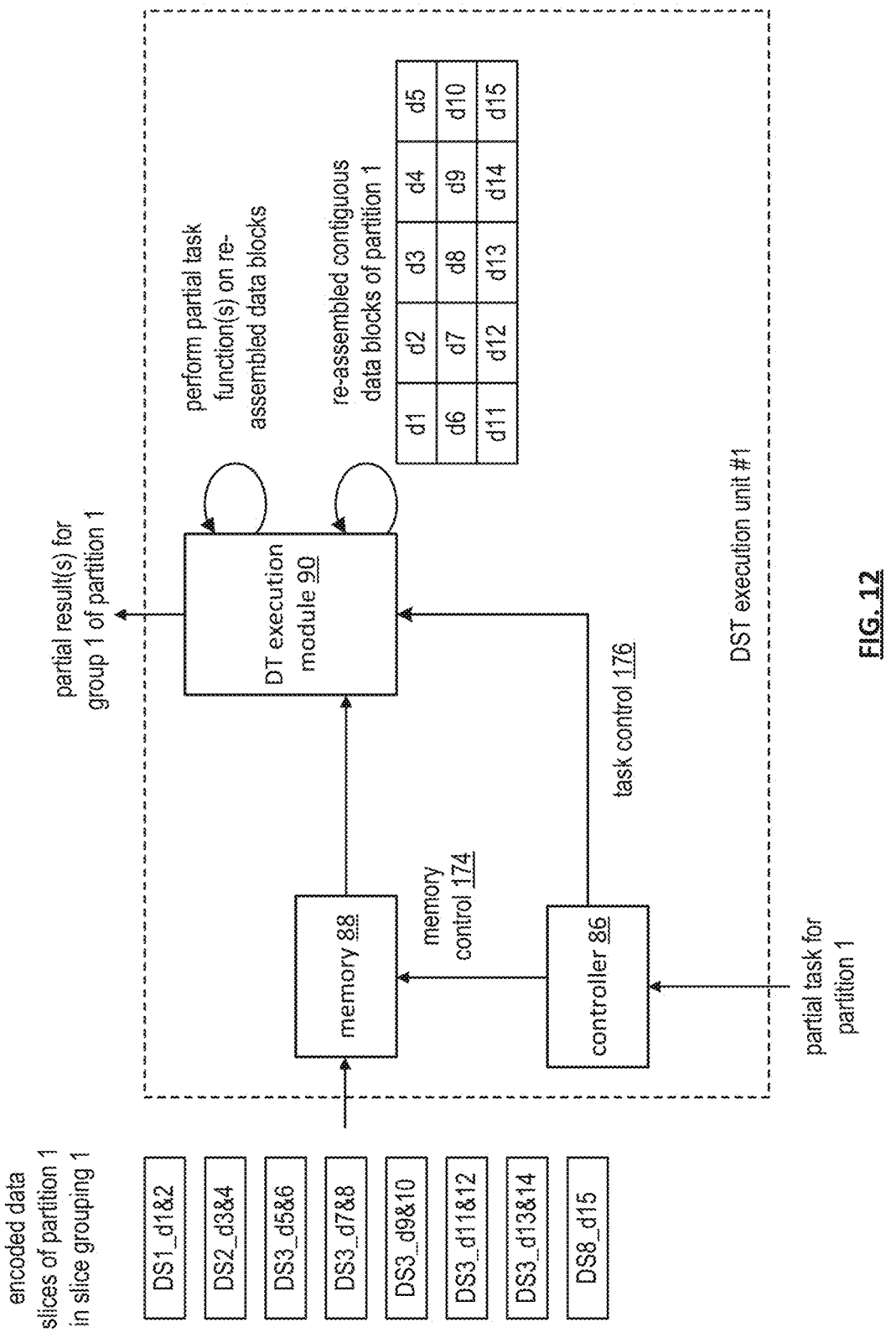
FIG. 12 is a schematic block diagram of an example of operation of a DST execution unit in accordance with the present invention.

FIG. 12 is a schematic block diagram of an example of operation of a distributed storage and task (DST) execution unit storing encoded data slices and executing a task thereon. To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first step of executing the task in accordance with the task control information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks. The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
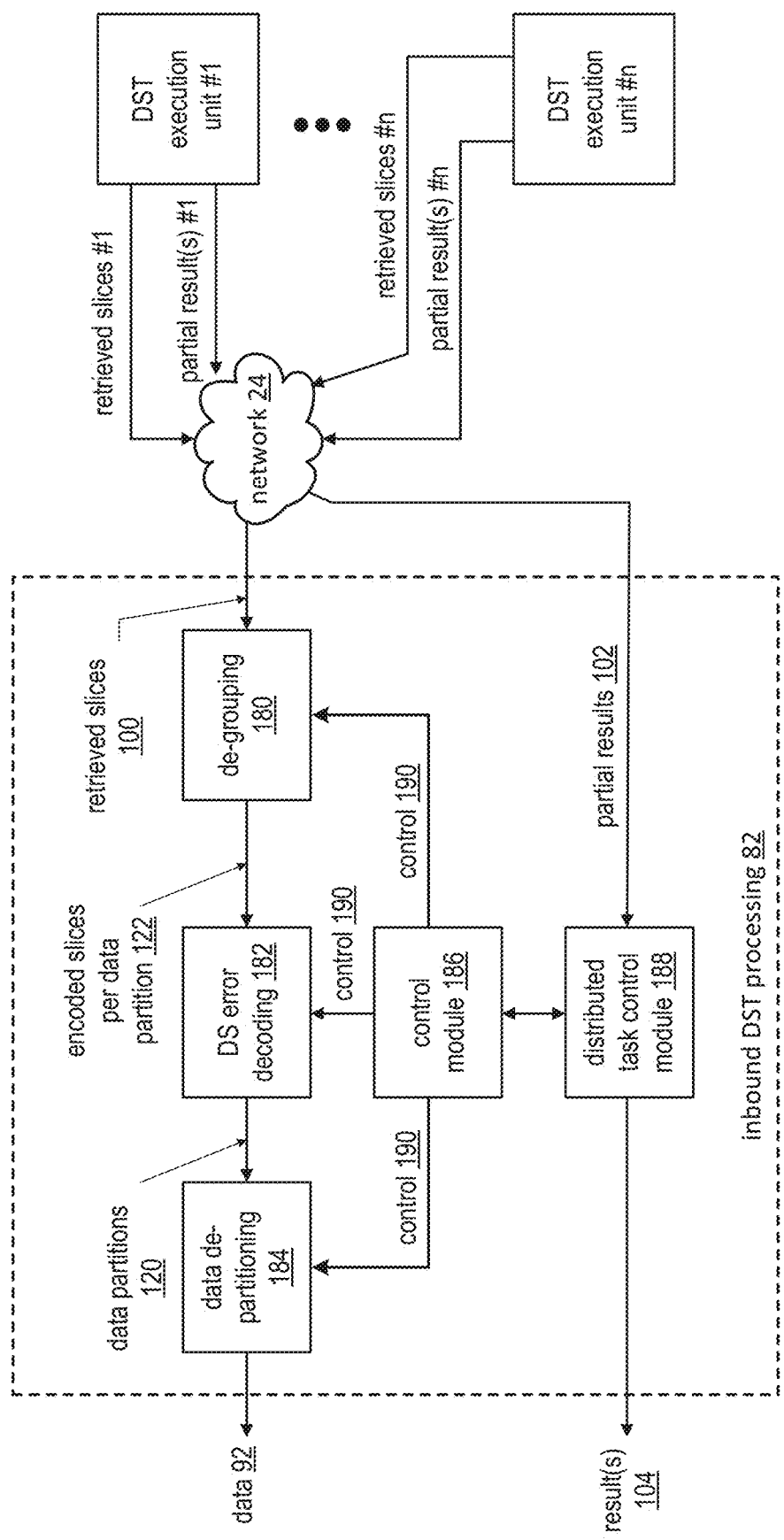
FIG. 13 is a schematic block diagram of an embodiment of an inbound distributed storage and/or task (DST) processing in accordance with the present invention.

FIG. 13 is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102. The inbound DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieved slices 100 into the data 92 using control signals 190 to each of the modules. For instance, the control module 186 provides de-grouping information to the de-grouping module 180, provides the DS error encoding parameters to the DS error decoding module 182, and provides de-partitioning information to the data de-partitioning module 184.

Figure 14:
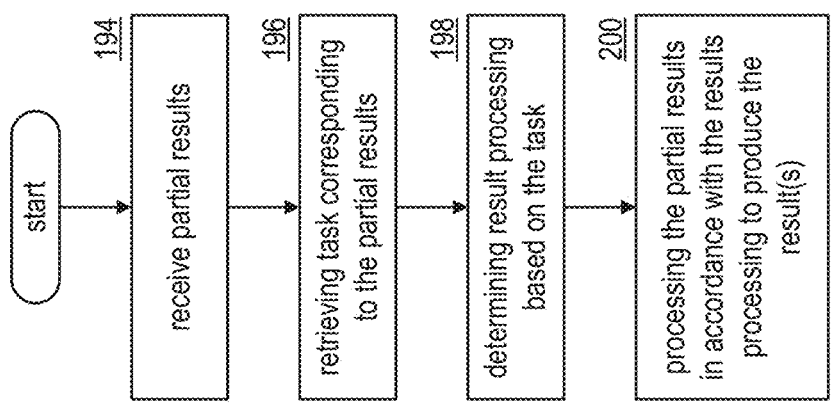
FIG. 14 is a logic diagram of an example of a method for inbound DST processing in accordance with the present invention.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, results of processing the information would indicate to add the partial results to produce the final results. The method continues at step 200 where the DST client module processes the partial results in accordance with the result processing information to produce the final result or results.

Figure 15:
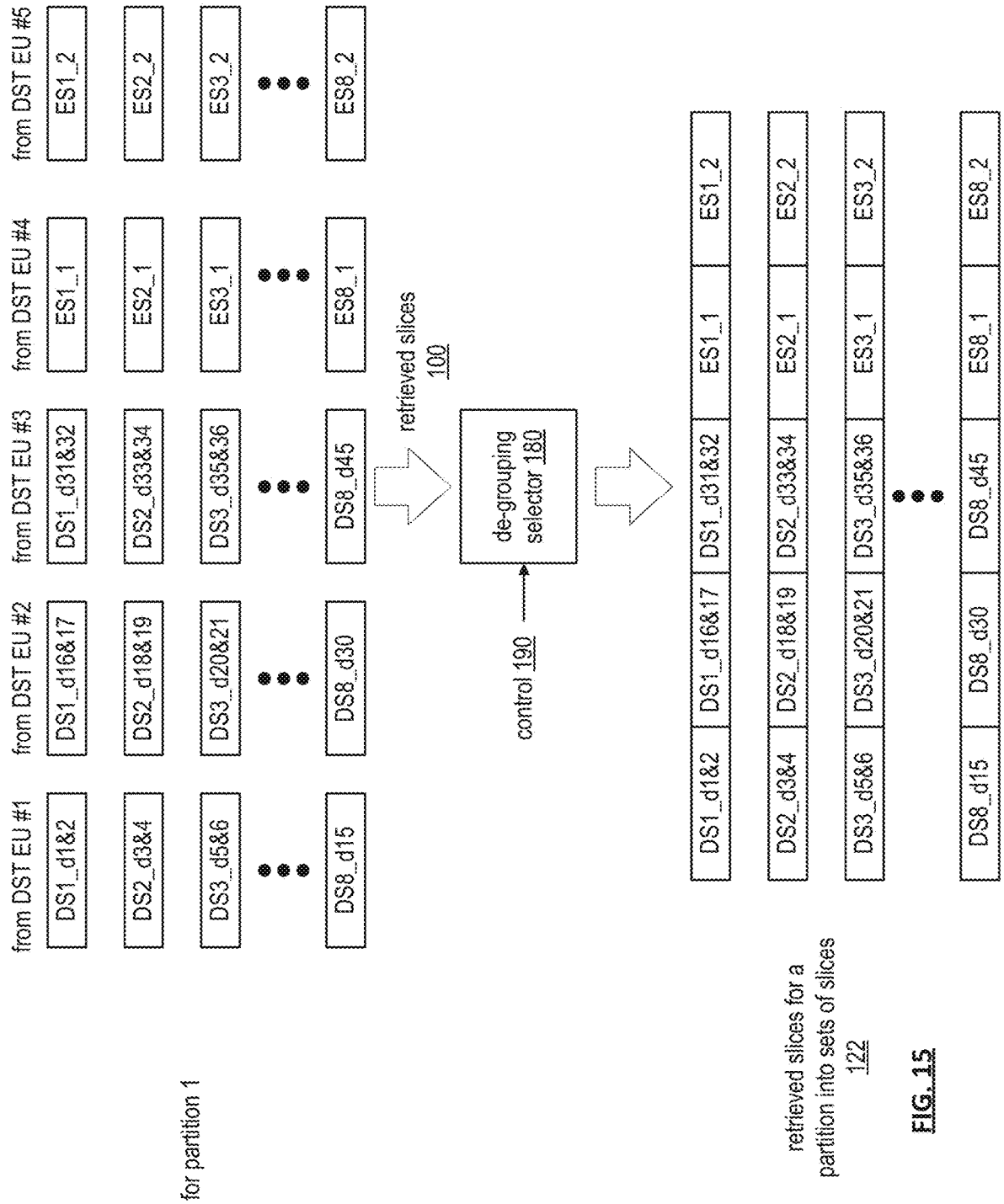
FIG. 15 is a diagram of an example of de-grouping selection processing of the inbound DST processing in accordance with the present invention.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30); DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings (e.g., received slices 100) using a de-grouping selector 180 controlled by a control signal 190 as shown in the example to produce a plurality of sets of encoded data slices (e.g., retrieved slices for a partition into sets of slices 122). Each set corresponding to a data segment of the data partition.

Figure 16:
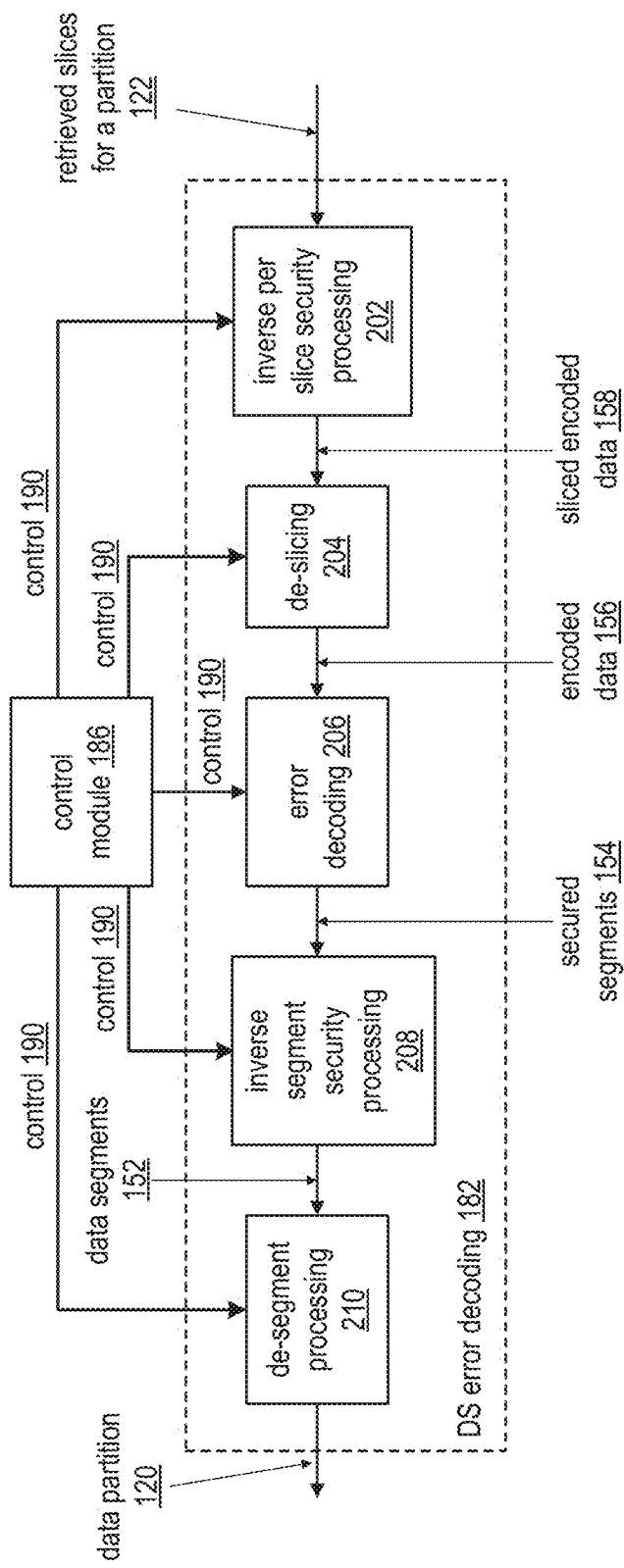
FIG. 16 is a schematic block diagram of an embodiment of a dispersed error decoding in accordance with the present invention.

FIG. 16 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, unsecures each encoded data slice 122 based on slice de-security information received as control information 190 (e.g., the compliment of the slice security information discussed with reference to FIG. 6) received from the control module 186. The slice security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments 154 based on segment security information received as control information 190 from the control module 186. The segment security information includes data decompression, decryption, de-watermarking, integrity check (e.g., CRC, etc.) verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
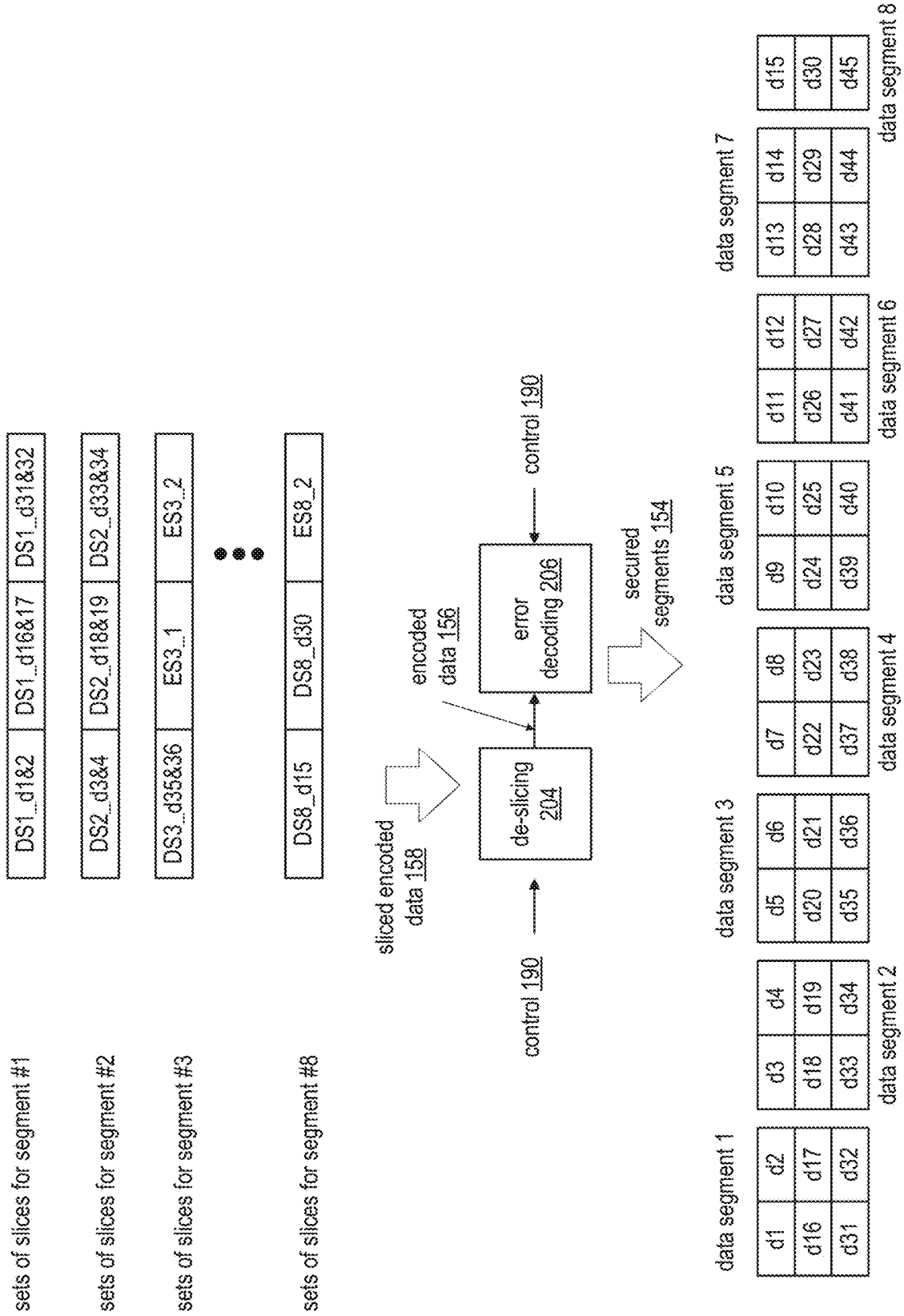
FIG. 17 is a diagram of an example of de-slicing and error decoding processing of the dispersed error decoding in accordance with the present invention.

FIG. 17 is a diagram of an example of de-slicing and error decoding processing of a dispersed error decoding module. A de-slicing module 204 receives at least a decode threshold number of encoded data slices 158 for each data segment in accordance with control information 190 and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1_d1&d2) or an error code based encoded data slice (e.g., ES3_1).

An error decoding module 206 decodes the encoded data 156 of each data segment in accordance with the error correction decoding parameters of control information 190 to produce secured segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
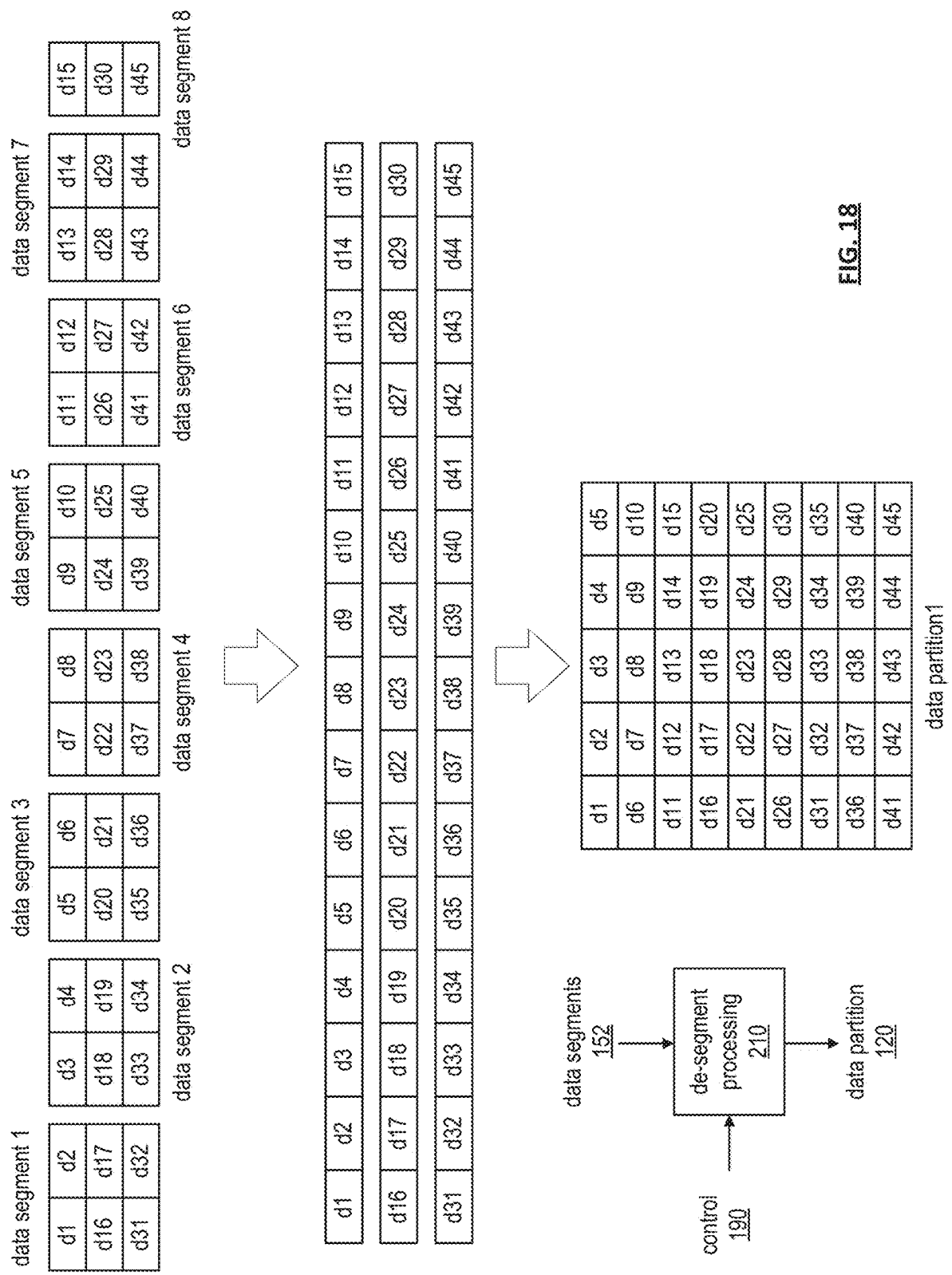
FIG. 18 is a diagram of an example of a de-segment processing of the dispersed error decoding in accordance with the present invention.

FIG. 18 is a diagram of an example of de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks.

The de-segmenting module 210 converts the rows and columns of data blocks into the data partition 120. Note that each data block may be of the same size as other data blocks or of a different size. In addition, the size of each data block may be a few bytes to megabytes of data.

Figure 19:
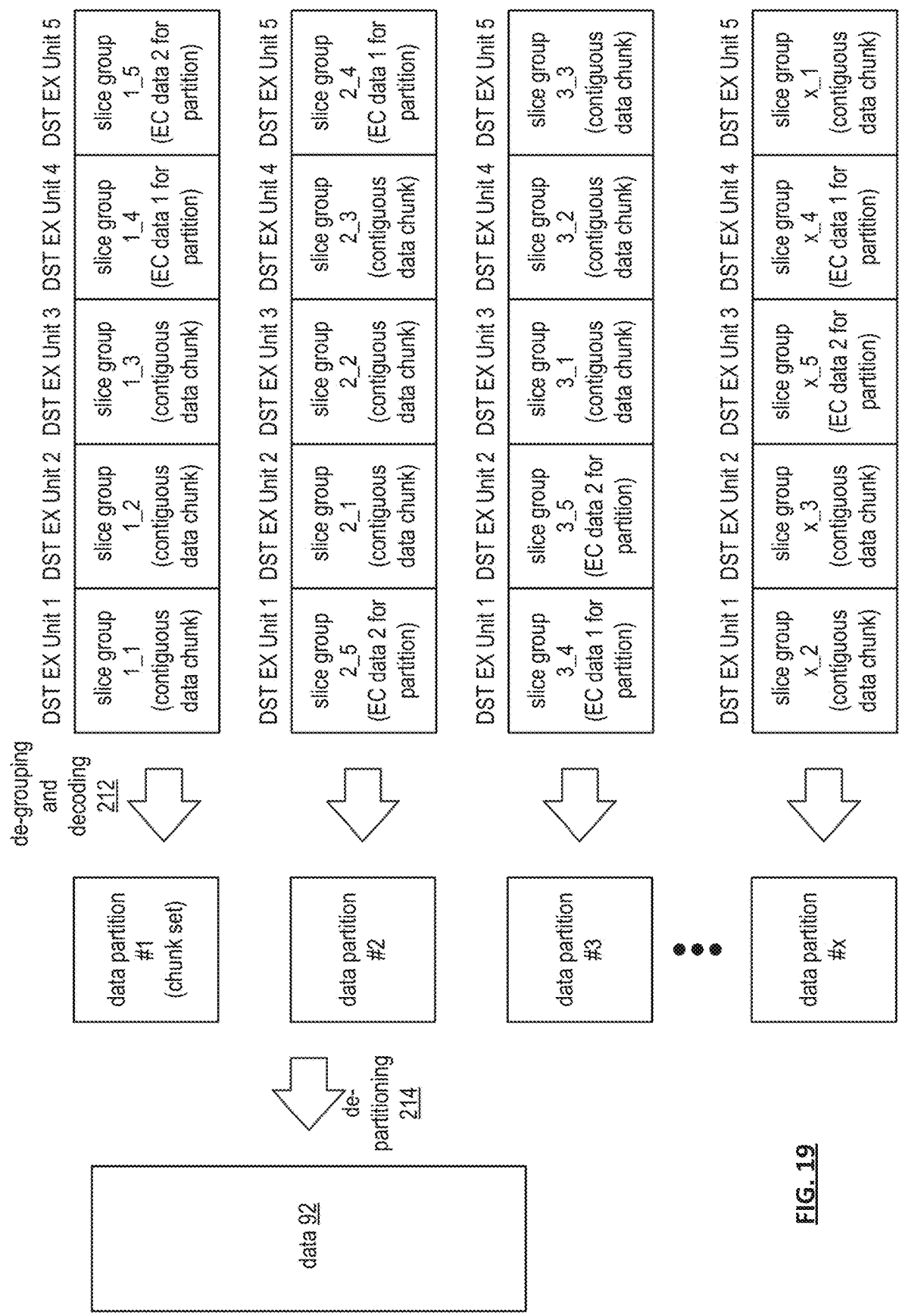
FIG. 19 is a diagram of an example of converting slice groups into data in accordance with the present invention.

FIG. 19 is a diagram of an example of converting slice groups into data 92 within an inbound distributed storage and task (DST) processing section. As shown, the data 92 is reconstructed from a plurality of data partitions (1-x, where x is an integer greater than 4). Each data partition (or chunk set of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
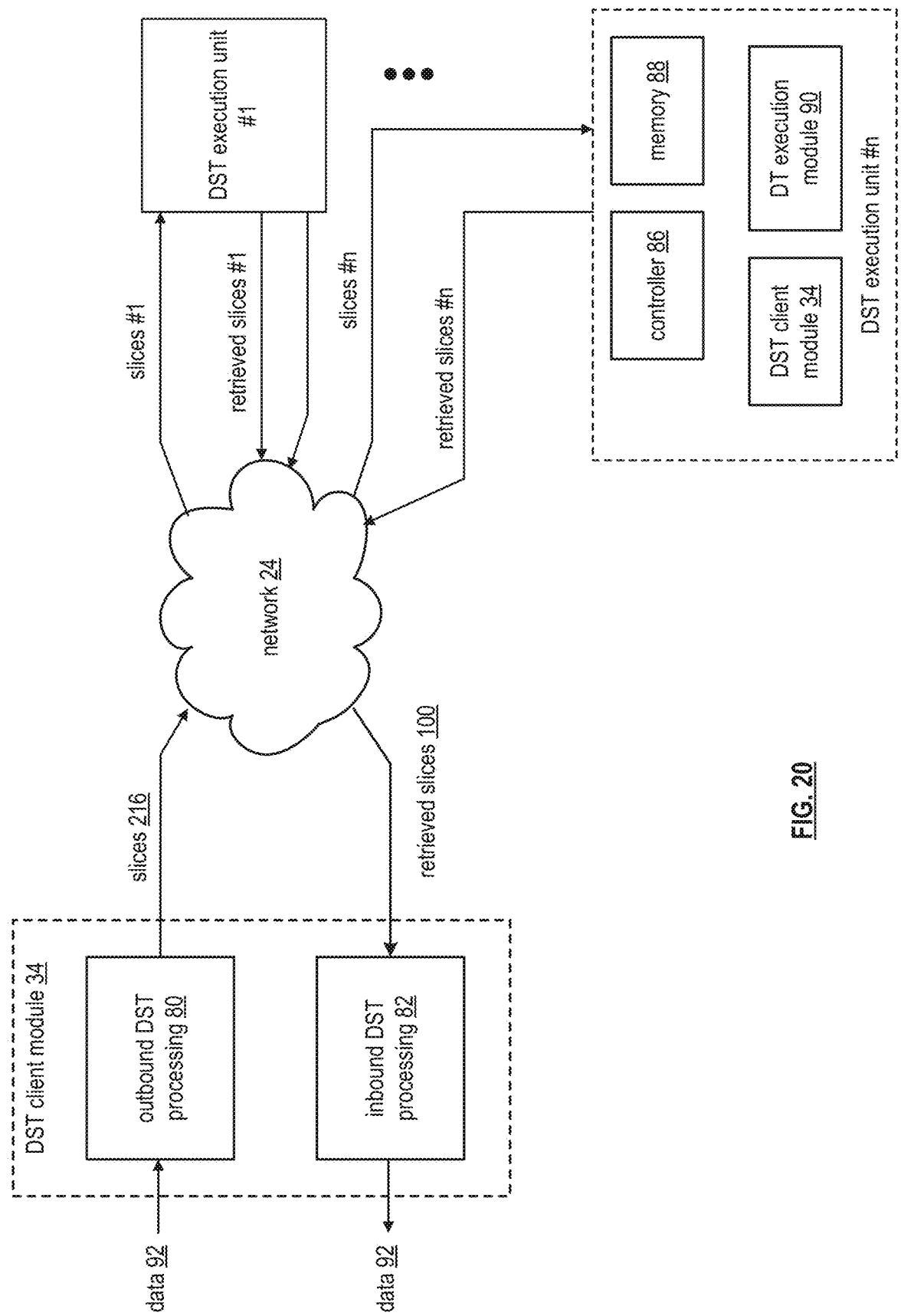
FIG. 20 is a diagram of an example of a distributed storage within the distributed computing system in accordance with the present invention.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
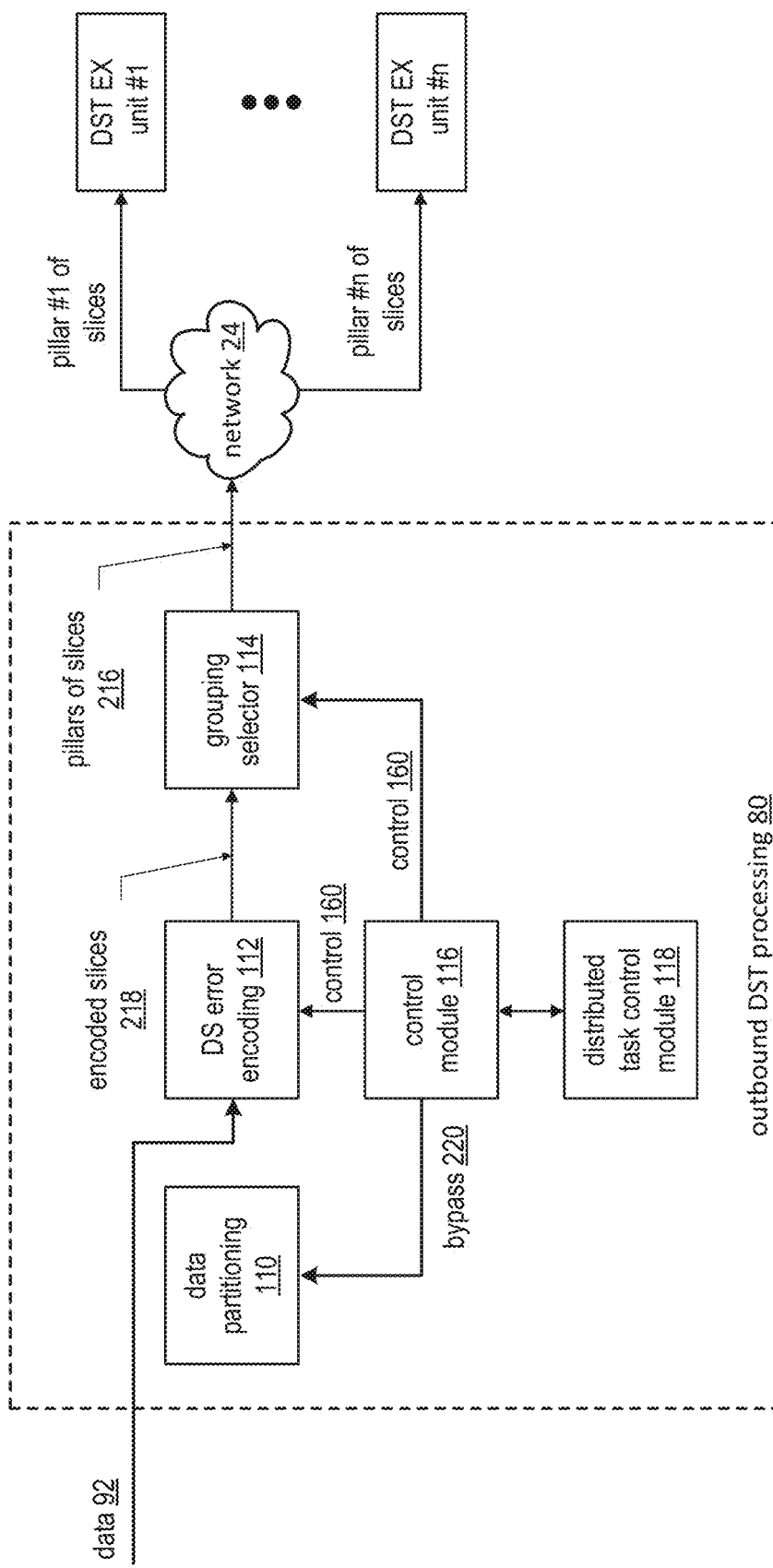
FIG. 21 is a schematic block diagram of an example of operation of outbound distributed storage and/or task (DST) processing for storing data in accordance with the present invention.

FIG. 21 is a schematic block diagram of an embodiment of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC, etc.)), error encoding, slicing, and/or per slice security processing (e.g., encryption, compression, watermarking, integrity check (e.g., CRC, etc.)). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 218 of the data segments into pillars of slices 216. The number of pillars corresponds to the pillar width of the DS error encoding parameters. In this example, the distributed task control module 118 facilitates the storage request.

Figure 22:
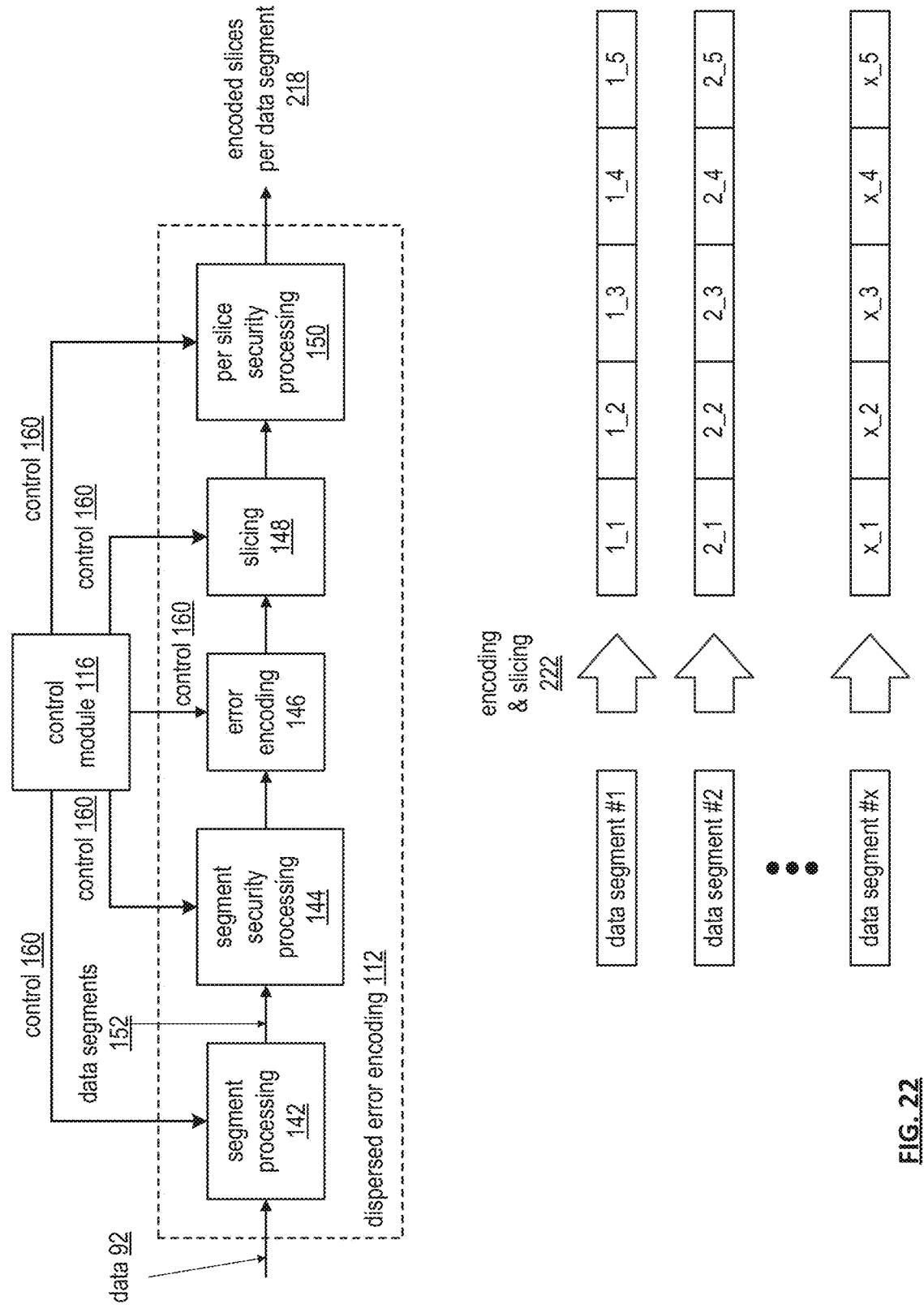
FIG. 22 is a schematic block diagram of an example of a dispersed error encoding for the example of FIG. 21 in accordance with the present invention.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC, etc.), and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC, etc.), and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

Figure 23:
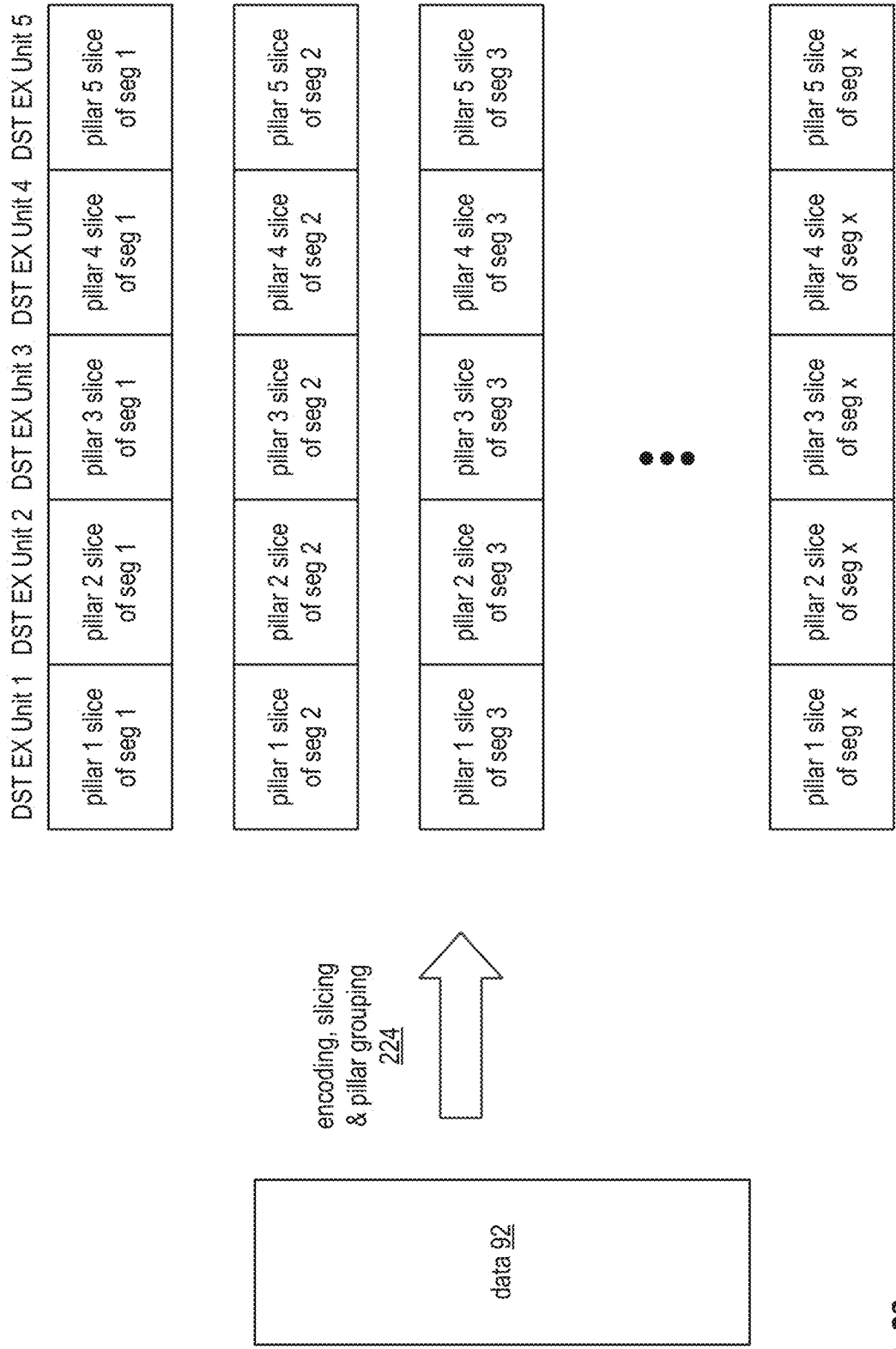
FIG. 23 is a diagram of an example of converting data into pillar slice groups for storage in accordance with the present invention.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selector module organizes the sets of encoded data slices into pillars of data slices. In this example, the DS error encoding parameters include a pillar width of 5 and a decode threshold of 3. As such, for each data segment, 5 encoded data slices are created.

The grouping selector module takes the first encoded data slice of each of the sets and forms a first pillar, which may be sent to the first DST execution unit. Similarly, the grouping selector module creates the second pillar from the second slices of the sets; the third pillar from the third slices of the sets; the fourth pillar from the fourth slices of the sets; and the fifth pillar from the fifth slices of the set.

FIG. 24 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

Figure 25:
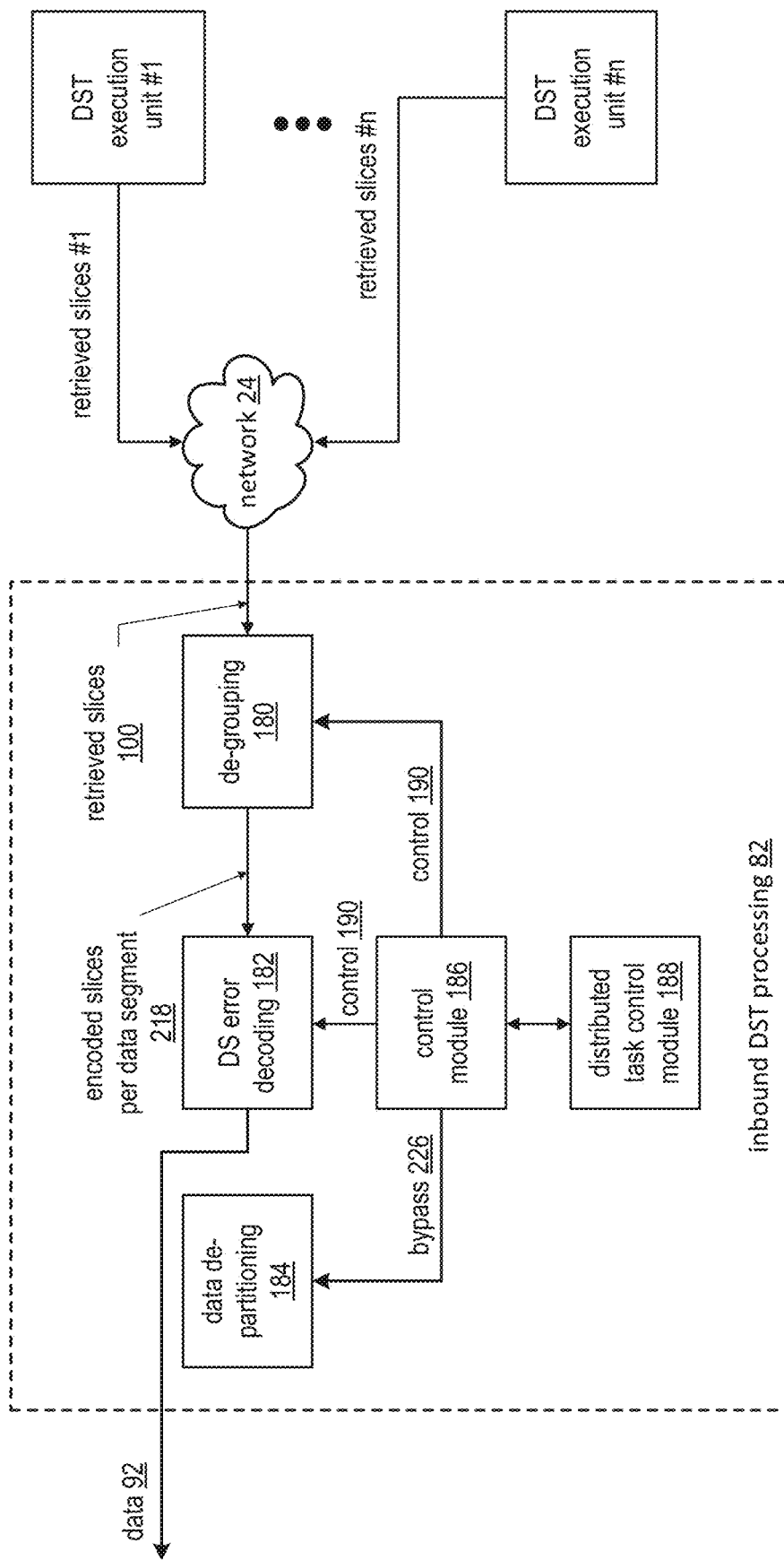
FIG. 25 is a schematic block diagram of an example of operation of inbound distributed storage and/or task (DST) processing for retrieving dispersed error encoded data in accordance with the present invention.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

Figure 26:
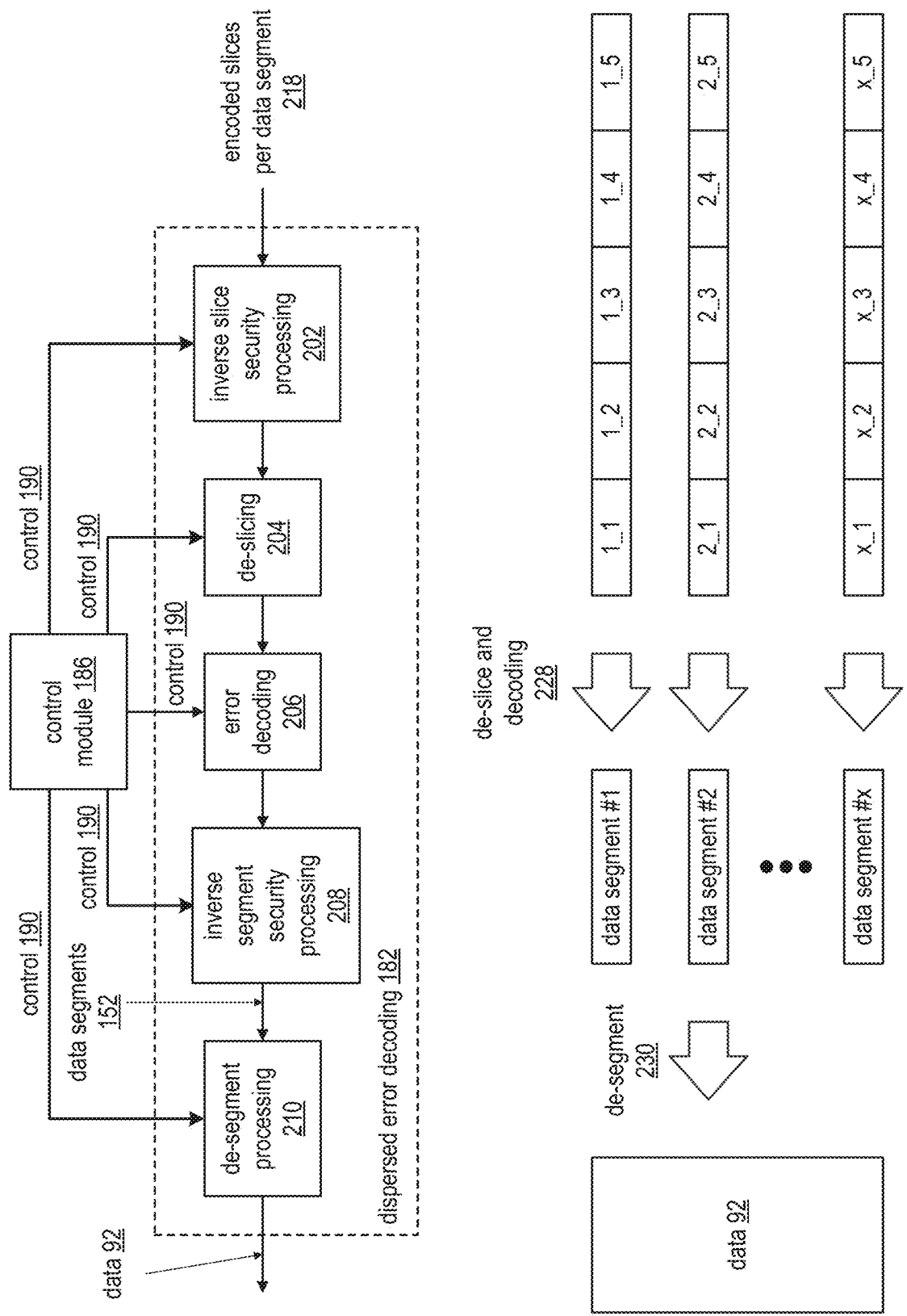
FIG. 26 is a schematic block diagram of an example of a dispersed error decoding for the example of FIG. 25 in accordance with the present invention.

FIG. 26 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, and a de-segmenting processing module 210. The dispersed error decoding module 182 is operable to de-slice and decode encoded slices per data segment 218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, unsecures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from a control module 186. For example, if the pillar width is five, the de-slicing module de-slices a set of five encoded data slices into an encoded data segment. Alternatively, the encoded data segment may include just three encoded data slices (e.g., when the decode threshold is 3).

The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments based on segment security information received as control information 190 from the control module 186. The segment security information includes data decompression, decryption, de-watermarking, integrity check (e.g., CRC, etc.) verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

Figure 27:
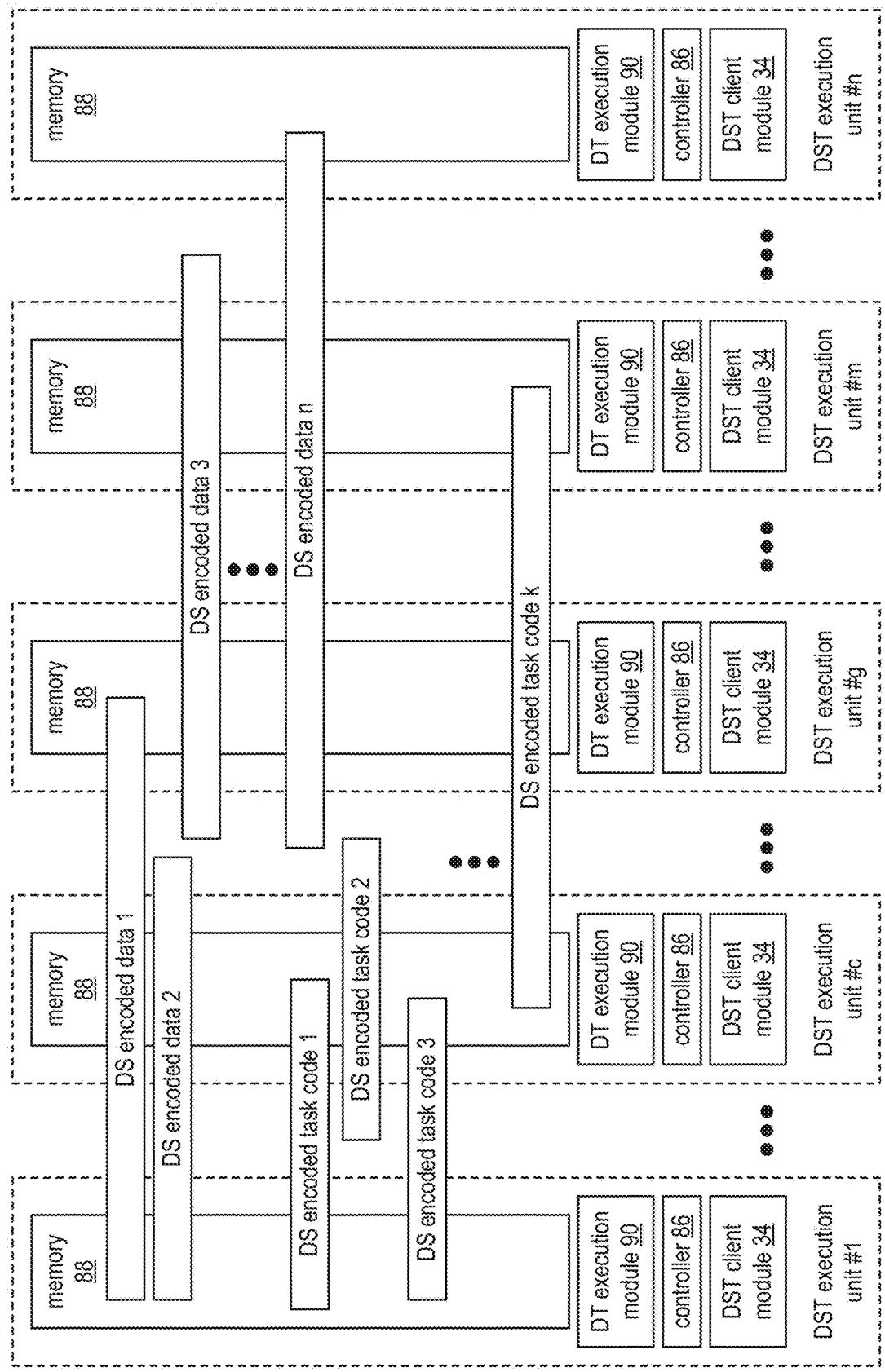
FIG. 27 is a schematic block diagram of an example of a distributed storage and task processing network (DSTN) module storing a plurality of data and a plurality of task codes in accordance with the present invention.

FIG. 27 is a schematic block diagram of an example of a distributed storage and task processing network (DSTN) module that includes a plurality of distributed storage and task (DST) execution units (#1 through #n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terabytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a user device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

Figure 28:
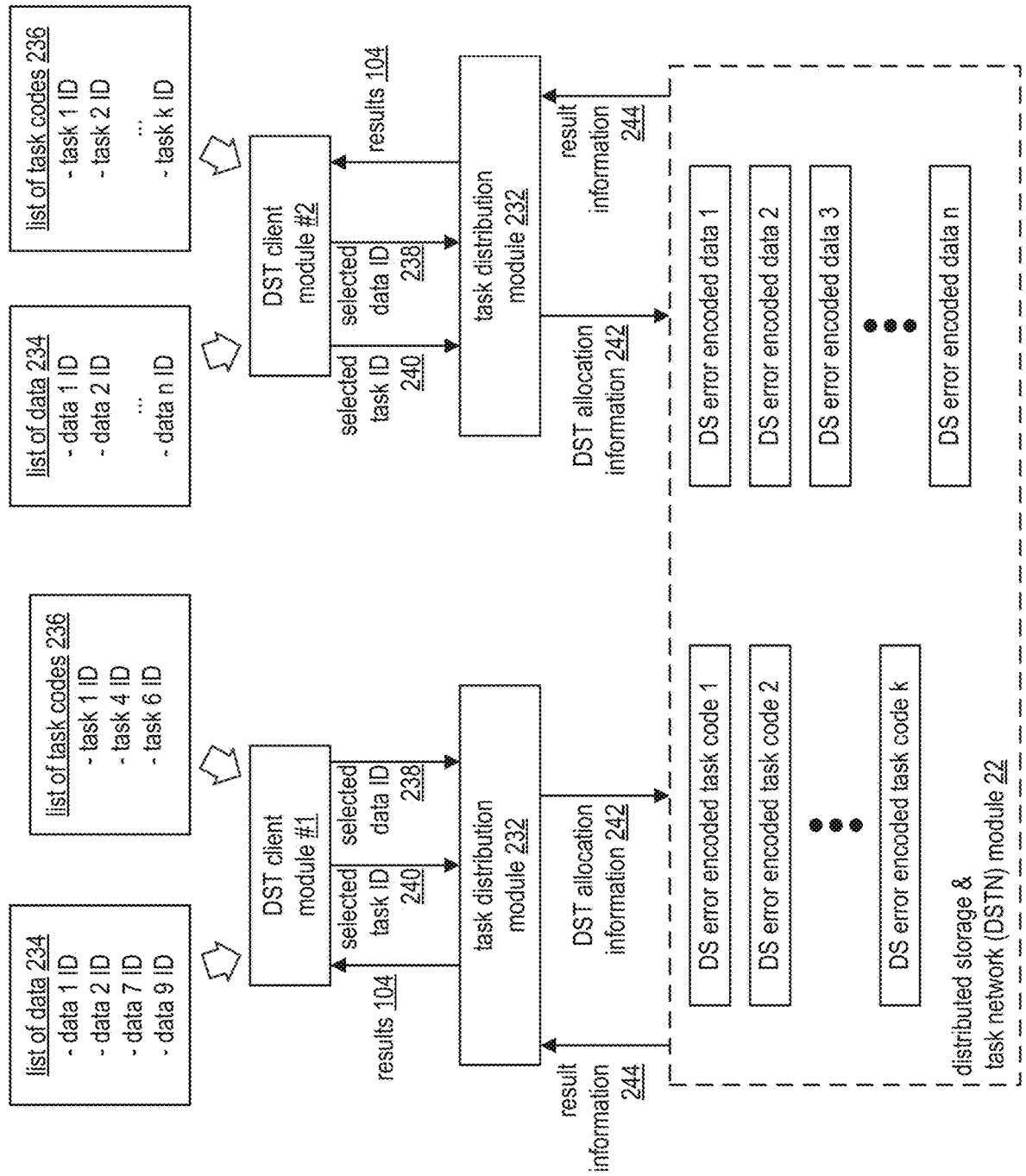
FIG. 28 is a schematic block diagram of an example of the distributed computing system performing tasks on stored data in accordance with the present invention.

FIG. 28 is a schematic block diagram of an example of a distributed computing system performing tasks on stored data. In this example, two distributed storage and task (DST) client modules 1-2 are shown: the first may be associated with a user device and the second may be associated with a DST processing unit or a high priority user device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID) includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the user device associated with the first DST client module has fewer privileges in the distributed computing system than the device associated with the second DST client module. Alternatively, this may occur because the user device associated with the first DST client module serves fewer users than the device associated with the second DST client module and is restricted by the distributed computing system accordingly. As yet another alternative, this may occur through no restraints by the distributed computing system, it just occurred because the operator of the user device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the user device that contains the first DST client module, or may be within the DSTN module 22.

Regardless of the task distribution module's location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned. The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

Figure 29:
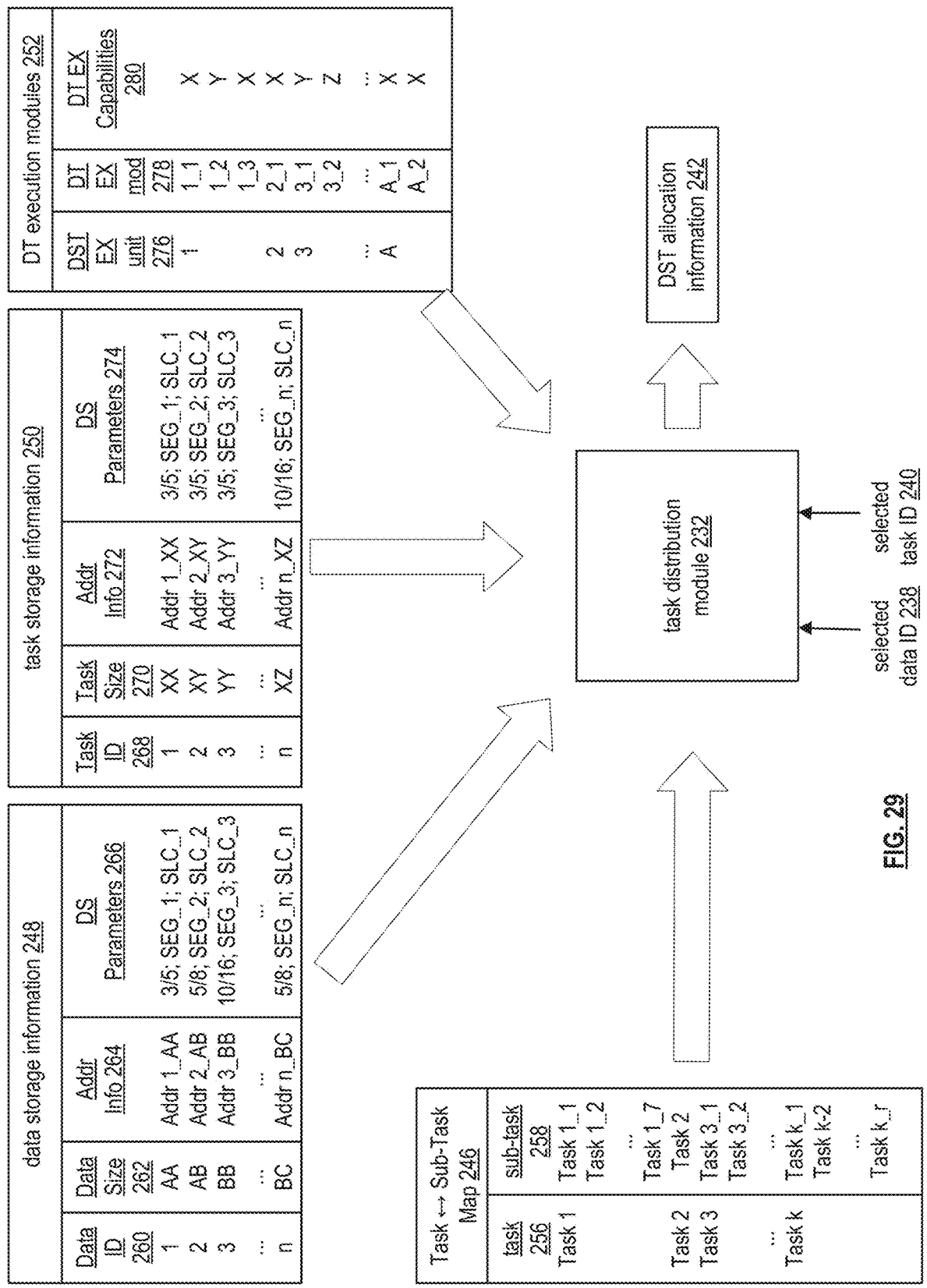
FIG. 29 is a schematic block diagram of an embodiment of a task distribution module facilitating the example of FIG. 28 in accordance with the present invention.

FIG. 29 is a schematic block diagram of an embodiment of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task ⇔ sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few Terabytes or more), addressing information of Addr_1_AA, and DS parameters of 3/5; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slice names of the encoded data slices of the data, etc. The DS parameters may include identity of an error encoding scheme, decode threshold/pillar width (e.g., 3/5 for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of 3/5; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., 3/5 for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task ⇔ sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task ⇔ sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.), and/or any information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

Figure 30:
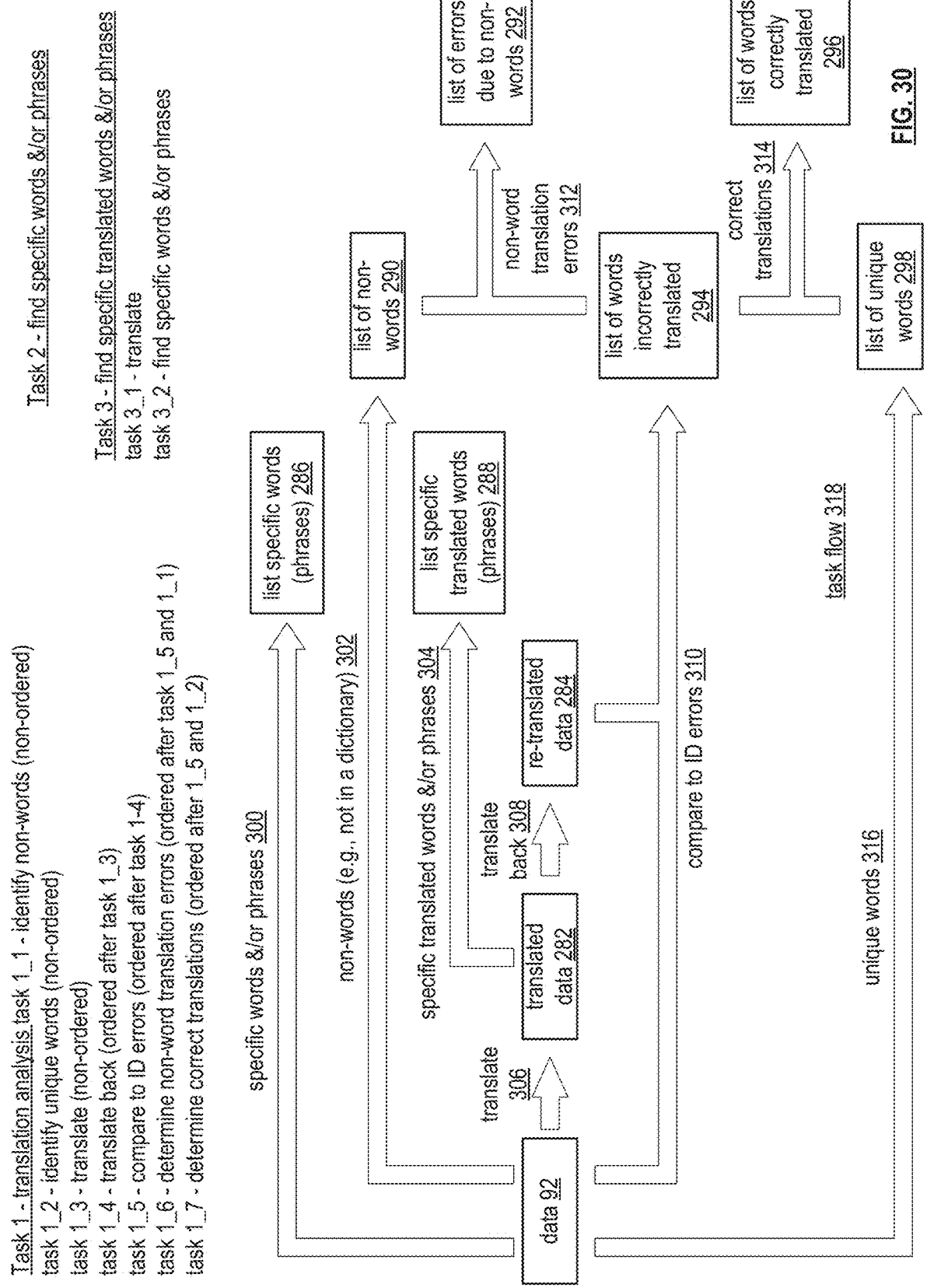
FIG. 30 is a diagram of a specific example of the distributed computing system performing tasks on stored data in accordance with the present invention.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words and/or phrases in translated data.

In this example, task 1 includes 7 sub-tasks: task 1_1—identify non-words (non-ordered); task 1_2—identify unique words (non-ordered); task 1_3—translate (non-ordered); task 1_4—translate back (ordered after task 1_3); task 1_5—compare to ID errors (ordered after task 1-4); task 1_6—determine non-word translation errors (ordered after task 1_5 and 1_1); and task 1_7—determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases 288. The translated data 282 is translated back 308 (e.g., sub-task 1_4) into the language of the original data to produce re-translated data 284. These two tasks are dependent on the translate task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc.,) may include the word and/or phrase, how many times it is used, where in the data it is used, and/or any other information requested regarding a word and/or phrase.

Figure 31:
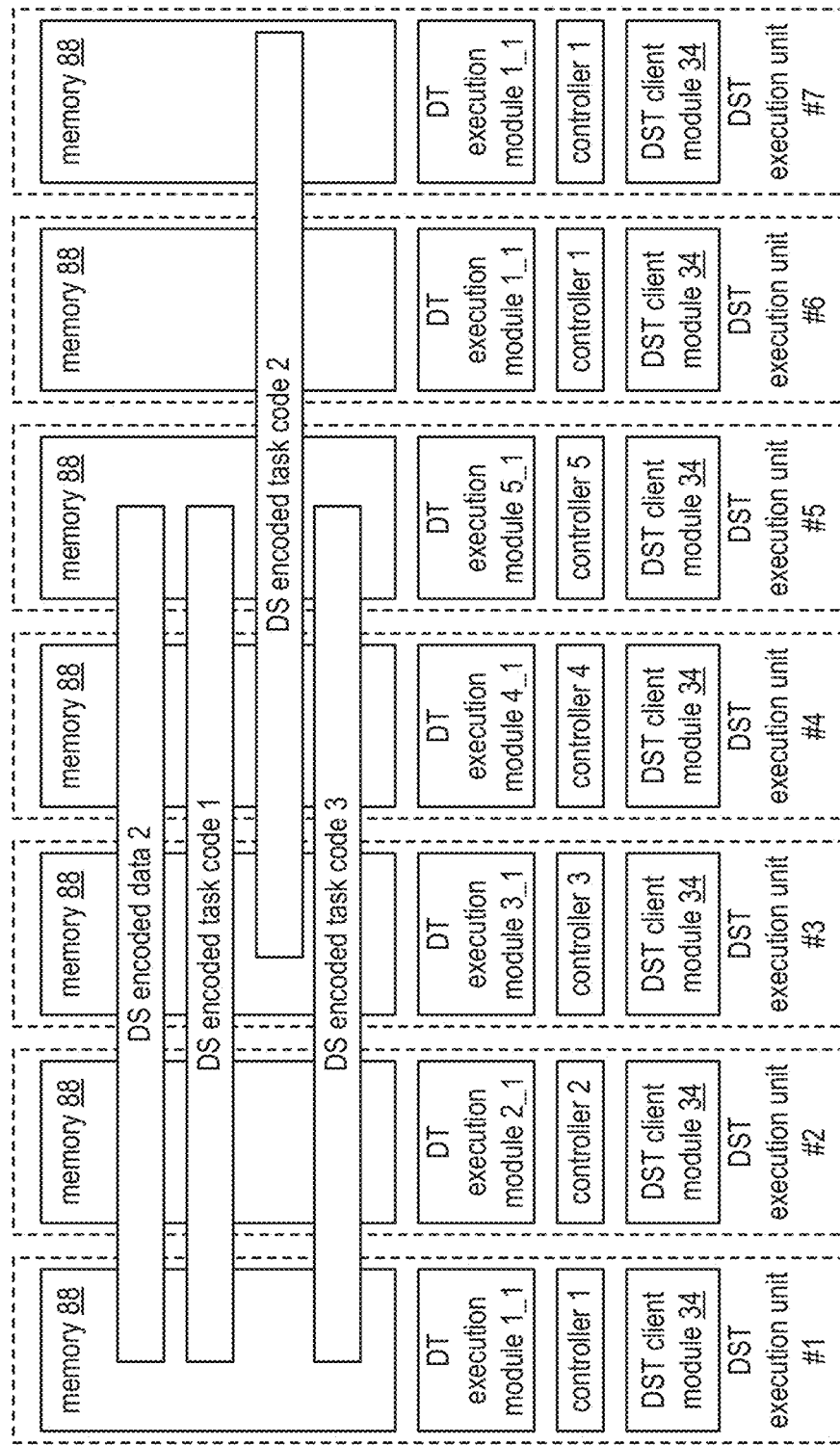
FIG. 31 is a schematic block diagram of an example of a distributed storage and task processing network (DSTN) module storing data and task codes for the example of FIG. 30 in accordance with the present invention.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1_5; the DS encoded task code 1 (of task 1) and DS encoded task 3 are stored as encoded task slices across the memory of DST execution units 1_5; and DS encoded task code 2 (of task 2) is stored as encoded task slices across the memory of DST execution units 3-7. As indicated in the data storage information table and the task storage information table of FIG. 29, the respective data/task has DS parameters of 3/5 for their decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done by the DSTN module. In addition, the task distribution module determines the number of partitions to divide the data into (e.g., 2_1 through 2_z) and addressing information for each partition.

The task distribution module generates an entry in the task execution information section for each sub-task to be performed. For example, task 1_1 (e.g., identify non-words on the data) has no task ordering (i.e., is independent of the results of other sub-tasks), is to be performed on data partitions 2_1 through 2_z by DT execution modules 1_1, 2_1, 3_1, 4_1, and 5_1. For instance, DT execution modules 1_1, 2_1, 3_1, 4_1, and 5_1 search for non-words in data partitions 2_1 through 2_z to produce task 1_1 intermediate results (R1-1, which is a list of non-words). Task 1_2 (e.g., identify unique words) has similar task execution information as task 1_1 to produce task 1_2 intermediate results (R1-2, which is the list of unique words).

Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_2, and 5_2 translate data partitions 2_5 through 2_z to produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3's intermediate result (e.g., R1-3_1) (e.g., the translated data). DT execution modules 1_1, 2_1, 3_1, 4_1, and 5_1 are allocated to translate back task 1_3 intermediate result partitions R1-3_1 through R1-3_4 and DT execution modules 1_2, 2_2, 6_1, 7_1, and 7_2 are allocated to translate back task 1_3 intermediate result partitions R1-3_5 through R1-3_z to produce task 1-4 intermediate results (R1-4, which is the translated back data).

Task 1_5 (e.g., compare data and translated data to identify translation errors) is ordered after task 1_4 and is to be executed on task 1_4's intermediate results (R4-1) and on the data. DT execution modules 1_1, 2_1, 3_1, 4_1, and 5_1 are allocated to compare the data partitions (2_1 through 2_z) with partitions of task 1-4 intermediate results partitions R1-4_1 through R1-4_z to produce task 1_5 intermediate results (R1-5, which is the list words translated incorrectly).

Task 1_6 (e.g., determine non-word translation errors) is ordered after tasks 1_1 and 1_5 and is to be executed on tasks 1_1's and 1_5's intermediate results (R1-1 and R1-5). DT execution modules 1_1, 2_1, 3_1, 4_1, and 5_1 are allocated to compare the partitions of task 1_1 intermediate results (R1-1_1 through R1-1_z) with partitions of task 1-5 intermediate results partitions (R1-5_1 through R1-5_z) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5's intermediate results (R1-1 and R1-5). DT execution modules 1_2, 2_2, 3_2, 4_2, and 5_2 are allocated to compare the partitions of task 1_2 intermediate results (R1-2_1 through R1-2_z) with partitions of task 1-5 intermediate results partitions (R1-5_1 through R1-5_z) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_z by DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_z to produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_z by DT execution modules 1_2, 2_2, 3_2, 4_2, and 5_2. For instance, DT execution modules 1_2, 2_2, 3_2, 4_2, and 5_2 search for specific translated words and/or phrases in the partitions of the translated data (R1-3_1 through R1-3_z) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units. In addition, the intermediate result information indicates a scratch pad memory for the task and where the corresponding intermediate results are to be stored. For example, for intermediate result R1-1 (the intermediate result of task 1_1), DST unit 1 is responsible for overseeing execution of the task 1_1 and coordinates storage of the intermediate result as encoded intermediate result slices stored in memory of DST execution units 1-5. In general, the scratch pad is for storing non-DS encoded intermediate results and the intermediate result storage is for storing DS encoded intermediate results.

FIGS. 33-38 are schematic block diagrams of the distributed storage and task network (DSTN) module performing the example of FIG. 30. In FIG. 33, the DSTN module accesses the data 92 and partitions it into a plurality of partitions 1-z in accordance with distributed storage and task network (DST) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition.

As indicated in the DST allocation information of FIG. 32, DST execution unit 1 is assigned to process the first through "zth" partial results to produce the first intermediate result (R1-1), which is a list of non-words found in the data. For instance, each set of DT execution modules 90 stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terabyte). If yes, it partitions the first intermediate result (R1-1) into a plurality of partitions (e.g., R1-1_1 through R1-1_m). If the first intermediate result is not of sufficient size to partition, it is not partitioned.

For each partition of the first intermediate result, or for the first intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 34, the DSTN module is performing task 1_2 (e.g., find unique words) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_2 in accordance with the DST allocation information. From data partition to data partition, the set of DT execution modules may be the same, different, or a combination thereof. For the data partitions, the allocated set of DT execution modules executes task 1_2 to produce a partial results (e.g., $1^{st}$ through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terabyte). If yes, it partitions the second intermediate result (R1-2) into a plurality of partitions (e.g., R1-2_1 through R1-2_m). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes 3/5 decode threshold/ pillar width ratio) to produce slice groupings. The slice groupings are stored in the intermediate result memory (e.g., allocated memory in the memories of DST execution units 1-5).

In FIG. 35, the DSTN module is performing task 1_3 (e.g., translate) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_z). For the data partitions, the allocated set of DT execution modules 90 executes task 1_3 to produce partial results 102 (e.g., $1^{st}$ through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3) into a plurality of partitions (e.g., R1-3_1 through R1-3_y). For each partition of the third intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_z). For the partitions, the allocated set of DT execution modules executes task 1_4 to produce partial results 102 (e.g., $1^{st}$ through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_z). For each partition of the fourth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

Figure 36:
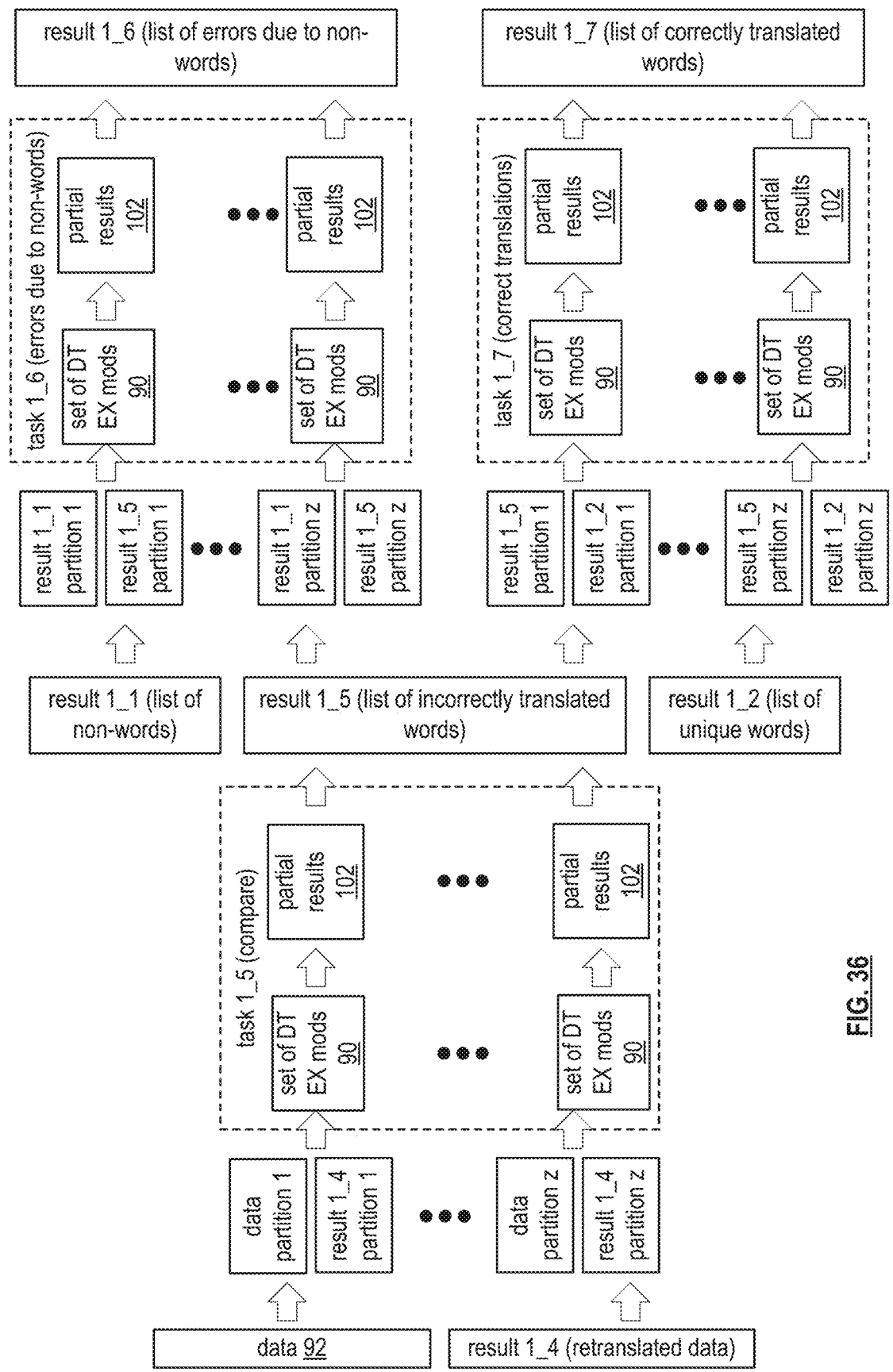

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, 2_1, 3_1, 4_1, and 5_1). For each pair of partitions, the allocated set of DT execution modules executes task 1_5 to produce partial results 102 (e.g., $1^{st}$ through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1-5), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5) into a plurality of partitions (e.g., R1-5_1 through R1-5_z). For each partition of the fifth intermediate result, the DST client module uses the DS error encoding parameters of the data (e.g., DS parameters of data 2, which includes 3/5 decode threshold/ pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1). For each pair of partitions, the allocated set of DT execution modules executes task 1_6 to produce partial results 102 (e.g., $1^{st}$ through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_z). For each partition of the sixth intermediate result, the DST client module uses the DS error encoding parameters of the data (e.g., DS parameters of data 2, which includes 3/5 decode threshold/ pillar width ratio) to produce slice groupings. The slice groupings are stored in the intermediate result memory (e.g., allocated memory in the memories of DST execution units 2-6 per the DST allocation information).

As is still further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2). To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 1_7 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., $1^{st}$ through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7_z). For each partition of the seventh intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., $1^{st}$ through "zth") of specific words and/or phrases found in the data partitions.

As indicated in the DST allocation information of FIG. 32, DST execution unit 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terabyte). If yes, it partitions the task 2 intermediate result (R2) into a plurality of partitions (e.g., R2_1 through R2_m). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes 3/5 decode threshold/ pillar width ratio) to produce slice groupings. The slice groupings are stored in the intermediate result memory (e.g., allocated memory in the memories of DST execution units 1-4, and 7).

In FIG. 38, the distributed storage and task network (DSTN) module is performing task 3 (e.g., find specific translated words and/or phrases) on the translated data (R1-3). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., $1^{st}$ through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terabyte). If yes, it partitions the task 3 intermediate result (R3) into a plurality of partitions (e.g., R3_1 through R3_m). If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, 5, and 7).

Figure 40A:
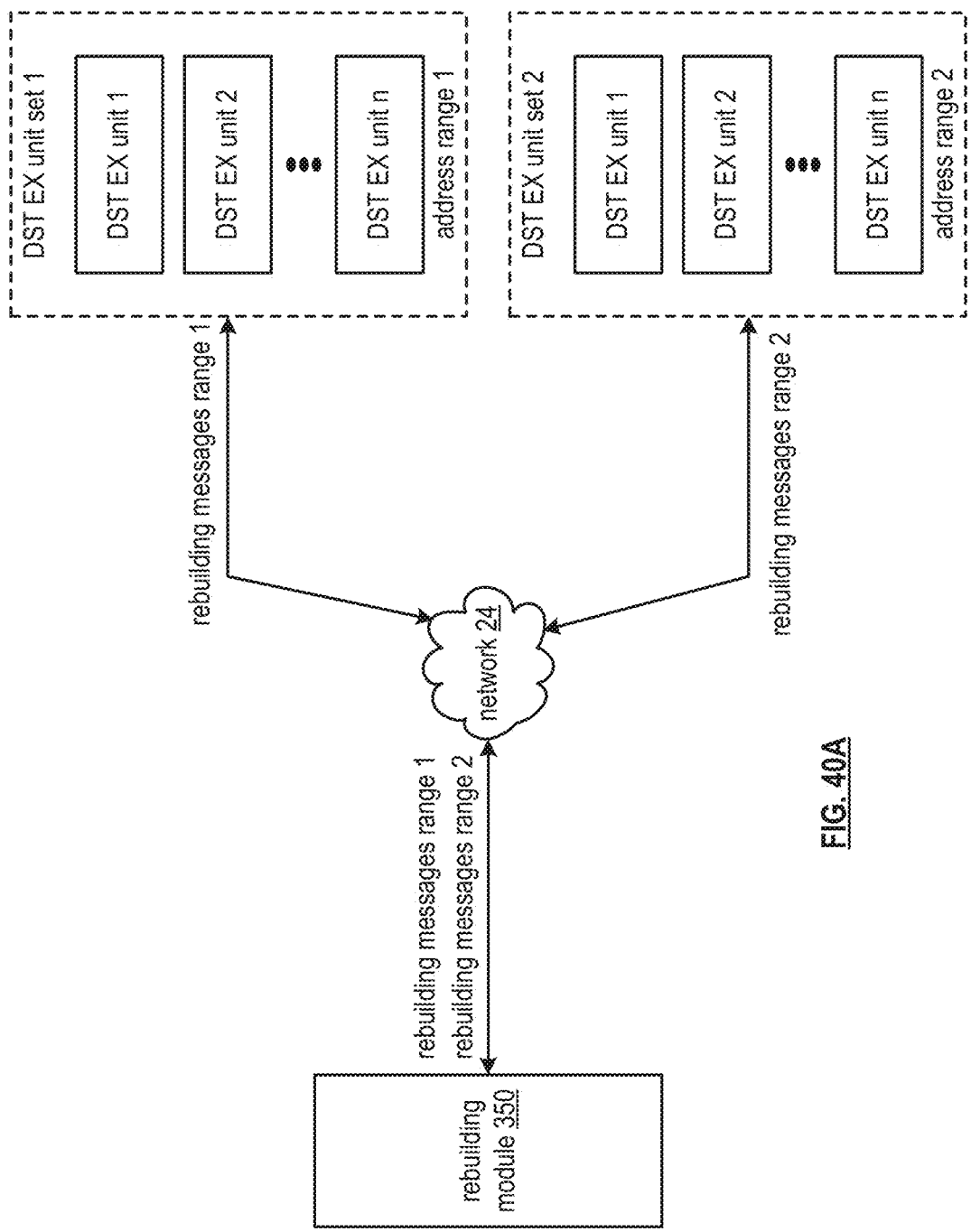
FIG. 40A is a schematic block diagram of an embodiment of a dispersed storage network in accordance with the present invention.

FIG. 39 is a diagram of an example of combining result information into final results 104 for the example of FIG. 30. In this example, the result information includes the list of specific words and/or phrases found in the data (task 2 intermediate result), the list of specific translated words and/or phrases found in the data (task 3 intermediate result), the list of non-words found in the data (task 1 first intermediate result R1-1), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104. FIG. 40A is a schematic block diagram of an embodiment of a dispersed storage network that includes a rebuilding module 350, the network 24 of FIG. 1, and distributed storage and task (DST) execution (EX) unit sets 1 and 2. Each DST execution unit set includes a set of DST execution units 1-n. Each DST execution unit may be implemented utilizing the DST execution unit 36 of FIG. 1. The rebuilding module 350 may be implemented utilizing one or more of the DST integrity processing unit 20 of FIG. 1, the DST execution unit 36 of FIG. 1, and the DST processing unit 16 of FIG. 1.

The DSN functions to execute a plurality of rebuilding cycles. Each rebuilding cycle includes detecting a storage error and rebuilding stored data associated with the storage error. The storage error includes one or more of a missing encoded data slice and a corrupted encoded data slice. The executing of a rebuilding cycle of the plurality of rebuilding cycles includes the rebuilding module 350 exchanging rebuilding messages with one or more DST execution units. The rebuilding messages includes one or more of a list slice request, a list slice response, a list slice digest request, a list slice digest response, a read slice request, a read slice response, a write rebuilt slice request, and a write rebuilt slice response.

In an example of the detecting of the storage error, the rebuilding module 350 issues, via the network 24, a set of list slice requests to the DST execution units 1-n of the DST execution unit set 1, where the set of list slice requests correspond to an address range 1. The address range includes a start address and an end address, where the start and end addresses includes slice names within the address range 1. The rebuilding module receives list slice responses from at least some of the DST execution units 1-n. Having received the list slice responses, the rebuilding module 350 compares lists of slice names of each of the list slice responses to identify the storage error.

In an example of the rebuilding the stored data associated with the storage error, the rebuilding module 350 issues, via the network 24, a set of read slice requests to the DST execution units 1-n of the DST execution unit set 1, where the set of read slice requests includes a set of slice names associated with a common data segment and where the storage error is associated with a common data segment. The rebuilding module 350 receives read slice responses and dispersed storage error decodes the received read slice responses to reproduce the data segment. Having reproduced the data segment, the rebuilding module 350 dispersed storage error encodes the rebuilt data segment to produce a rebuilt encoded data slice associated with the identified storage error. The rebuilding module 350 sends, via the network 24, the rebuilt encoded data slice to a DST execution unit associated with the storage error.

The executing of the plurality of rebuilding cycles may further include establishing a rebuilding schedule. The rebuilding schedule includes one or more of a desired time frame to substantially complete a portion of the rebuilding cycle and a desired time frame between rebuilding cycles. In an example of operation of establishing the rebuilding schedule, the rebuilding module 350 selects a rebuilding object. The rebuilding object includes one or more of a data object, an address range, a memory device, a DST execution unit, a storage unit, the set of storage units, a set of DST execution units, and all DST execution units at a common site. The selecting of the rebuilding object includes one or more of identifying a next rebuilding object from a rebuilding object list, receiving a request that includes identity of the rebuilding object, and interpreting an error message.

Having selected the rebuilding object, the rebuilding module 350 determines a minimum retrieval reliability threshold level for the rebuilding object. The determining may be based on one or more of a data owner identifier, a data type, a data priority level, a data recipient identifier, an expected retrieval efficiency, and an expected storage duration. Having determined the minimum retrieval reliability threshold level, the rebuilding module 350 determines a time between rebuilding cycles for the rebuilding object such that an expected retrieval reliability level is greater than the minimum retrieval reliability threshold level. The determining may include generating an expected retrieval reliability level versus time between rebuilding cycles based on one or more of an information dispersal algorithm type, a storage unit availability level, and a network availability level.

For each rebuilding object, the rebuilding module 350 identifies a timestamp associated with a last rebuilding cycle. The identifying includes one or more of performing a lookup, interpreting an error message, issuing a query, and receiving a query response. Having identified the timestamp, the rebuilding module 350 determines a rebuilding schedule for the rebuilding object based on the timestamp associated with the last rebuilding cycle and the determined time between the rebuilding cycles, where the rebuilding schedule includes at least one of a timestamp of a next rebuilding cycle.

Having determined the rebuilding schedule, the rebuilding module 350 facilitates execution of the next rebuilding cycle in accordance with the rebuilding schedule. For example, when a current time substantially the same as a timestamp of the next rebuilding cycle, the rebuilding module 350 issues, via the network 24, additional rebuilding messages to one or more DST execution units to identify the storage error and rebuild stored data associated with the storage error.

FIG. 40B is a flowchart illustrating an example of establishing a schedule for a rebuilding cycle. The method begins or continues at step 352 where a processing module (e.g., of a rebuilding module) selects a rebuilding object. The selecting includes at least one of identifying a next object from a rebuilding object list, interpreting an error message associated with the rebuilding object, and receiving a rebuilding request. The method continues at step 354 where the processing module determines a minimum retrieval reliability threshold level for the rebuilding object. For example, the processing module determines the minimum reliability threshold level by performing a lookup of a reliability table based on an identifier of a data type associated with the rebuilding object.

The method continues at step 356 where the processing module determines a time between rebuilding cycles for the rebuilding objects such that an expected retrieval reliability level is greater than the minimum retrieval reliability threshold level. For example, the processing module generates an expected retrieval reliability level versus time between rebuilding cycles based on a profile associated with an information dispersal algorithm type associated with the rebuilding object.

The method continues at step 358 where the processing module identifies a timestamp associated with a last rebuilding cycle of the rebuilding object. The identifying includes at least one of performing a lookup, issuing a query, receiving a query response, and interpreting a rebuilding message record. The method continues at step 360 where the processing module determines a rebuilding schedule for the rebuilding object based on the time between rebuilding cycles and the timestamp associated with the last rebuilding cycle. For example, the processing module adds the time between rebuilding cycles to the timestamp associated with the last rebuilding cycle to produce a timestamp associated with a next rebuilding cycle. Having produced the timestamp associated with the next rebuilding cycle, the processing module generates the rebuilding schedule to include the timestamp associated with the next rebuilding cycle.

The method continues at step 362 where the processing module facilitates execution of the next rebuilding cycle in accordance with the rebuilding schedule. For example, the processing module sends the rebuilding schedule to at least one other rebuilding module and initiates the rebuilding cycle when a current timestamp is substantially the same as the timestamp of the next rebuilding cycle. The initiating of the rebuilding cycle includes detecting a storage error for the rebuilding object and rebuilding an encoded data slice when a storage error has been identified.

FIG. 41A is a schematic block diagram of another embodiment of a dispersed storage network that includes the outbound distributed storage and task (DST) processing module 80 of FIG. 3, the network 24 of FIG. 1, the inbound DST processing module 82 of FIG. 3, and the DSTN module 22 of FIG. 1. The DSTN module 22 includes a plurality of DST execution units 36 of FIG. 1. The outbound DST processing module 80 includes the dispersed storage (DS) error encoding 112 of FIG. 4. The DS error encoding 112 includes the segment security processing 144 of FIG. 6, the control module 116 of FIG. 6, and the error encoding 146 of FIG. 6. The inbound DST processing module 82 includes the DS error decoding 182 of FIG. 13. The DS error decoding 182 includes the error decoding 206 of FIG. 16 and the inverse segment security processing 208 of FIG. 16.

The DSN functions to adjust data storage efficiency of a data segment 152 that is to be stored as an encoded data slice set 368 in the DSTN module 22. In an example of operation, for the data segment 152 to be stored, the control module 116 obtains access level information 364.

The access level information 364 includes one or more of an estimated retrieval frequency level of the data segment 152 and an estimated update frequency level of the data segment 152. The obtaining includes at least one of receiving, performing a lookup, and determining based on a historical record.

Having obtained the access level information 364, the control module 116 determines a cost of compression factor based on resource information 366. The resource information 366 includes one or more of a network capacity level, a network utilization level, a DST execution unit capacity level, a DST execution unit utilization level, a utilization level of the outbound DST processing module 80, and a utilization level of the inbound DST processing module 82. The cost of compression factor includes one or more of an estimated incremental processing resource level, and an estimated incremental network utilization reduction level. The determining includes calculating the cost of compression factor based on one or more portions of the resource information 366. For example, the control module 116 determines a less than average cost of compression factor when the resource information 366 indicates that the utilization level of the outbound DST processing module 80 is less than average. As another example, the control module 116 determines a greater than average cost of compression factor when the resource information 366 indicates that the utilization level of the outbound DST processing module 80 is greater than average.

When the estimated retrieval frequency level is below a retrieval frequency threshold level and the estimated update frequency level is greater than an update frequency threshold level, the control module 116 indicates, via control 160, to compress the data segment 152 when the cost of compression factor is below a cost of compression threshold level. When the estimated retrieval frequency level is above the retrieval frequency threshold level, the control module 116 determines a cost of decompression factor based on the resource information 366. The cost of decompression factor includes one or more of an estimated incremental processing resource level and an estimated incremental network utilization increase level. For example, the control module 116 determines a less than average cost of decompression factor when the resource information 366 indicates that the utilization level of the inbound DST processing module 82 is less than average. As another example, the control module 116 determines a greater than average cost of decompression factor when the resource information 366 indicates that the utilization level of the inbound DST processing module 82 is greater than average.

When the estimated update frequency level is less than the update frequency threshold level, the control module 116 indicates to compress a data segment 152 when the cost of decompression factor is favorable (e.g., less than or equal to average). When the estimated update frequency level is greater than the update frequency threshold level, the control module 116 indicates to compress the data segment 152 when a cost factor is favorable, where the cost factor is based on the cost of compression factor and the cost of decompression factor. For example, the control module indicates to compress the data segment 152 when the cost of compression factor is average and the cost of decompression factor is average.

The segment security processing 144 compresses the data segment 152 in accordance with the control 160 to produce a secured segment 154 (e.g., not compressed or compressed). The error encoding 146 dispersed storage error encodes the secured segment 154 to produce encoded data 156, where the encoded data 156 includes the encoded data slice set 368. The outbound DST processing module 80 sends the encoded data slice set 368, via the network 24, to the DSTN module 22 for storage.

When the data segment 152 is to be retrieved, the inbound DST processing module 82 acquires at least a decode threshold number of the encoded data slice set 368 from the DSTN module 22 as the encoded data 156. For example, the inbound DST processing module 82 issues read slice requests, via the network 24, to the DSTN module 22 and receives read slice responses that includes the at least a decode threshold number of encoded data slices. Having received the at least a decode threshold number of encoded data slices, the error decoding 206 dispersed storage error decodes the at least a decode threshold number of encoded data slices to reproduce the secured segment 154. The inverse segment security processing 208 and decompresses the secured segment 154 to reproduce the data segment 152. The decompressing includes detecting whether the secured segment 154 has been compressed. The detecting may include detecting a bit pattern, interpreting a list, and receiving an indication of compression.

Figure 41B:
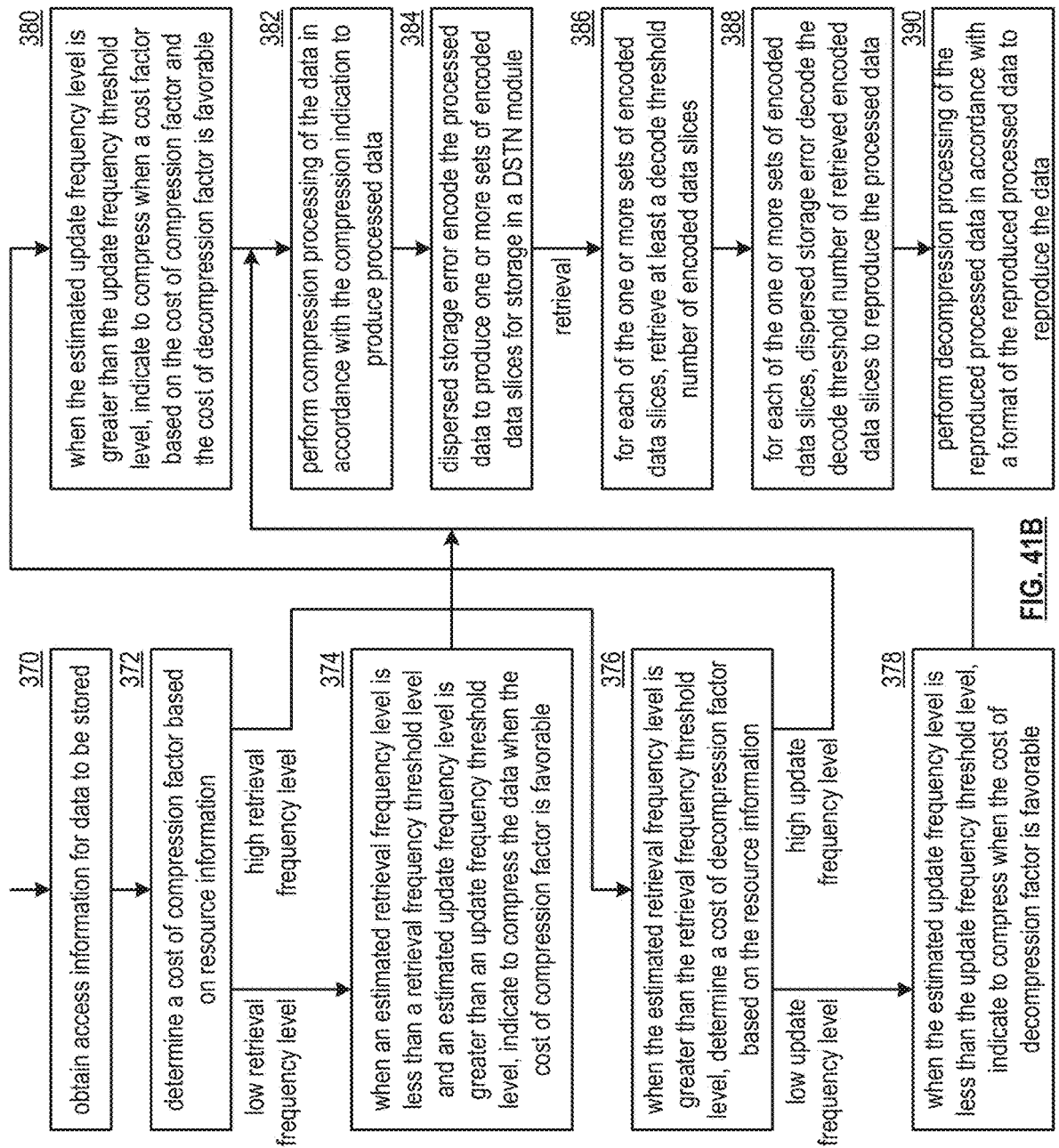
FIG. 41B is a flowchart illustrating an example of adjusting data storage efficiency in accordance with the present invention.

FIG. 41B is a flowchart illustrating an example of adjusting data storage efficiency. The method begins or continues at step 370 where a processing module (e.g., of a distributed storage and task (DST) client module) obtains access information for data to be stored. The obtaining includes at least one of receiving and determining. The method continues at step 372 where the processing module determines a cost of compression factor based on resource information. The determining includes obtaining the resource information and calculating cost of compression based on the resource information. When a high retrieval frequency level for the data is expected, the method branches to step 376. When a low retrieval frequency level for the data is expected, the method continues to step 374.

When the estimated retrieval frequency level is less than a retrieval frequency threshold level and an estimated update frequency level is greater than an update frequency threshold level, the method continues at step 374 where the processing module indicates to compress the data when the cost of compression factor is favorable (e.g., indicate to compress the data when the cost of compression factor is less than a cost of compression threshold level). The method then branches to step 382.

When the estimated retrieval frequency level is greater than the retrieval frequency threshold level, the method continues at step 376 where the processing module determines a cost of decompression factor based on the resource information. When a high update frequency level for the data is expected, the method branches to step 380. When a low update frequency level of the data for the data is expected, the method continues to step 378. When the estimated update frequency level is less than the update frequency threshold level, the method continues at step 378 where the processing module indicates to compress the data when the cost of decompression factor is favorable (e.g., indicate to compress when the cost of decompression factor is less than a cost of decompression threshold level). The method then branches to step 382.

When the estimated update frequency level is greater than the update frequency threshold level, the method continues at step 380 where the processing module indicates to compress the data when a cost factor based on the cost of compression factor and the cost of decompression factor is favorable. For example, the processing module balances the cost of compression factor and the cost of decompression factor and indicates to compress when the cost factor is less than a cost factor threshold level.

The method continues at step 382 where the processing module performs compression processing of the data in accordance with the compression indication to produce process data. For example, the processing module passes through the data when no compression is indicated. As another example, the processing module compresses the data in accordance with a compression approach when compression is indicated. The method continues at step 384 where the processing module dispersed storage error encodes the processed data to produce one or more sets of encoded data slices for storage in a distributed storage and task network (DSTN) module.

When retrieving the data, the method continues at step 386 where, for each of the one or more sets of encoded data slices, the processing module retrieves at least a decode threshold number of encoded data slices. For each of the one or more sets of encoded data slices, the method continues at step 388 where the processing module dispersed storage error decodes the decode threshold number of retrieved encoded data slices to reproduce the processed data. The method continues at step 390 where the processing module performs decompression processing of the reproduced processed data in accordance with a format of the reproduced processed data to reproduce the data. For example, the processing module determines whether compression was utilized (e.g., detect, performing a lookup) and performs a decompression function on the reproduced process data when determining that compression was utilized.

Figure 42A:
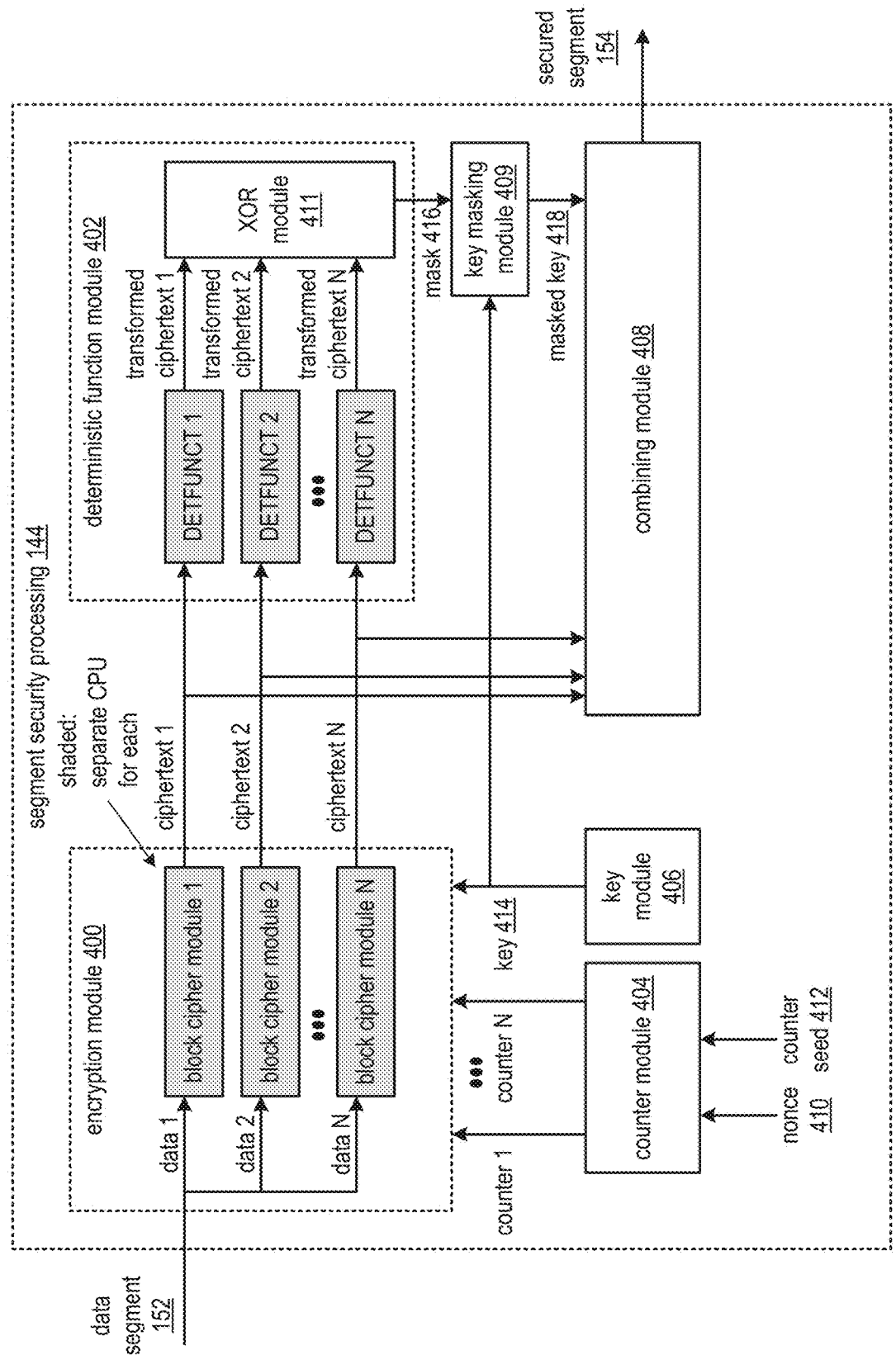
FIG. 42A is a schematic block diagram of an embodiment of a segment security processing in accordance with the present invention.

FIG. 42A is a schematic block diagram of an embodiment of a segment security processing 144 of FIG. 6 that includes an encryption module 400, a counter module 404, a key module 406, a combining module 408, a key masking module 409, and a deterministic function module 402. The encryption module 400 includes block cipher modules 1-N. The deterministic function module 402 includes deterministic functions 1-N and an exclusive OR module 411. The block cipher modules 1-N may be implemented utilizing two or more central processing units (CPUs). The deterministic functions 1-N may be implemented utilizing two or more CPUs. The segment security processing 144 functions to utilize a parallel processing approach to secure a data segment 152 to produce a secured segment 154.

In an example of operation of the parallel processing approach, the counter module 404 transforms a counter seed 412 based on a nonce 410 into values of counters 1-N in accordance with a counter generation approach. The counter generation approach is discussed in greater detail with reference to FIG. 42C. The key module 406 generates a key 414. The generating includes at least one of generating an encryption key based on a random number, retrieving the key 414 from a local memory, and receiving the key 414 from a key distribution entity.

The block cipher modules 1-N substantially simultaneously perform an encryption function on data 1-N using a corresponding counter value 1-N and the key 414 to produce ciphertext 1-N, where the data segment 152 includes data 1-N. For example, the encryption module 400 partitions the data segment 152 to produce the data 1-N. As another example, each block cipher module selects a corresponding portion of the data segment 152 to produce a corresponding data portion for encryption. As an example of applying the encryption function, a first CPU executes operational instructions in accordance with the block cipher module 1 to cause the first CPU to perform the encryption function on the data 1 using the key 414 and the counter 1 to produce ciphertext 1 substantially simultaneously while a second CPU executes operational instructions in accordance with the block cipher module 2 to cause the second CPU to perform the encryption function on the data 2 using the key 414 and the counter 2 to produce ciphertext 2, etc.

The deterministic functions 1-N performs a deterministic function on the ciphertext 1-N to produce transformed ciphertext 1-N. The deterministic function includes one or more of a hash based message authentication code a hashing function, a mask generating function, a sponge function, and any other function that produces a repeatable output for a given input using a one-way function. For example, a third CPU executes operational instructions in accordance with the deterministic function 1 to cause the third CPU to perform the deterministic function on the ciphertext 1 to produce the transformed ciphertext 1 substantially simultaneously while a fourth CPU executes operational instructions in accordance with the deterministic function 2 to cause the fourth CPU to perform the deterministic function on the ciphertext 2 to produce the transformed ciphertext 2.

The exclusive OR module 411 performs another deterministic function on the transformed ciphertext 1-N to produce a mask 416. The key masking module 409 performs a masking function on the key 414 using the mask 416 to produce a masked key 418. For example, the key masking module 409 performs an exclusive OR function on the key 414 and the mask 416 to produce the masked key 418. The combining module 408 performs a combining function on the ciphertext 1-N and the masked key 418 to produce the secured segment 154. The combining includes at least one of pre-appending the masked key to the ciphertext 1-N, post-appending the masked key 418 to the ciphertext 1-N, and interleaving the masked key 418 with the ciphertext 1-N. Having produced the secured segment 154, the secured segment 154 may be dispersed storage error encoded to produce a set of secure encoded data slices for storage and/or transmission.

Figure 42B:
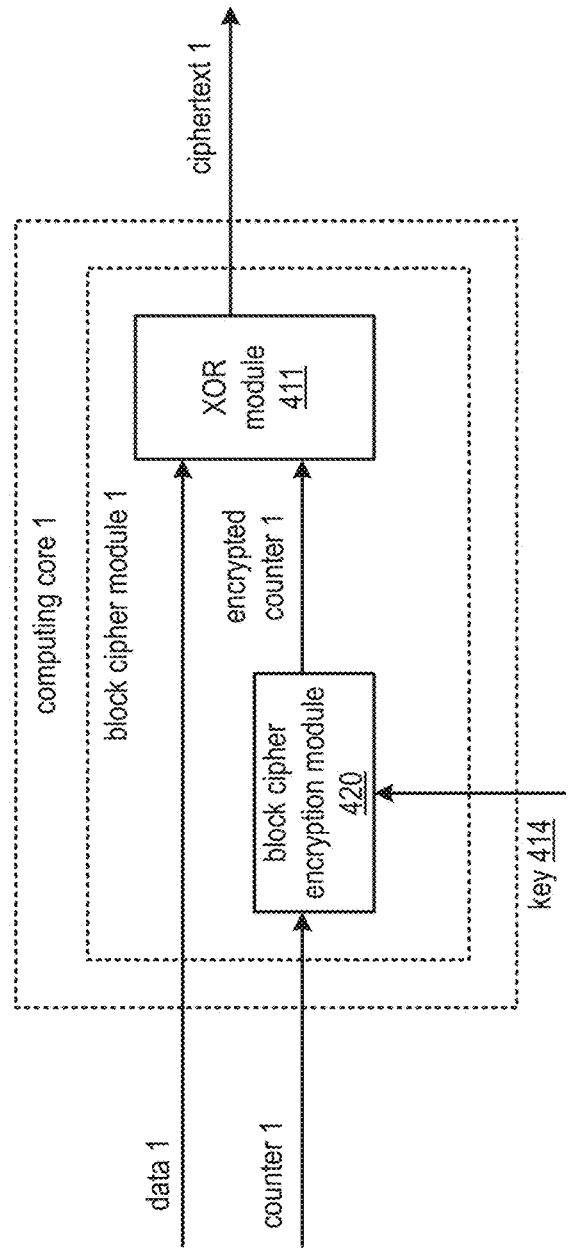
FIG. 42B is a schematic block diagram of another embodiment of a computing core in accordance with the present invention.

FIG. 42B is a schematic block diagram of another embodiment of a computing core 1 that includes the block cipher module 1 of FIG. 42A. The computing core 1 may further be implemented utilizing the computing core 26 of FIGS. 1 and 2. The block cipher module 1 includes a block cipher encryption module 420 and the exclusive OR (XOR) module 411 of FIG. 42A. The block cipher module 1 functions to apply an encryption function to data 1 to produce ciphertext 1 using a key 414 and a counter 1. In an example of operation, the block cipher encryption module 420 encrypts the counter 1 with a block cipher encryption algorithm using the key 414 to produce an encrypted counter 1. The exclusive OR module 411 performs a deterministic function on the data 1 and the encrypted counter 1 to produce the ciphertext 1. For example, the exclusive OR module performs an exclusive OR function on the data 1 and the encrypted counter 1 to produce the ciphertext 1.

Figure 42C:
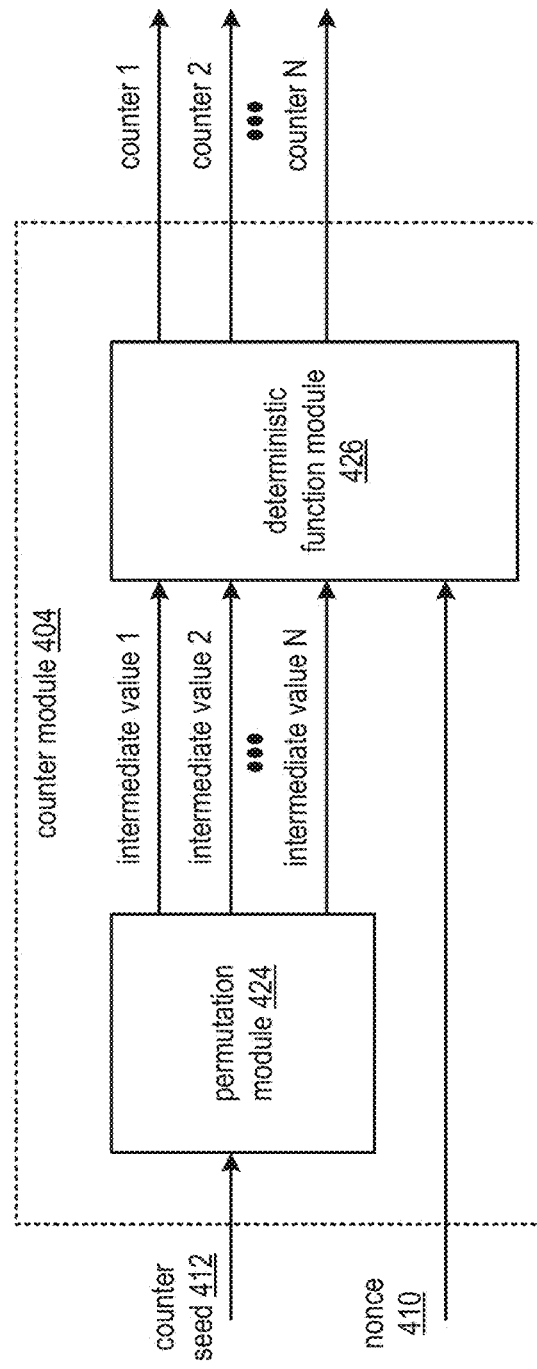
FIG. 42C is a schematic block diagram of a counter module in accordance with the present invention.

FIG. 42C is a schematic block diagram of the counter module 404 of FIG. 42A. The counter module 404 includes a permutation module 424 and a deterministic function module 426. The counter module 404 functions to transforms a counter seed 412 based on a nonce 410 into values of counters 1-N in accordance with a counter generation approach. The counter seed 412 includes a starting value of a function, where the starting value may include one or more of a predetermined value, a generated value based on another factor, and a received value. The nonce 410 includes an arbitrary number, where the arbitrary number may be generated based on one or more of a random number and a pseudorandom number. As such, the nonce 410 provides a security improvement to the counter module ordered for to prevent a subsequent replay attack.

In an example of operation of the transforming in accordance with the counter generation approach, the permutation module 424 applies a permutation function to the counter seed 412 to produce intermediate values 1-N, where each intermediate value is incremented by x from a previous intermediate value and a first intermediate value is based on the counter seed 412. For example, the permutation module 424 applies the permutation function to the counter seed 412 to produce an intermediate value 1 of 11, an intermediate value 2 of 12, an intermediate value 3 of 13, etc. when the counter seed is 10 and the permutation function increments each successive intermediate value by one.

The deterministic function module 426 applies a deterministic function to the nonce 410 and one of the intermediate values 1-N to produce a corresponding counter value of the counter values 1-N. For example, the deterministic function module 426 applies an exclusive OR function to intermediate value 1 and the nonce 410 to produce the counter 1, the deterministic function module 426 applies the exclusive OR function to intermediate value 2 and the nonce 410 to produce the counter 2, etc.

Figure 42D:
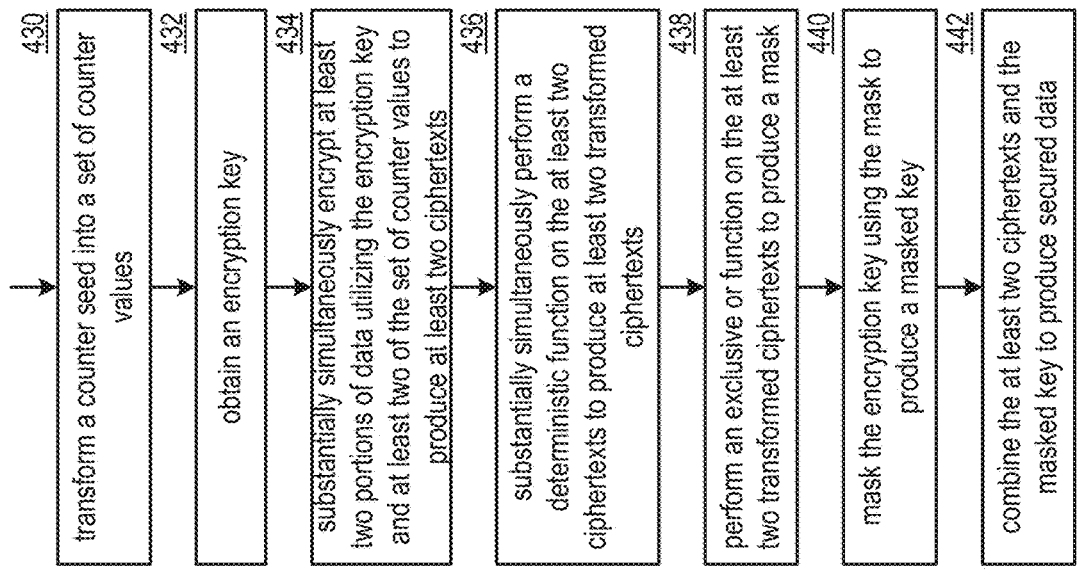
FIG. 42D is a flowchart illustrating an example of securing data in accordance with the present invention.

FIG. 42D is a flowchart illustrating an example of securing data. The method begins or continues at step 430 where a processing module (e.g., of a distributed storage and task (DST) client module) transforms a counter seed into a set of counter values. The method continues at step 432 where the processing module obtains and encryption key. The obtaining includes at least one of retrieving, receiving, generating based on a random number, and generating based on a pseudo-random algorithm and a key seed.

The method continues at step 434 where the processing module substantially simultaneously encrypts at least two portions of data utilizing the encryption key and at least two of the set of counter values to produce at least two ciphertexts. For example, the processing module processes a first portion of the data using a first central processing unit and processes a second portion of the data using a second central processing unit.

The method continues at step 436 where the processing module substantially simultaneously performs a deterministic function on the at least two ciphertexts to produce at least two transformed ciphertexts. For example, the processing module processes a first ciphertext using a third central processing unit and processes a second ciphertext using a fourth central processing unit.

The method continues at step 438 where the processing module performs an exclusive OR function on the at least two transformed ciphertexts to produce a mask. Alternatively, the processing module performs another deterministic function on the at least two transformed ciphertexts to produce the mask.

The method continues at step 440 where the processing module masks the encryption key using the mask to produce a masked key. The masking includes applying a masking function. For example, the processing module performs the exclusive OR function on the encryption key and the mask to produce the masked key when the masking function includes the exclusive OR function.

The method continues at step 442 where the processing module combines the at least two ciphertexts and the masked key to produce secure data. For example, the processing module appends the masked key to the at least two ciphertexts to produce the secure data. As another example, the processing module interleaves the masked key with the at least two ciphertexts to produce the secure data.

Figure 43A:
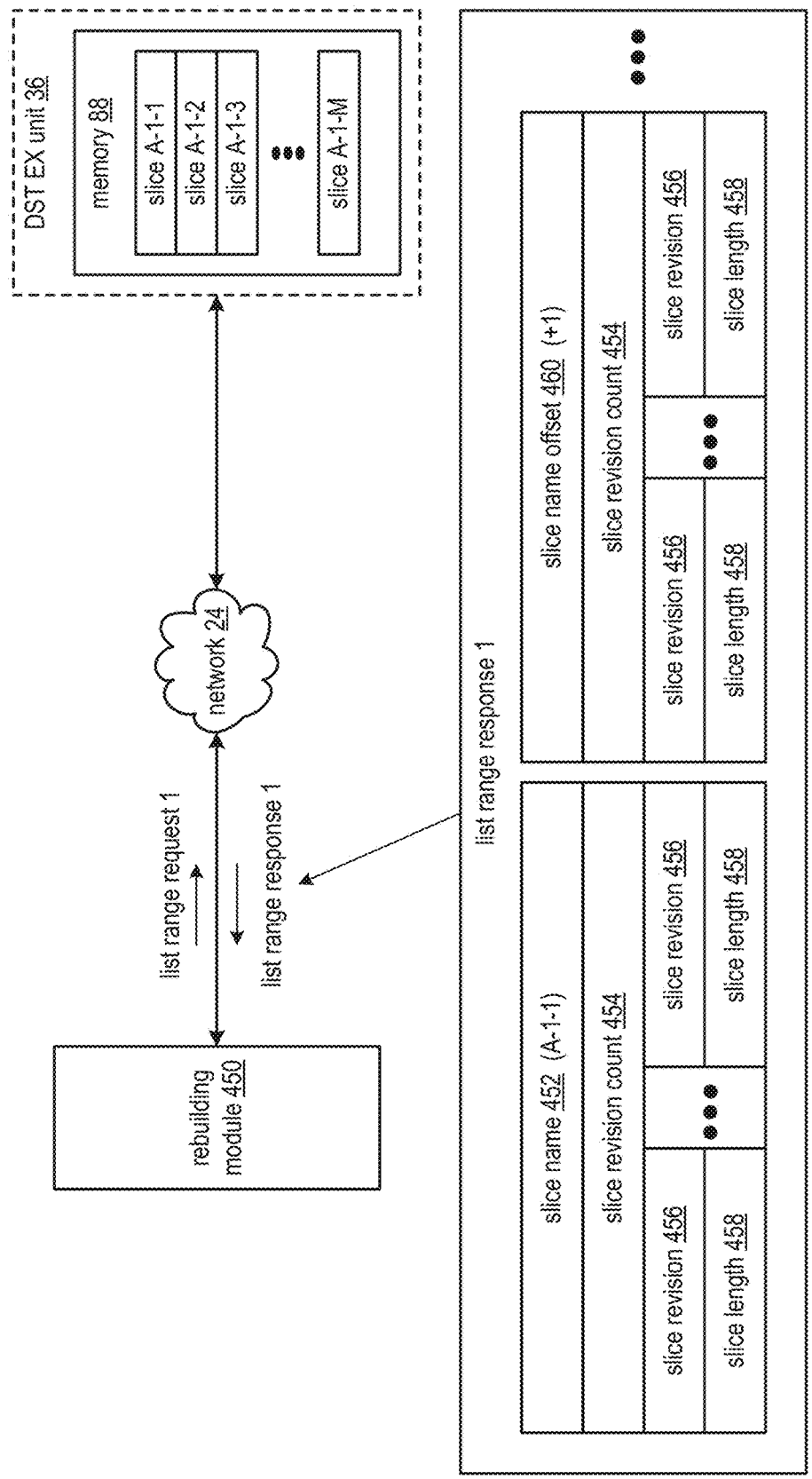
FIG. 43A is a schematic block diagram of another embodiment of a dispersed storage network in accordance with the present invention.

FIG. 43A is a schematic block diagram of another embodiment of a dispersed storage network (DSN) that includes a rebuilding module 450, the network 24 of FIG. 1, and the DST execution unit 36 of FIG. 1. The rebuilding module 450 may be implemented utilizing the rebuilding module 350 of FIG. 40A. The DST execution unit 36 includes the memory 88 of FIG. 3. The DSN functions to efficiently identify encoded data slices stored in the memory 88.

In an example of operation of the identifying of the encoded data slices stored in the memory 88, the rebuilding module 450 issues, via the network 24, a list range request 1 that identifies a start slice name range and an end slice name range. The encoded data slices stored in the memory 88 are associated with slice names. The DST execution unit 36 is associated with a stored slice name range, where the stored slice name range includes slice names of the stored encoded data slices. The stored slice name range includes a range of the list range request. For example, the start slice name range and the end slice name range fall within the stored slice name range.

The DST execution unit 36 receives the list range request 1. Having received the list range request 1, the DST execution unit 36 identifies slice names 452 associated with stored encoded data slices corresponding to the list range request 1. For example, the DST execution unit 36 identifies slices A-1-1, A-1-2, through A-1-M as the slice names that fall within the slice name range of the request.

Having identified the slice names of the stored encoded data slices associated with the request, the DST execution unit 36, for a first slice name 452 of the slice name range, generates a first portion of a list range response 1 that includes the first slice name (e.g., A-1-1) in a slice name field 452, an entry of a slice revision count field 454 corresponding to the first slice name, and, for each identified revision, the slice revision entry of a slice revision field 456 and a slice length entry of a slice length field 458.

Having generated the first portion of the list range response 1, the DST execution unit 36, for each remaining slice name of the slice name range, generates further portions of the list range response 1 that includes a representation of the remaining slice name in a slice name offset field 460, an entry of another slice revision count field 454 for the remaining slice name, and, for each identified revision of the remaining slice name, a slice revision entry of another slice revision field 456 and a slice length entry of another slice length field 458.

The representation of the remaining slice name includes at least one of an offset from the first slice name based on the remaining slice name, and a result of applying a deterministic function to the first slice name and the remaining slice name. For example, the DST execution unit 36 generates the representation of the remaining slice name as 10 when the remaining slice name (e.g., A-1-11) is offset by 10 from the first slice name. As such, a size efficiency is provided as successive slice name offset fields are smaller in size (e.g., 4-24 bytes) than the slice name field (e.g., 48 bytes).

Figure 43B:
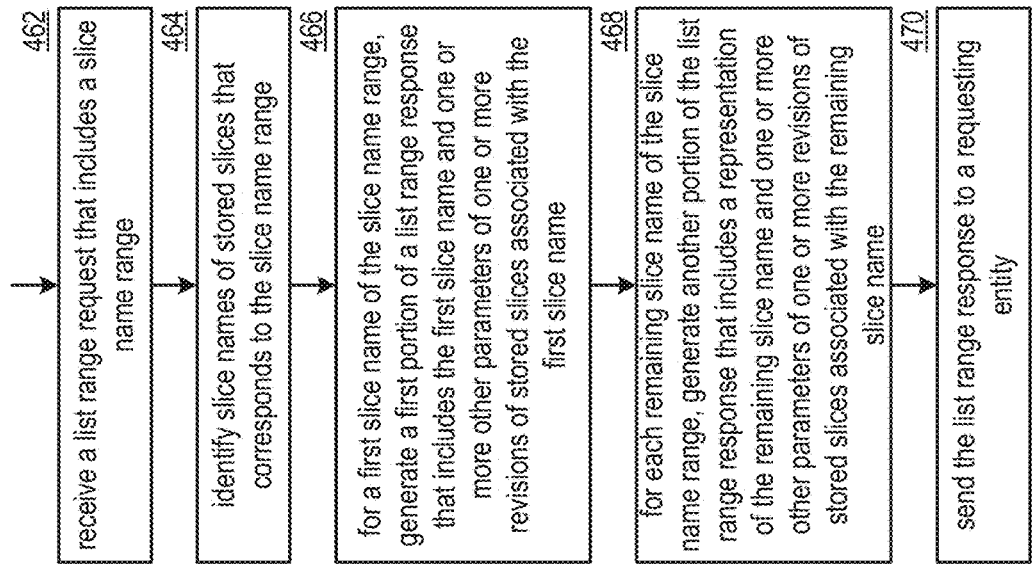
FIG. 43B is a flowchart illustrating an example of identifying stored slices in accordance with the present invention.

FIG. 43B is a flowchart illustrating an example of identifying stored slices. The method begins or continues at step 462 where a processing module (e.g., of a distributed storage and task (DST) client module) receives a list range request from a requesting entity, where the request includes a slice name range. The method continues at step 464 where the processing module identifies slice names of stored slices that correspond to the slice name range. For example, the processing module identifies slice names of stored encoded data slices where the slice names fall within the slice name range.

The method continues at step 466 where, for a first slice name of the slice name range, the processing module generates a first portion of a list range response that includes the first slice name and one or more other parameters of one or more revisions of stored slices associated with the first slice name. The other parameters include one or more of a slice revision count of the number of the one or more revisions, a slice revision number for each slice revision, and a slice length of the stored slice of each slice revision.

The method continues at step 468 where, for each remaining slice name of the slice name range, the processing module generates another portion of the list range response that includes a representation of the remaining slice name and one or more other parameters of one or more revisions of stored slices associated with the remaining slice name. For example, the processing module generates the other portion of the list range response to include an offset from the first slice name as the representation of the remaining slice name. The method continues at step 470 where the processing module sends the list range response to the requesting entity.

Figure 44A:
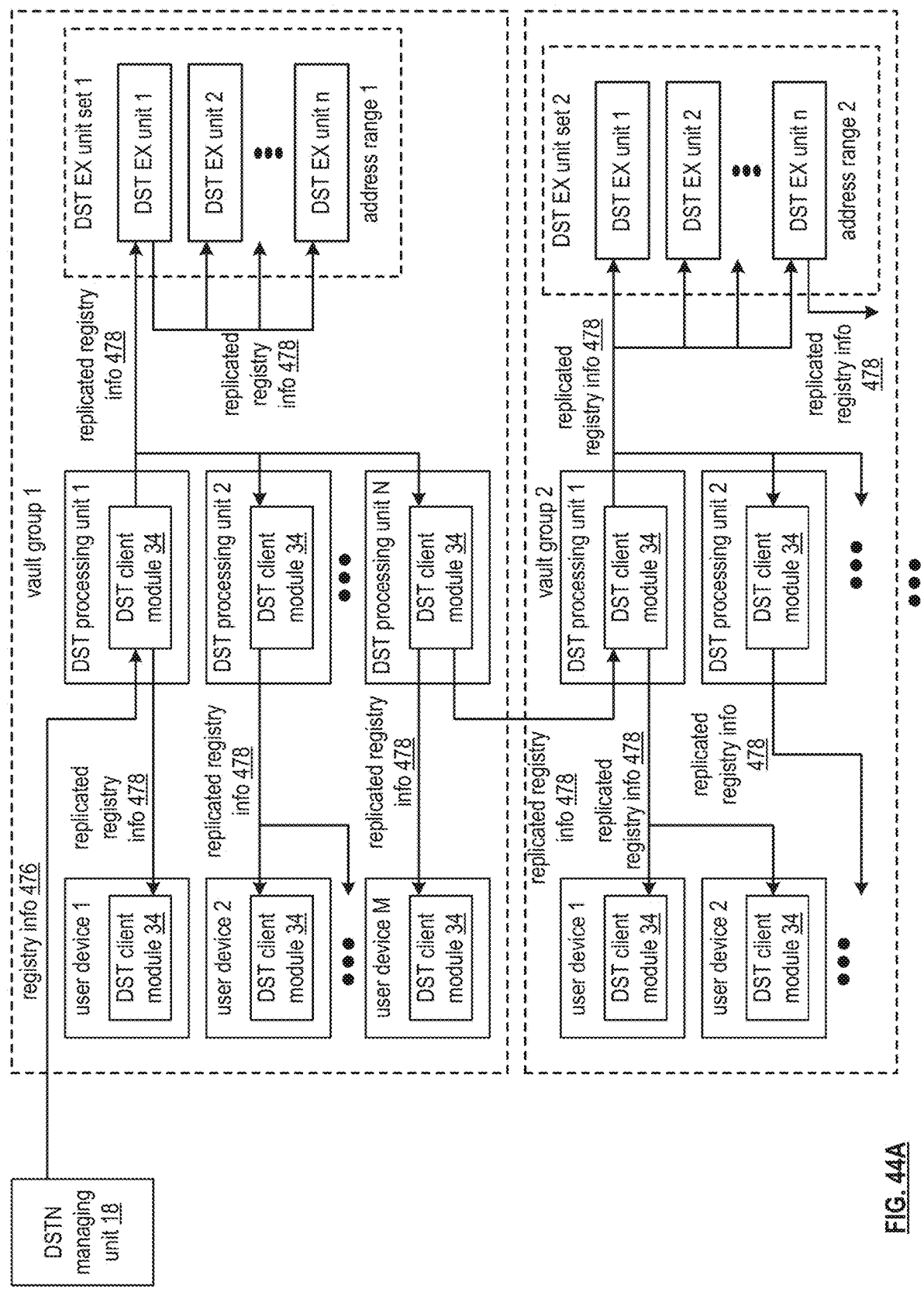
FIG. 44A is a schematic block diagram of another embodiment of a dispersed storage network in accordance with the present invention.

FIG. 44A is a schematic block diagram of another embodiment of a dispersed storage network (DSN) that includes the distributed storage and task network (DSTN) managing unit 18 of FIG. 1, and a plurality of vault groups. Each vault group includes a plurality of DSN entities including one or more of a plurality of user devices 1-M, a plurality of distributed storage and task (DST) processing units 1-N, and a DST execution unit set. Each DST execution unit set includes a set of DST execution units 1-n. Each DST execution unit may be implemented utilizing the DST execution unit 36 of FIG. 1. Each of the plurality of user devices and the plurality of DST processing units includes the DST client module 34 of FIG. 1. The plurality of user devices may be implemented with the user device 12 of FIG. 1. Each of the DST processing units may be implemented using the DST processing unit 16 of FIG. 1.

The system functions to distribute registry information 476 from the DSTN managing unit 18 to the plurality of vault groups in accordance with a distribution scheme. The registry information 476 includes one or more of hardware configuration information, software version information, software, software configuration information, user group affiliation information, an access control list, system namespace information (e.g., virtual DSN addressing approach), and vault information. The vault information includes one or more of DSN address ranges, slice name ranges, system entity mapping to a vault, and vault parameters. The vault parameters include one or more of an information dispersal algorithm (IDA) width, an IDA identifier, an encoding matrix, a decoding matrix, a write threshold value, a read threshold value, and a decode threshold value. In an example of operation of distributing the registry information, the DSTN managing unit 18 generates the registry information 476.

The DSN entities of each vault group share one or more common affiliations. The affiliations include one or more of a device type affiliation (e.g., user devices, DST processing units, DST execution units), a user group affiliation (e.g., subgroups of user devices), an address range affiliation (e.g., common DSN address ranges associated with a portion of the vault group), and resource group affiliations (e.g., a mapping of two or more DSN entities of the vault group to a resource pool such as a first DST processing unit maps to the set of DST execution units 1-n).

The distribution scheme includes one or more of sending the registry information 476 directly to each DSN entity of each vault group, sending the registry information 476 to a subset of the DSN entities of each vault group, and sending the registry information 476 to one or more DSN entities of a subset of the vault groups. For example, the DSTN managing unit 18 directly sends the registry information 476 to every user device, every DST processing unit, and every DST execution unit of the DSN. As another example, the DSTN managing unit 18 sends the registry information 476 to a first DST processing unit of each vault group, where the first DST processing unit of each vault group forwards the registry information 476 to remaining DSN entities of the vault group. As yet another example, the DSTN managing unit 18 sends the registry information 476 to the first DST processing unit of the first vault group, where the first DST processing unit facilitates further distribution of the registry information 476 to remaining DSN entities of the first vault group and all DSN entities of remaining vault groups.

The distribution scheme may further include distribution of the registry information 476 based on at least some of the one or more common affiliations. For example, the first DST processing unit receives the registry information 476 and sends replicated registry information 478 to the set of DST execution units 1-n of the common vault group 1 when a first resource group affiliation includes the first DST processing unit and the set of DST execution units 1-n.

As a specific example, the DSTN managing unit 18 obtains the registry information 476. The obtaining includes at least one of updating a previous registry information to produce the registry information 476 based on received updates, generating the registry information 476 for initialization of the DSN based on receiving manager inputs, and retrieving the registry information 476 from at least one of a local memory and from a set of DST execution units (e.g., recover a decode threshold number of encoded registry slices, dispersed storage error decode the decode threshold number of encoded registry slices to reproduce the registry information).

Having obtained the registry information 476, the DSTN managing unit 18 obtains the distribution scheme. The obtaining includes one or more of generating, selecting, identifying, retrieving, performing a lookup, utilizing a predetermination, initiating a query, and receiving a query response. Having obtained the distribution scheme, the DSTN managing unit 18 selects, based on the distribution scheme, one or more DSN entities for a first distribution of the registry information 476. For example, the DSTN managing unit 18 selects DST processing unit 1 when the distribution scheme includes utilizing one DSN entity of one vault group to start distribution and the DST processing unit 1 is affiliated with other DSN entities of the vault group 1.

Having selected the one or more DSN entities for the first distribution, the DSTN managing unit 18 sends the registry information 476 to the selected one or more DSN entities. Each of the selected one or more DSN entities receives the registry information 476 and updates a local copy of the registry information with received registry information. Each of the selected one or more DSN entities replicates the received registry information to produce the replicated registry information 478. The replicating includes one or more of copying, encoding, compressing, decompressing, transforming, and appending additional information (e.g., an identifier of the DSN entity, a timestamp corresponding to when the registry information was received, a target list of identifiers of remaining DSN entities of the vault group for distribution).

Having replicated the received registry information, each of the selected one or more DSN entities identifies one or more other successive distribution entities based on at least some of the one or more common affiliations. For example, the DST processing unit 1 identifies the DST execution units 1-n as part of a common resource group, identifies DST processing units 2-N as another common resource group, and user device 1 as yet another common resource group.

Having identified the one or more other successive distribution entities, each of the selected one or more DSN entities sends the replicated registry information 478 to the identified one or more other successive distribution entities. Each of the one or more successive distribution entities locally stores the replicated registry information 478 and may further distribute the replicated registry information 478 to even more successive distribution entities as described above. For example, the DST processing unit N of vault group 1 sends the replicated registry information to the DST processing unit 1 of the vault group 2 to further distributes the replicated registry information 478 to the DSN entities associated with the vault group 2. The distribution may further include modifying the target list of identifiers of the remaining DSN entities for distribution to indicate when one of the remaining DSN entities has received the replicated registry information 478.

Figure 44B:
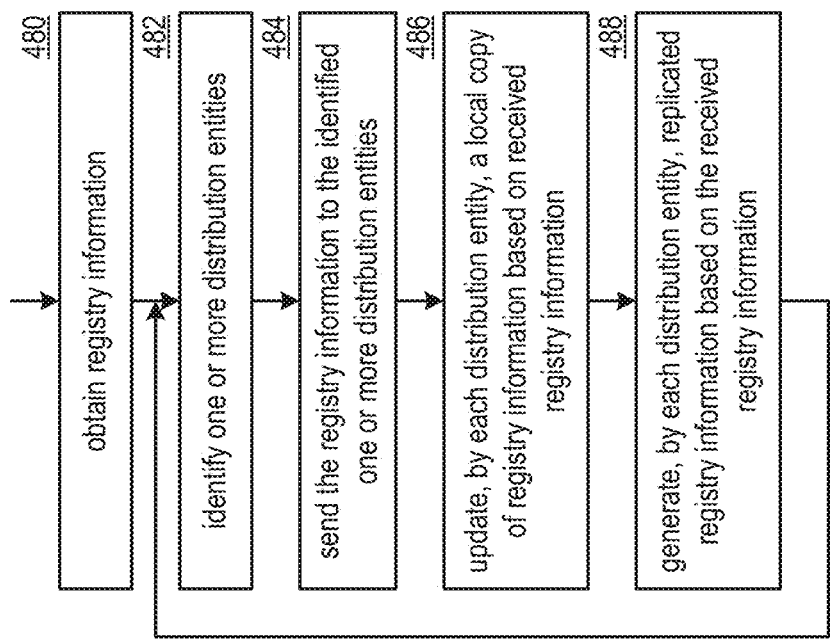
FIG. 44B is a flowchart illustrating an example of distributing registry information in accordance with the present invention.

FIG. 44B is a flowchart illustrating an example of distributing registry information. The method begins or continues at step 480 where a processing module (e.g., a plurality of processing modules of a plurality of computing devices) obtains registry information. For example, the processing module updates previous registry information based on receiving a manager input. For instance, the processing module updates a dispersed storage network (DSN) address range associated with a first vault based on the manager input.

The method continues at step 482 where the processing module identifies one or more distribution entities. The identifying includes one or more of accessing a list, interpreting an affiliation of one or more DSN entities, and identifying a DSN entities that have not received updated registry information. The method continues at step 484 where the processing module sends the registry information to the identified one or more distribution entities. The method continues at step 486 where each distribution entity updates a local copy of registry information based on received registry information. The updating includes one or more of overwriting a previous copy of the registry information, storing the received registry information, and overwriting a portion of the previous copy. For example, the processing module partitions the received registry information to produce a portion of the registry information that is associated with the processing module and overwrites the local copy of registry information with the portion of the registry information.

The method continues at step 488 where each distribution entity generates replicated registry information based on the received registry information. For example, the processing module of appends a distribution entity identifier and a timestamp to the received registry information to produce the replicated registry information. The method may loop back to step 482 where the processing module identifies one or more distribution entities for further distribution of the replicated registry information as registry information.

Figure 45A:
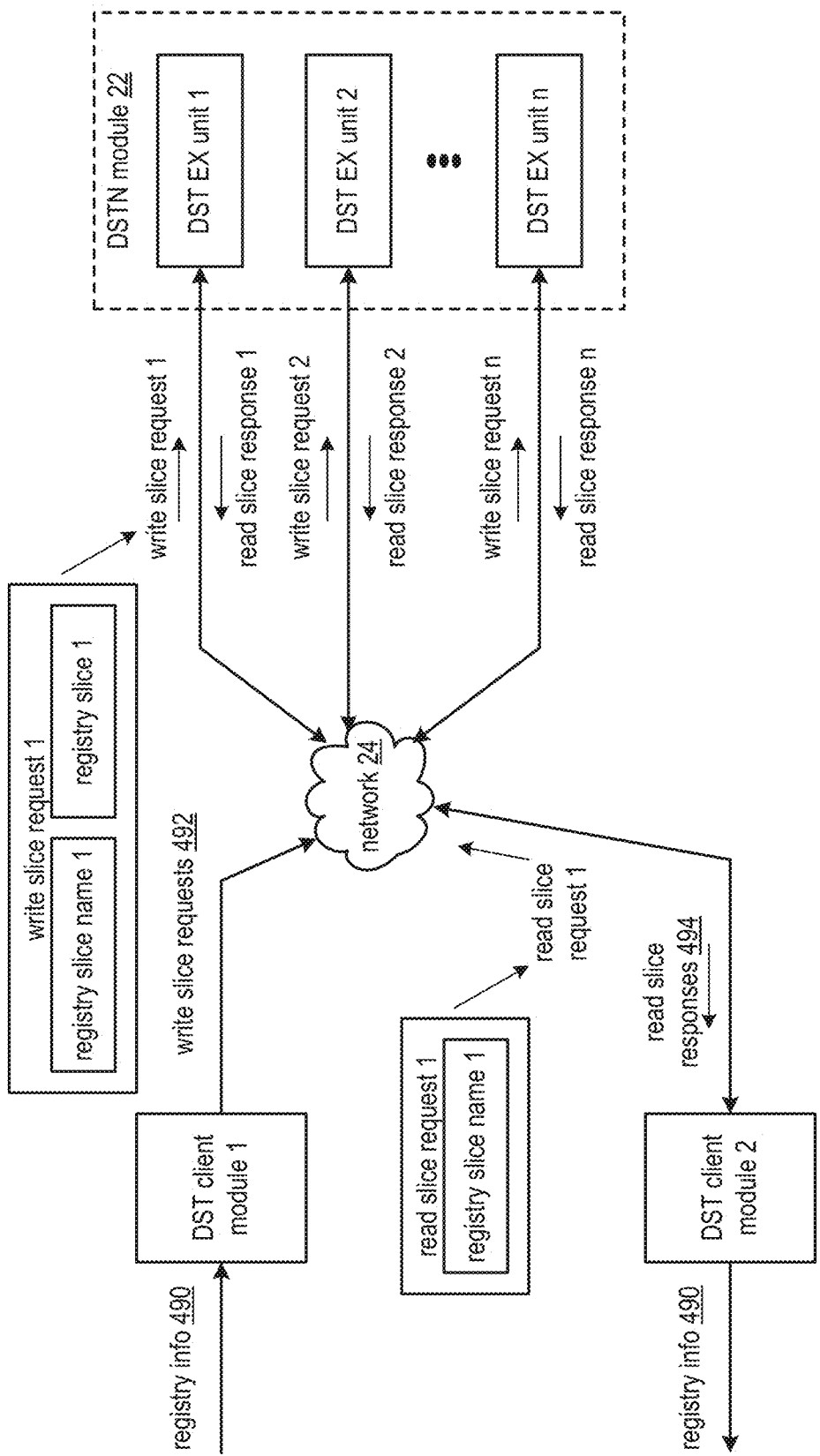
FIG. 45A is a schematic block diagram of another embodiment of a dispersed storage network in accordance with the present invention.

FIG. 45A is a schematic block diagram of another embodiment of a dispersed storage network (DSN) that includes distributed storage and task (DST) client modules 1-2, the network 24 of FIG. 1, and a DSTN module 22 of FIG. 1. The DSTN module 22 includes a set of DST execution units 1-n. Each DST execution unit may be implemented utilizing the DST execution unit 36 of FIG. 1. The DST client modules 1-2 may each be implemented utilizing the DST client module 34 of FIG. 1.

The DSN functions to provide access to registry information 490. In an example of operation of providing the access to the registry information 490, at least one of the DST client modules 1-2 determines to access the registry information 490. The determining may be based on one or more of receiving a request to access the DSN, detecting activation of a new DSN entity, receiving updated registry information, and detecting that a registry information refresh timeframe has expired. For example, the DST client module 1 determines to access the registry information 490 to store updated registry information when receiving the updated registry information. As another example, the DST client module 2 determines to access the registry information to recover the registry information when activating a new DSN entity.

Having determined to access the registry information 490, the at least one of the DST client modules 1-2 selects a registry information source name access method. The source name includes a DSN address corresponding to storage of the registry information in the DSTN module 22. The selecting may be based on one or more of a predetermination, detecting whether a pre-stored source name exists, and detecting whether the source name has been received. The method includes one or more of using a predetermined source name of the registry information, accessing a dispersed hierarchical index to recover the source name, accessing a directory to retrieve the source name, and accessing a distributed hash table to extract the source name. For example, the DST client module 1 selects the method of using the predetermined source name of the registry information when detecting that the pre-stored source name exists (e.g., a bootstrap parameter).

Having selected the registry information source name access method, the at least one of the DST client modules 1-2 acquires the source name of the registry information based on the selected registry information source name access method. For example, the DST client module 1 accesses a local memory to retrieve the source name of the registry information.

Having acquired the source name of the registry information, the at least one of the DST client modules 1-2 accesses the DSTN module 22 using the source name of the registry information to access the registry information. The accessing includes the at least one of the DST client modules 1-2 generating a set of registry slice names based on the source name and utilizing the set of registry slice names to access the DSTN module 22. For example, the DST client module 1, when storing the registry information, dispersed storage error encodes the registry information 490 to produce a set of encoded registry slices, issues a set of write slice requests 492 to the DSTN module 22 that includes sending, via the network 24, a set of write slice requests 1-n to the set of DST execution units 1-n. The set of write slice requests 1-n includes the set of registry slice names and the set of encoded registry slices.

In an example of operation of retrieving the registry information 490, the DST client module 2, issues a set of read slice requests to the DSTN module 22 that includes sending, via the network 24, a set of read slice requests 1-n to the set of DST execution units 1-n, receiving at least some of a set of read slice responses 1-n as read slice responses 494, and dispersed storage error decoding received encoded registry slices extracted from the received read slice responses to reproduce the registry information 490.

Figure 45B:
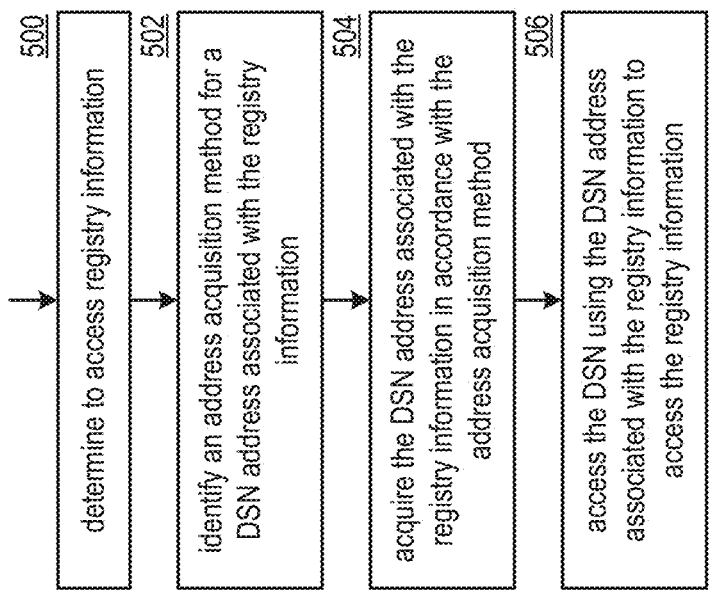
FIG. 45B is a flowchart illustrating an example of accessing registry information in accordance with the present invention.

FIG. 45B is a flowchart illustrating an example of accessing registry information. The method begins or continues at step 500 where a processing module (e.g., of a distributed storage and task (DST) client module) determines to access registry information. For example, the processing module receives a request that requires registry information. The method continues at step 502 where the processing module identifies an address acquisition method for a dispersed storage network (DSN) address associated with the registry information. The identifying may be based on one or more of a predetermination, a registry information access failure indicator, a DSN address access failure, a received method indicator, initiating a query, and receiving a query response.

The method continues at step 504 where the processing module acquires the DSN address associated with registry information in accordance with the address acquisition method. For example, the processing module retrieves a preprogrammed DSN address for the registry information. As another example, the processing module retrieves a DSN address for a DSN directory and accesses the DSN directory using the DSN address of the DSN directory to obtain the DSN address associated with registry information.

The method continues at step 506 where the processing module accesses the DSN using the DSN address associated with the registry information to access the registry information. For example, the processing module generates at least one set of slice names based on the DSN address associated with registry information. For instance, the processing module generates each slice name to include the DSN address associated with the registry information. Having generated the at least one set of slice names, the processing module issues a set of access requests to the DSN, where the set of access requests includes the at least one set of slice names.

Figure 46A:
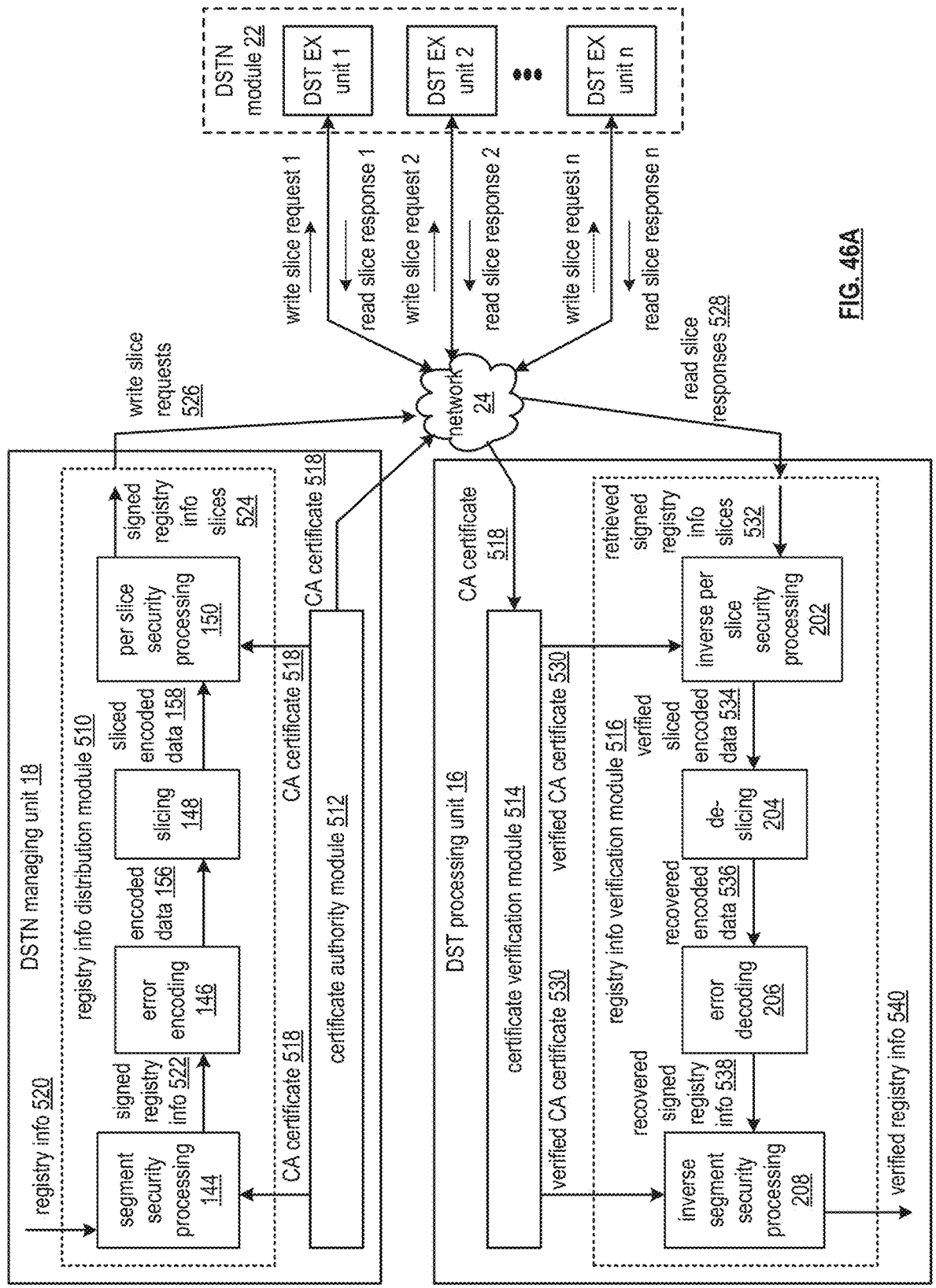
FIG. 46A is a schematic block diagram of another embodiment of a dispersed storage network in accordance with the present invention.

FIG. 46A is a schematic block diagram of another embodiment of a dispersed storage network that includes the distributed storage and task network (DSTN) managing unit 18 of FIG. 1, the network 24 of FIG. 1, the DSTN module 22 of FIG. 1, and the distributed storage and task (DST) processing unit 16 of FIG. 1. The DSTN managing unit 18 includes a registry information distribution model 510 and a certificate authority module 512. Each of the registry information distribution model 510 and a certificate authority module 512 may be implemented utilizing one or more of the DST client module 34 of FIG. 1, the processing module 84 of FIG. 3, and the DST processing unit 16 of FIG. 1. The registry information distribution model 510 includes the segment security processing 144 of FIG. 6, the error encoding 146 of FIG. 6, the slicing 148 of FIG. 6, and the per slice security processing 150 of FIG. 6. The DSTN module 22 includes a set of DST execution (EX) units 1-n. Each DST execution unit may be implemented utilizing the DST execution unit 36 of FIG. 1. The DST processing unit 16 includes a certificate verification module 514 and a registry information verification module 516. Each of the certificate verification module 514 and the registry information verification module 516 may be implemented utilizing one or more of the DST client module 34 of FIG. 1, the processing module 84 of FIG. 3, and the DST processing unit 16 of FIG. 1. The registry information verification module 516 includes the inverse per slice security processing 202 of FIG. 16, the de-slicing 204 of FIG. 16, the error decoding 206 of FIG. 16, and the inverse segment security processing 208 of FIG. 16.

The DSN functions to distribute registry information 520 to entities of the DSN. The registry information 520 includes one or more of hardware configuration information, software version information, software, software configuration information, user group affiliation information, an access control list, system namespace information, and vault information. The vault information includes one or more of DSN address ranges, slicing ranges, system entity vault affiliation, and vault parameters. The vault parameters include one or more of an information dispersal algorithm (IDA) identifier, an IDA width, an encoding matrix, a decoding matrix, a write threshold number, a read threshold number, and a decode threshold number.

Figure 46C:
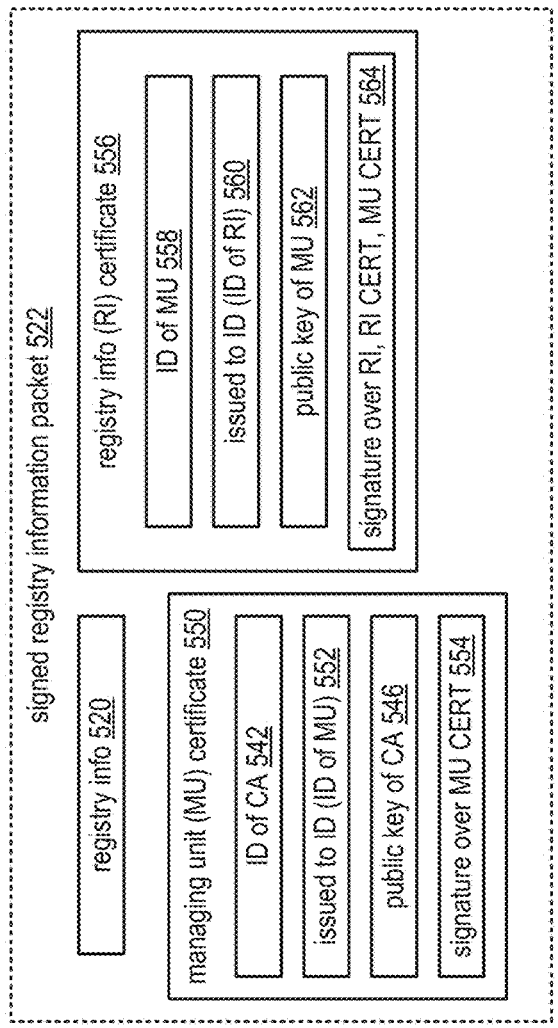
FIG. 46C is a diagram illustrating an example of a signed registry information packet in accordance with the president mission.
Figure 46B:
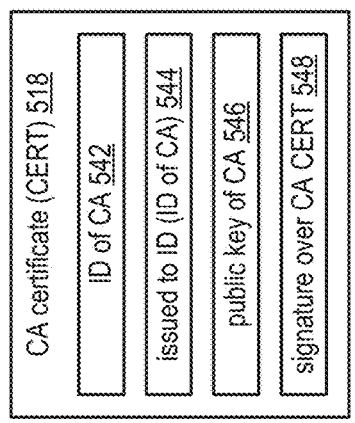
FIG. 46B is a diagram illustrating an example of a certificate authority certificate in accordance with the present invention.

In an example of operation of the distributing of the registry information 520, the certificate authority module 512 issues a certificate authority (CA) certificate 518 to a plurality of entities of the DSN (e.g., modules and units of the DSN). The issuing includes generating the CA certificate 518 and sending the CA certificate 518 to the plurality of entities of the DSN. FIG. 46B illustrates an example of the CA certificate 518 where the certificate authority module 512 generates the CA certificate 518 to include one or more of an identifier (ID) of the certificate authority 542, an issued to ID (e.g., the ID of the certificate authority) 544, a public key of the certificate authority 546, and a signature over the certificate authority certificate 548. For example, returning to FIG. 46A, the certificate authority module 512 generates a public/private key pair in accordance with a public key infrastructure (PKI) approach, where the public/private key pair includes the public key of the CA 546. As a specific example of generating the signature over the CA certificate, the certificate authority module 512 applies a hashing function over the CA certificate to produce a hashed value and encrypts the hashed value using the private key of the public/private key pair to produce the signature over the CA certificate 548. As another specific example of generating the signature to see certificate, the certificate of 512 applies a signing function to the CA certificate using the private key of the public/private keeper to produce the signature over the CA certificate 548.

Having generated the CA certificate 518, certificate authority 512 sends the CA certificate 518 to the plurality of entities of the DSN. As a specific example, the certificate authority 512 outputs the CA certificate 518 to the registry information distribution module 510. As another specific example, the certificate authority 512 sends, via the network 24, the CA certificate 518 to the DST processing unit 16. The certificate verification module 514 verifies the received CA certificate 518 to produce a verified CA certificate 530. As a specific example, the certificate verification module 514 applies the hashing function over the received CA certificate 518 (e.g., not including the signature) to produce a generated hashed value, extracts the public key of the CA 546 from the received CA certificate 518, extracts the signature over the CA certificate 548 from the received CA certificate 518, decrypts the extracted signature utilizing the extracted public key of the CA 546 to produce a recovered hashed value, and indicates that the received CA certificate 518 is favorably verified when the recovered hash value compares favorably (e.g., substantially the same) to the generated hash value.

With the CA certificate 518 issued to the plurality of entities of the DSN, the segment security processing module 144 obtains the registry information 520. The obtaining includes one or more of generating the registry information based on system manager input, receiving the registry information, and recovering the registry information from the DSTN module 22. Having obtained the registry information 520, the segment security processing 144 generates, as illustrated in FIG. 46C, a signed registry information packet 522 that includes one or more of the registry information 520, a certificate authority (CA) signed managing unit's certificate 550, a registry information certificate 556, and a CA signature for the signed registry information packet 564. The managing unit refers to at least one of the DSTN managing unit 18, the registry information distribution module 510 and the certificate authority module 512.

The segment security processing 144 generates the CA signed managing unit certificate 550 to include one or more of the ID of the CA 542, an issued to ID of the managing unit 552, the public key of the CA 546, and a signature over the managing unit certificate 554 (e.g., over the ID of the CA 542, the issued to ID 552, and the public key of the CA 546) using the private key of the public/private key pair generated by the certificate authority. Having generated the managing unit certificate 550 the segment security processing 144 generates the registry information certificate 556 to include one or more of an identifier of the managing unit 558, an issued to ID of the registry information 560 (e.g., an identifier of the registry information such as an identifier associated with a unique revision number of the registry information 520), a public key of the managing unit 562 (e.g., of a public/private key pair generated by the managing unit), and a signature over one or more of the registry information 522, the registry information certificate 556, and the managing unit certificate 560, using a private key of the public/private key pair generated by the managing unit, as the CA signature for the signed registry information packet 564.

With the signed registry information packet 522 generated, the registry information distribution module 510 dispersed storage error encodes the signed registry information packet 522 to produce a set of encoded registry information slices 158. For example, the error coding 146 matrix multiplies including matrix by the signed registry information packet 522 to generate an encoded data matrix as encoded data 156 and the slicing 148 performs a slicing operation on rows of the encoded data matrix to produce the set of encoded registry information slices 158 as sliced encoded data 158 (e.g., n slices when an information dispersal algorithm width is n).

Figure 46D:
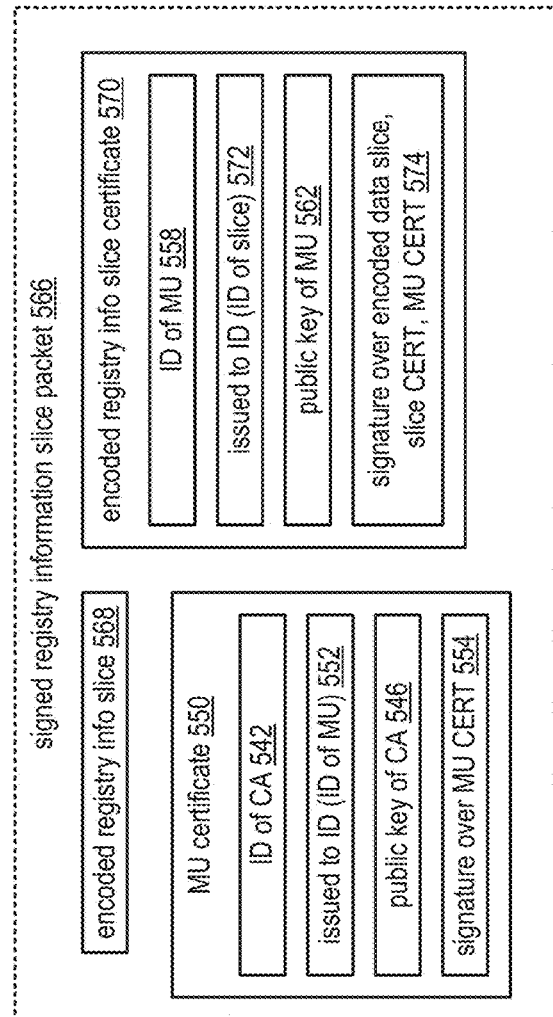
FIG. 46D is a diagram illustrating an example of a signed registry information slice in accordance with the present invention.

With the set of encoded registry information slices 158 produced, for an encoded registry information slice 568 of the set of encoded registry information slices 158, the per slice security processing 150 generates a signed encoded registry information slice packet 566 as illustrated in FIG. 46D. As a specific example, for each encoded registry information slice 568 of the set of encoded registry information slices 158, the per slice security processing 150 generates a unique signed encoded registry information slice packet 566 to produce a set of n signed encoded registry information slice packets 566. For instance, the per slice security processing 150 generates the signed encoded registry information slice packet 566 to include one or more of the encoded registry information slice 568, the CA signed managing unit's certificate 550, an encoded registry information slice certificate 570, and a CA signature for the signed encoded registry information slice packet 574. The encoded registry information slice certificate 570 includes the ID of the managing unit 558, an issued to ID 572 of the corresponding encoded registry information slice (e.g., an identifier of the encoded registry information slice such as a sliced name), the public key of the managing unit 562, and a signature over one or more of the encoded registry information slice 568, the corresponding registry information certificate 556, the encoded registry information slice certificate 570, and the managing unit certificate 550.

Having generated the signed encoded registry information slice packet 566, the registry information distribution module 510 outputs (e.g., via an interface of the DSTN managing unit 18) signed encoded registry information slice packet 566 to a DST execution unit (e.g., a storage unit) of the DSN (e.g., of the set of DST execution units 1-n). For example, the registry information distribution module 510 outputs the set of signed encoded registry information slice packets 566 to storage units of the DSN, where the set of signed encoded registry information slice packets 566 includes the signed encoded registry information slice packet and the storage units includes the storage unit. For instance, the registry information distribution module 510 generates a set of write slice requests 526 that includes the set of signed registry information slices 524 and sends, via the network 24, the set of write slice requests 526 to the set of DST execution units 1-n such that the set of DST execution units 1-N stores the set of signed registry information slices 524. In the example of operation of the distributing of the registry information 520, the distributing further includes the DST processing unit 16 recovering the registry information 520 from the DSTN module 22. In an example of operation of the recovering of the registry information 520, DST processing unit 16, having received the signed CA certificate 518 to produce the verified CA certificate 530, issues, via the network 24, read slice requests to at least some of the DST execution units 1-n. Having issued the read slice requests, the DST processing unit 16 receives, via the number 24, at least a decode threshold number of read slice responses 528, where each read slice response includes a corresponding retrieved signed encoded registry information slice packet. For example, the registry information verification module 516 retrieves, via an interface of the DST processing and 16, at least a decode threshold number of signed encoded registry information slice packets 532 of a set of signed encoded registry information slice packets. Each signed encoded registry information slice packet includes one or more of the encoded registry information slice, the CA signed managing unit's certificate, the encoded registry information slice certificate, and the CA signature for the signed encoded registry information slice packet. The encoded registry information slice certificate includes one or more of the identifier of the managing unit, the identifier of the encoded registry information slice, and the public key of the managing unit.

For each of the at least a decode threshold number of signed encoded registry information slice packets, the inverse per slice security processing 202 recovers an encoded registry information slice by validating a certificate authority (CA) signed managing unit's certificate of a signed encoded registry information slice packet based on the verified CA certificate 530 to produce a valid managing unit's certificate, and validating the signed encoded registry information slice packet based on the valid managing unit's certificate. For example, the inverse per slice security processing 202 validates the managing unit certificate 550 by verifying that a hash over the managing unit certificate 550 is substantially the same as a decrypted signature over the managing unit certificate using the public key of the certificate authority 546. As another example, the inverse per slice security processing 202 validates the signed encoded registry information slice packet by verifying that a hash over the encoded registry information slice 568, the managing unit certificate 550, and the encoded registry information slice certificate 570 is substantially the same as a decrypted signature over the encoded registry information slice, the managing certificate, and the encoded registry information slice certificate using the public key of the managing unit 562 when the issue to ID 552 is substantially the same as the ID of the managing unit 558.

With the decode threshold number of signed encoded registry information slice packets verified, the inverse per slice security processing 202 extracts a corresponding decode threshold number of encoded registry information slices as verified sliced encoded data 534 from the verified decode threshold number of signed encoded registry information slice packets. The registry information verification module 516 dispersed storage error decodes at least a decode threshold number of recovered encoded registry information slices to produce a signed registry information packet as recovered signed registry information 538. For example, the de-slicing 204 arranges the verified encoded registry information slices into a decoding matrix as recovered encoded data 536 and the error decoding 206 performs a dispersed storage error coding function on the recovered encoded data 536 to produce the recovered signed registry information 538 as the signed registry information packet. The signed registry information packet includes one or more of the registry information 520, a second CA signed managing unit's certificate, the registry information certificate, and the CA signature for the signed registry information packet. The registry information certificate includes one or more of the identifier of the managing unit, the identifier of the registry information, and the public key of the managing unit.

With the signed registry information packet produced as the recovered signed registry information 538, the inverse segment security processing 208 validates the signed registry information packet based on the valid managing unit's certificate by validating the second CA signed managing unit's certificate of the signed registry information packet based on the CA certificate to produce the second valid managing unit's certificate. The second CA signed managing unit's certificate includes one or more of the identifier of the CA, the identifier of the managing unit, and the public key of the CA. The inverse segment security processing 208 validates the signed registry information packet based on the second valid managing unit's certificate and extracts registry information as verified registry information 540 from the signed registry information packet when the signed registry information packet is valid. In an instance of the validating, the inverse segment security processing 208 verifies that a decrypted signature over the managing unit certificate 550 matches a hash computed over the managing unit certificate, the public key of the CA 546 of the managing unit certificate 550 substantially matches a stored value from the verified certificate authority certificate 530, the identifier of the managing unit 558 within the registry information certificate 556 matches the issue to identifier of the managing unit 552 in the managing unit certificate 550, and a decrypted signature (e.g., decrypt signature 564) over the registry information 520, the registry information certificate 556, and the managing unit certificate 550 using the public key of the managing unit 562 substantially matches a hash computed over the same.

Figure 46E:
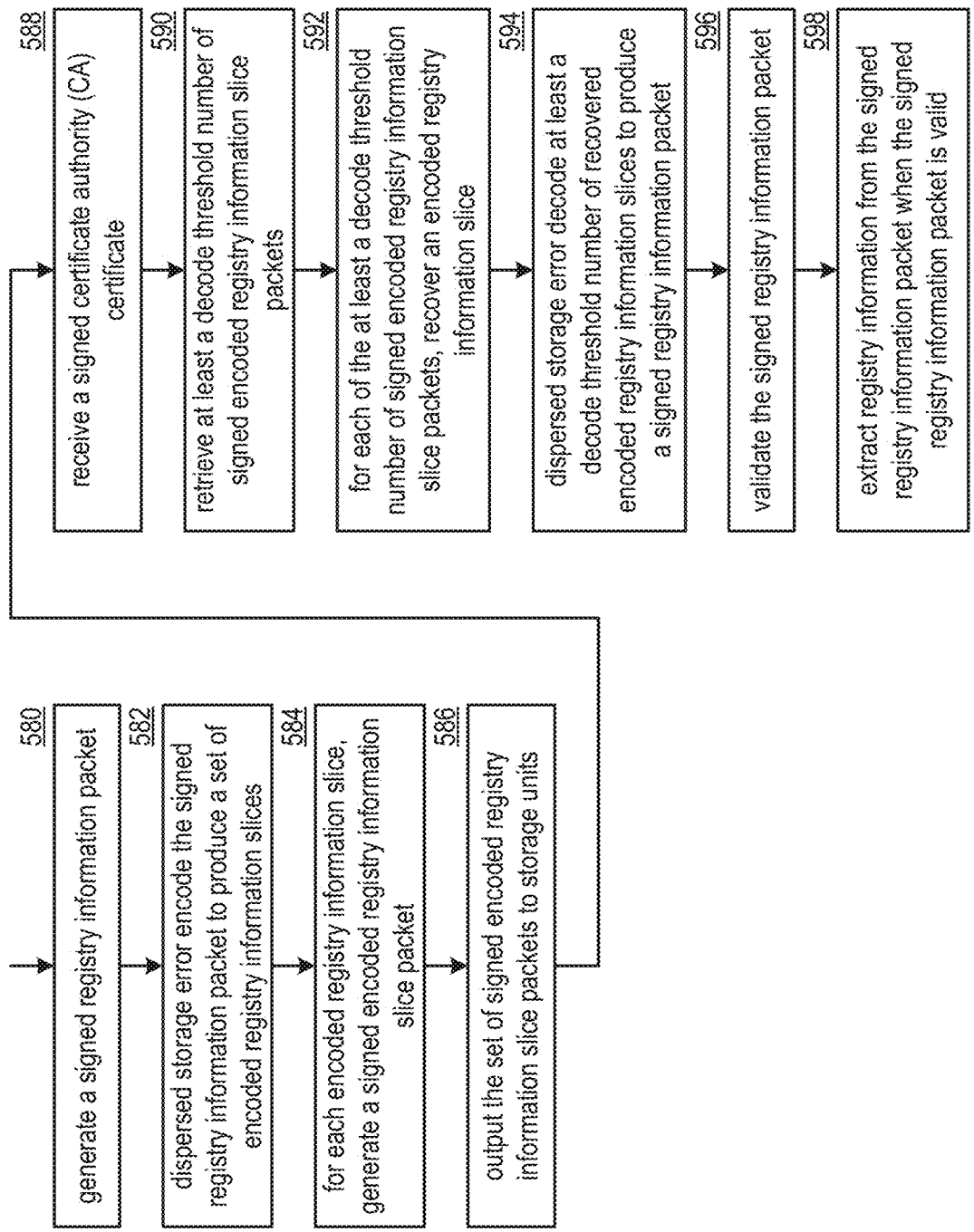
FIG. 46E is a flowchart illustrating an example of distributing registry information in accordance with the present invention.

FIG. 46E is a flowchart illustrating an example of distributing registry information. In particular, a method is presented for use in conjunction with one or more functions and features described in conjunction with FIGS. 1-39, 46A-D, and also FIG. 46E. The method begins or continues at step 580 where a processing module of a computing device of one or more computing devices of a dispersed storage network (DSN) generates a signed registry information packet that includes the registry information, a certificate authority (CA) signed managing unit's certificate, a registry information certificate, and a CA signature for the signed registry information packet.

The method continues at step 582 where the processing module dispersed storage error encodes the signed registry information packet to produce a set of encoded registry information slices. For an encoded registry information slice of the set of encoded registry information slices, the method continues at step 584 with a processing module generates a signed encoded registry information slice packet that includes the encoded registry information slice, the CA signed managing unit's certificate, an encoded registry information slice certificate, and a CA signature for the signed encoded registry information slice packet. Alternatively, or in addition to, the processing module, for each encoded registry information slice of the set of encoded registry information slices, generates a unique signed encoded registry information slice packet to produce a set of signed encoded registry information slice packets.

The method continues at step 586 where the processing module outputs the signed encoded registry information slice packet to a storage unit of the DSN. Alternatively, or in addition to, the processing module outputs the set of signed encoded registry information slice packets to storage units of the DSN, where the set of signed encoded registry information slice packets includes the signed encoded registry information slice packet and the storage units includes the storage unit.

The method continues at step 588 where the processing module receives a signed certificate authority (CA) certificate. For example, the processing module receives the sign CA certificate and stores the signed CA certificate in a local memory.

The method continues at step 590 where the processing module receives at least a decode threshold number of signed encoded registry information slice packets of the set of signed encoded registry information slice packets from at least some of the storage units. For each of the at least a decode threshold number of signed encoded registry information slice packets, the mother continues at step 592 where the processing module recovers an encoded registry information slice. For example, the processing module validates a CA signed managing unit's certificate of a signed encoded registry information slice packet based on the CA certificate to produce a valid managing unit's certificate and validates the signed encoded registry information slice packet based on the valid managing unit's certificate (e.g., uses a public key of the managing unit to validate a signature over the signed encoded registry information slice packet).

The method continues at step 594 where the processing module dispersed storage error decodes at least a decode threshold number of recovered encoded registry information slices to produce a signed registry information packet. The method continues at step 596 where the processing module validates the signed registry information packet based on the valid managing unit's certificate. For example, the processing module validates a second CA signed managing unit's certificate of the signed registry information packet based on the CA certificate to produce a second valid managing unit's certificate and validates the signed registry information packet based on the second valid managing unit's certificate (e.g., uses a public key of the managing unit from the second valid managing unit certificate to validate his signature over the signed registry information packet). The method continues at step 598 where the processing module extracts registry information from the signed registry information packet when the signed registry information packet is valid.

The method described above in conjunction with the processing module can alternatively be performed by other modules of the dispersed storage network or by other devices. In addition, at least one memory section of a computer readable storage medium that stores operational instructions can, when executed by one or more processing modules of one or more computing devices of the dispersed storage network (DSN), cause the one or more computing devices to perform any or all of the method steps described above.

FIGS. 47A-B are schematic block diagrams of another embodiment of a dispersed storage network that includes the distributed storage and task network (DSTN) managing unit 18 of FIG. 1, the network 24 of FIG. 1, a plurality of dispersed storage and task (DST) processing units 1-R, and the DSTN module 22 of FIG. 1. The DSTN managing unit 18 includes a deterministic function module 600 and an access control list (ACL) publishing module 602. The deterministic function module 600 and the ACL publishing module 602 may be implemented utilizing one or more of the DST client module 34 of FIG. 1 and the processing module 84 of FIG. 3. Each DST processing unit may be implemented utilizing the DST processing unit 16 of FIG. 1. The DSTN module 22 includes a set of DST execution units 1-n. Hereafter, the set of DST execution units may be referred to interchangeably as a set of storage units. Each DST execution unit may be implemented utilizing the DST execution unit 36 of FIG. 1. Each DST execution unit includes the deterministic function module 600, the processing module 84 of FIG. 3, and the memory 88 of FIG. 3.

The DSN functions to control access to the DSTN module 22, where accessing includes one or more of storing data, reading stored data, deleting the stored data, and listing the stored data. FIG. 47A illustrates initial steps of the controlling access where the deterministic function module 600 of the DSTN managing unit 18 performs a deterministic function on each access entity identifier (ID) 604 corresponding to each of the plurality of DST processing units 1-R to produce an obfuscated ID 606 for each of the plurality of DST processing units 1-R. Hereafter, each DST processing unit may be referred to interchangeably as one or more of a requesting entity and a requesting unit. Hereafter, the access entity ID 604 may be referred to interchangeably as a unique identifier 604. For instance, the DST processing unit 1 is associated with a universally unique identifier (UUID) of 457.

The performing of the deterministic function includes one or more of performing a hash function on the unique identifier 604, performing a hash based message authentication code function on the unique identifier 604, performing a mask generating function on the unique identifier 604, performing a sponge function on the unique identifier 604, and performing a cyclic redundancy check function on the unique identifier 604. For example, the deterministic function module 600 performs the hash function on a unique identifier of 457 associated with the DST processing unit 1 to produce an obfuscated ID 606 associated with the DST processing unit 1.

With the obfuscated ID 606 produced, the ACL publishing module 602 combines the obfuscated ID 606 with a corresponding access permissions 608 to produce an obfuscated ACL 610. Hereafter, the obfuscated ACL 610 may be referred to interchangeably as an obfuscated access permissions list 610. The access permissions 608 includes positive and/or negative access rights for a requesting entity associated with the obfuscated ID 606, where the access rights are associated with one or more of a type of data access and a DSN address (e.g., a slice name, a source name, a range of slice names) associated with data of the access. The type of data access includes at least one of a write request, a read request, a delete request, and a list request. For example, the ACL publishing module 602 combines the obfuscated ID 606 associated with the DST processing unit 1 and access permission 608 associated with the DST processing unit 1 to produce the obfuscated ACL 610.

Having produced the obfuscated ACL 610, the ACL publishing module 602 publishes the obfuscated ACL 610 to entities of the DSN. For example, the ACL publishing module 602 sends, via the network 24, the obfuscated ACL 610 to each of the DST execution units 1-n for storage. For example, the processing module 84 of the DST execution unit n receives the obfuscated ACL 610 and stores the obfuscated ACL 610 in the memory 88. For instance, the processing module 84 stores the obfuscated ID 606 associated with the DST processing unit 1 in the memory 88 and stores the access permission 608 associated with the obfuscated ID 606 in the memory 88.

FIG. 47B illustrates further steps of the controlling of the access where the set of storage units receives a plurality of sets of access requests 618 from the plurality of DST processing units 1-R (a plurality of requesting devices), where a requesting device of the plurality of requesting device generates a set of access requests 1-n of the plurality of sets of access requests 618 regarding a particular type of data access. Each access request includes one or more of a requesting entity ID 612, an access type 614, and a DSN ID 616. For instance, the DST processing unit 1 generates an access request n to include the requesting entity ID of 457, a write request access type 614, and an nth slice name as the DSN ID 616, where the nth slice name corresponds to an nth encoded data slice of a set of encoded data slices for retrieval; and sends, via the network 24, the access request to the DST execution unit n.

With the set of DST execution units 1-n receiving the plurality of sets of access requests 618, for a first storage unit of the set of storage units, the first storage unit receives a first access request from each set of access requests of the plurality of access requests to produce a group of first access requests. The first access request includes at least one of a read request, a write request, a delete request, and a list request. For example, the processing module 84 of the DST execution unit n produces the group of first access requests associated with nth encoded data slices of sets of encoded data slices.

Having produced the group of first access requests, the first storage unit extracts a unique identifier from each first access request of the group of first access requests to produce a first group of unique identifiers. For example, the DST execution unit n extracts the unique identifier of 457 associated with the DST processing unit 1 from each first access request to produce the first group of unique identifiers.

Having produced the first group of unique identifiers, the first storage unit, for a unique identifier of the first group of unique identifiers, performs a deterministic function on the unique identifier to produce a first obfuscated identifier. For example, the deterministic function module 600 of the DST execution unit n performs the hashing function on the requesting entity ID 612 of the first access requests to produce an obfuscated requesting entity ID 620 as the first obfuscated identifier. For instance, the deterministic function module 600 performs the hashing function on the universally unique ID of 457 of the DST processing unit 1 to produce the corresponding obfuscated ID of the DST processing unit 1 as the obfuscated requesting entity ID 620.

Having produced the first obfuscated identifier, the first storage unit seeks a first obfuscated access permissions list based on the first obfuscated identifier. For example, the processing module 84 accesses the memory 88 utilizing the obfuscated requesting entity ID 620 to determine whether an entry of at least one obfuscated ACL 610 corresponds to the obfuscated requesting entity ID 620 of the access requests. For instance, the processing module 84 indicates that the first obfuscated access permission list is found when the obfuscated requesting entity ID 620 is substantially the same as a recovered obfuscated ID 622 from the memory 88 (e.g., as a result of storing the obfuscated ID 606 and the memory 88).

When the first obfuscated access permissions list is not found, the processing module 84 sends, via the network 24 a rejection response to one or more of the DSTN managing unit 18 and a first requesting device or ignores the first access request. When the first obfuscated access permissions list is found based on the first obfuscated identifier, the first storage unit recovers first access permissions from the first obfuscated access permissions list based on the first obfuscated identifier for the first requesting device of the plurality of requesting devices associated with the unique identifier of the first group of unique identifiers. For example, the processing module 84 retrieves recovered access permissions 624 from the memory 88, where the recovered access permissions 624 that correspond to the recovered obfuscated ID 622.

When recovering the first access permissions, the first storage unit processes the first access request for the first requesting device based on the recovered first access permissions. The processing may include determining whether the first requesting device has permission for the first access request based on the recovered first access permissions. For example, the processing module 84 of the DST execution unit n determines whether the DST processing unit 1 has permission to write data when the access request pertains to data storage and determines whether the DST processing unit 1 has permission to access the slice name associated with the DSN ID 616.

Alternatively, or in addition to, a second storage unit of the set of storage units receives a second access request from each set of access requests of the plurality of access requests to produce a group of second access requests and extracts a unique identifier from each second access request of the group of second access requests to produce a second group of unique identifiers. Having produced the second group of unique identifiers, for a unique identifier of the second group of unique identifiers, the second storage unit performs the deterministic function on the unique identifier of the second group of unique identifiers to produce a second obfuscated identifier and seeks a second obfuscated access permissions list based on the second obfuscated identifier, where the seeking the second obfuscated access permissions list includes determining whether the second obfuscated identifier references the first obfuscated access permissions list and when the second obfuscated identifier does reference the first obfuscated access permissions list, recovering the second access permissions from the first obfuscated access permissions list based on the second obfuscated identifier. When the second obfuscated access permissions list is found based on the second obfuscated identifier, a second storage unit recovers second access permissions from the second obfuscated access permissions list based on the second obfuscated identifier for a second requesting device of the plurality of requesting devices associated with the unique identifier of the second group of unique identifiers and processes the second access request for the second requesting device based on the recovered second access permissions.

Further alternatively, or in addition to, the first storage unit of the set of storage units, for a second unique identifier of the first group of unique identifiers, performs the deterministic function on the second unique identifier to produce a second obfuscated identifier and seeking a second obfuscated access permissions list based on the second obfuscated identifier. When the second obfuscated access permissions list is found based on the second obfuscated identifier, the first storage unit recovers second access permissions from the second obfuscated access permissions list based on the second obfuscated identifier for a second requesting device (e.g., DST processing unit R) of the plurality of requesting devices associated with the second unique identifier of the first group of unique identifiers and processes the second access request for the second requesting device based on the recovered second access permissions.

With the set of storage units, having processed the plurality of sets of access requests 618, the plurality of requesting devices receives a set of access responses 626 from the set of storage units for each set of access requests of the plurality of access requests for which a corresponding requesting device had favorable access permissions with at least a threshold number of storage units of the set of storage units. The threshold number corresponds to a read threshold number when the first access request includes a read request. The threshold number corresponds to a write threshold number when the first access request includes a write request. For example, the DST processing unit 1 receives at least the write threshold number of the access responses 1-n from the set of DST execution units 1-n when the DST processing unit 1 has sufficient permissions to write the data to the DSTN module 22. FIG. 47C is a flowchart illustrating an example of controlling access in a dispersed storage network (DSN). In particular, a method is presented for use in conjunction with one or more functions and features described in conjunction with FIGS. 1-39, 47A-B, and also FIG. 47C. The method begins at step 630 where a processing module of a computing device of one or more computing devices (e.g., a set of storage units) of the DSN receives a plurality of sets of access requests from a plurality of requesting devices, where a requesting device of the plurality of requesting device generates a set of access requests of the plurality of sets of access requests regarding a particular type of data access.

The method continues at step 632 where a processing module of a first storage unit of the set of storage units receives a first access request from each set of access requests of the plurality of access requests to produce a group of first access requests. The method continues at step 634 where the first storage unit extracts a unique identifier from each first access request of the group of first access requests to produce a first group of unique identifiers. For a unique identifier of the first group of unique identifiers, the method continues at step 636 where the first storage unit performs a deterministic function on the unique identifier to produce a first obfuscated identifier. The method continues at step 638 where the first storage unit seeks a first obfuscated access permissions list based on the first obfuscated identifier (e.g., issues a query, interprets a query response, attempts to retrieve the first obfuscated permissions list utilizing the first obfuscated identifier as an index from a stored access control list). When the first obfuscated access permissions list is not found, the first storage unit sends a rejection response or ignores the first access request.

When the first obfuscated access permissions list is found based on the first obfuscated identifier, the method continues at step 640 where the first storage unit recovers first access permissions from the first obfuscated access permissions list based on the first obfuscated identifier for a first requesting device of the plurality of requesting devices associated with the unique identifier of the first group of unique identifiers. The method continues at step 642 where the first storage unit processes the first access request for the first requesting device based on the recovered first access permissions. For example, when the first obfuscated access permissions list is found, the first storage unit determines whether the first requesting device has permission for the first access request based on the recovered first access permissions and executes the first access request when the first requesting device has favorable access permissions.

Alternatively, or in addition to, the method includes a processing module of a second storage unit receiving a second access request from each set of access requests of the plurality of access requests to produce a group of second access requests. The method continues at the step where the second storage unit extracts a unique identifier from each second access request of the group of second access requests to produce a second group of unique identifiers. For a unique identifier of the second group of unique identifiers, the method continues at the step where the second storage unit performs the deterministic function on the unique identifier of the second group of unique identifiers to produce a second obfuscated identifier and seeks a second obfuscated access permissions list based on the second obfuscated identifier. The seeking the second obfuscated access permissions list includes determining whether the second obfuscated identifier references the first obfuscated access permissions list, and when the second obfuscated identifier does reference the first obfuscated access permissions list, recovering the second access permissions from the first obfuscated access permissions list based on the second obfuscated identifier. When the second obfuscated access permissions list is found based on the second obfuscated identifier, the method continues with the second storage unit recovering second access permissions from the second obfuscated access permissions list based on the second obfuscated identifier for a second requesting device of the plurality of requesting devices associated with the unique identifier of the second group of unique identifiers and processing the second access request for the second requesting device based on the recovered second access permissions.

Further alternatively, or in addition to, the processing module of the first storage unit, for a second unique identifier of the first group of unique identifiers, performs the deterministic function on the second unique identifier to produce a second obfuscated identifier and seeks a second obfuscated access permissions list based on the second obfuscated identifier. When the second obfuscated access permissions list is found based on the second obfuscated identifier, the method continues with the first storage unit recovering second access permissions from the second obfuscated access permissions list based on the second obfuscated identifier for a second requesting device of the plurality of requesting devices associated with the second unique identifier of the first group of unique identifiers and processing the second access request for the second requesting device based on the recovered second access permissions.

The method continues at step 644 where the plurality of requesting devices receives a set of access responses from the set of storage units for each set of access requests of the plurality of access requests for which a corresponding requesting device had favorable access permissions with at least a threshold number of storage units of the set of storage units. The threshold number corresponds to a read threshold number when the first access request includes a read request. The threshold number corresponds to a write threshold number when the first access request includes a write request.

The method described above in conjunction with the processing module can alternatively be performed by other modules of the dispersed storage network or by other devices. In addition, at least one memory section of a computer readable storage medium that stores operational instructions can, when executed by one or more processing modules of one or more computing devices of the dispersed storage network (DSN), cause the one or more computing devices to perform any or all of the method steps described above.

FIG. 48A is a schematic block diagram of another embodiment of a dispersed storage network (DSN) that includes the distributed storage and task network (DSTN) managing unit 18 of FIG. 1, the network 24 of FIG. 1, the dispersed storage and task (DST) processing unit 16 of FIG. 1, and the DSTN module 22 of FIG. 1. The DSTN managing unit 18 includes a certificate authority module 654 and an authentication authority 650. The authentication authority 650 includes a signing module 652. The DST processing unit 16 includes a unit configuration module 658 and a signature verification module 656. The DSTN module 22 includes a set of DST execution units 1-n. Each DST execution unit may be implemented utilizing the DST execution unit 36 of FIG. 1. Each of the authentication authority 650, the certificate authority module 654, the signature verification module 656, and the unit configuration module 658 may be implemented utilizing one or more of the processing module 84 of FIG. 3 and the DST client module 34 of FIG. 1.

The DSN functions to configure a new DSN entity. In an example of operation of configuring the new DSN entity, when the new DSN entity includes the DST processing unit 16, the signature verification module 656 obtains a bootstrap location. The bootstrap location identifies a DSN address of the DSN. The obtaining includes at least one of retrieving from a local memory, receiving a user input, and receiving via the network 24 from another DSN entity. Having obtained the bootstrap location, the signature verification module 656 obtains a trusted certificate. For example, the signature verification module 656 issues a bootstrap certificate request 666 using the bootstrap location and receives a certificate authority certificate 660 from the certificate authority module 654 when the bootstrap location includes a DSN address associated with the certificate authority module 654.

Having obtained the certificate authority certificate 660 as the trusted certificate, the signature verification module 656 identifies an authentication authority of the DSN. The identifying may be based on one or more of a predetermination, issuing a request to another entity of the DSN, receiving a response that includes an authentication authority table, selecting the authentication authority from the authentication authority table, and extracting a DSN address of the selected authentication authority. For example, the signature verification module selects the authentication authority 650 of the DSTN managing unit 18 from a plurality of candidate authentication authorities based on a trust level indicator (e.g., a highest trust level, greater than a favorable trust threshold level).

Having identified the authentication authority, the signature verification module obtains signed registry information 664 from the identified authentication authority. The obtaining includes at least one of receiving a registry information broadcast that includes the signed registry information 664 and issuing a registry information request to the authentication authority 650 of the DSTN managing unit 18, and receiving a registry information response that includes the signed registry information 664, where the signing module 652 signs registry information 662 to produce the signed registry information 664. Having obtained the signed registry information 664, the signature verification module 656 validates the signed registry information 664 using the trusted certificate. For example, the signature verification module 656 validates each signature of the signed registry information 664 using a public key of the certificate authority certificate 660.

When the validation is favorable, the signature verification module 656 indicates that the signed registry information 664 is valid to produce verified registry information 668. Having produced the verified registry information 668, the unit configuration module 658 configures the new unit utilizing the verified registry information 668. For example, the unit configuration module 658 loads software into a local memory of the DST processing unit 16, where the verified registry information includes the software. As another example, the unit configuration module 658 configures parameters associated with hardware of the DST processing unit 16 in accordance with the verified registry information.

FIG. 48B is a flowchart illustrating an example of configuring a new entity of a dispersed storage network (DSN). The method begins or continues at step 670 where a processing module of a plurality of processing modules of a plurality of computing devices of the DSN obtains a bootstrap address. The obtaining includes at least one of retrieving from a predetermined storage location of a local memory device, receiving a user input, initiating a query to a trusted entity, and receiving a query response. The method continues at step 672 where the processing module obtains a trusted certificate based on the bootstrap address. For example, the processing module initiates a certificate request using the bootstrap address and receives a certificate response that includes the trusted certificate.

The method continues at step 674 where the processing module obtains an address of an authentication authority. The obtaining includes at least one of recovering from a local memory and retrieving. In an example of the retrieving, the processing module issues a request to another entity of the DSN, receives a response that includes an authentication authority table, selects the authentication authority from the authentication authority table, and extracts the address of the selected authentication authority.

The method continues at step 676 where the processing module obtains signed registry information utilizing the address of the authentication authority. For example, the processing module issues a registry information request using the address of the authentication authority and receives the signed registry information. The method continues at step 678 where the processing module validates the signed registry information using the trusted certificate. For example, the processing module validates one or more signatures of the signed registry information utilizing a public-key associated with the trusted certificate.

When the validation is favorable, the method continues at step 680 where the processing module indicates that the sign registry information is valid to produce verified registry information. The method continues at step 682 where the processing module selects a portion of the verified registry information based on a configuration request. The selecting includes one or more of receiving the configuration request, interpreting stored information a local memory to produce the configuration request, and identifying a portion based on a configuration type of the configuration request. For example, the processing module identifies the configuration type as a user device type when the configuration request is from a user device.

The method continues at step 684 where the processing module facilitates configuring of a DSN entity using the portion of the verified registry information. The facilitating includes the processing module extracting a portion of the verified registry information and configuring the DSN entity utilizing the extracted portion of the verified registry information. For example, the processing module loads operational software, initializes suffer parameters, establishes input output configurations, and issues instructions to start one or more processes.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by a computing device to adjust data storage efficiency of data in a storage network, the method comprises:
    determining an estimated overwrite frequency for a data segment for storage in memory of the storage network;
    determining a storage approach for the data segment based on the estimated overwrite frequency;
    processing the data segment based on the storage approach to produce a processed data segment;
    error encoding the processed data segment to produce a set of encoded data slices, wherein a decode threshold number of encoded data slices is needed to recover the processed data segment; and
    storing the set of encoded data slices in memory of the storage network.

2. The method of claim 1 further comprises:
    obtaining the data segment for storage in the memory of the storage network; and
    obtaining access level information regarding the data segment, wherein the access level information includes the estimated overwrite frequency for the data segment.

3. The method of claim 1 further comprises:
    obtaining the data segment for storage in the memory of the storage network; and
    obtaining access level information regarding the data segment, wherein the access level information includes an estimated retrieval frequency level for the data segment.

4. The method of claim 3 further comprises:
    when the estimated retrieval frequency level for the data segment is greater than a retrieval frequency threshold:
    determining a cost of compression factor based on resource information, wherein the cost of compression factor includes one or more of an estimated incremental processing resource level, and an estimated incremental network utilization reduction level as a result of compressing the data segment; and
    determining the storage approach based on the cost of compression factor and the access level information.

5. The method of claim 4, wherein the determining the cost of compression factor comprises one of:
    determining the cost of compression factor is less than an average cost of compression factor when the resource information indicates a utilization level of the computing device is less than average; and
    determining the cost of compression factor is greater than the average cost of compression factor when the resource information indicates the utilization level of the computing device is greater than average.

6. The method of claim 5 further comprises:
    when the cost of compression factor is less than the average cost of compression factor and the estimated retrieval frequency level is less than a retrieval frequency threshold level, determining to the storage approach is a compression storage approach; and
    compressing the data segment in accordance with the compression storage approach to produce the processed data segment.

7. The method of claim 3 further comprises:
    when the estimated retrieval frequency level for the data segment is less than or equal to a retrieval frequency threshold:
    determining a cost of decompression factor based on resource information, wherein the cost of decompression factor includes one or more of an estimated incremental processing resource level, and an estimated incremental network utilization increase level as a result of compressing the data segment; and
    determining the storage approach based on the cost of decompression factor and the access level information.

8. The method of claim 7, wherein the resource information comprises network capacity information.

9. The method of claim 7, wherein the resource information comprises network utilization level information.

10. The method of claim 7, wherein the resource information comprises network utilization level information.

11. The method of claim 7, wherein the resource information comprises storage unit capacity information.

12. The method of claim 7, wherein the resource information comprises storage unit utilization level information.

13. The method of claim 7, wherein the resource information comprises an inbound processing module utilization level.

14. The method of claim 7, wherein the resource information comprises an outbound processing module utilization level.

15. The method of claim 3, wherein the obtaining the access level information comprises determining the access level information based on a historical record.

16. The method of claim 3, wherein the obtaining the access level information comprises performing a lookup of the access level information.

17. The method of claim 3, wherein the obtaining the access level information comprises receiving the access level information.

18. The method of claim 1, wherein the storage approach comprises one of:
   a compression storage approach; and
   a non-compression storage approach.

19. The method of claim 1 further comprises:
   obtaining at least the decode threshold number of encoded data slices from the memory; and
   dispersed storage error decoding the at least the decode threshold number of encoded data slices to reproduce the processed data segment.

20. The method of claim 19 further comprises:
   determining the storage approach is a compression storage approach; and
   decompressing the processed data segment in accordance with the compression storage approach to reproduce the data segment.

* * * * *